(12) United States Patent
Toyoshima et al.

(10) Patent No.: US 8,310,470 B2
(45) Date of Patent: Nov. 13, 2012

(54) DISPLAY APPARATUS AND ELECTRONIC EQUIPMENT

(75) Inventors: Yoshihiko Toyoshima, Aichi (JP); Naoyuki Itakura, Kanagawa (JP); Tomoyuki Fukano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1112 days.

(21) Appl. No.: 12/230,385

(22) Filed: Aug. 28, 2008

(65) Prior Publication Data

US 2009/0147164 A1 Jun. 11, 2009

(30) Foreign Application Priority Data

Aug. 30, 2007 (JP) ................................. 2007-224922

(51) Int. Cl.
G09G 5/00 (2006.01)

(52) U.S. Cl. ..................................................... 345/204

(58) Field of Classification Search ............ 345/89–100, 345/204–215
See application file for complete search history.

(56) References Cited

U.S. PATENT DOCUMENTS

| 5,296,847 | A | 3/1994 | Takeda et al. | |
|---|---|---|---|---|
| 7,825,885 | B2 * | 11/2010 | Sato et al. | 345/89 |
| 7,973,782 | B2 * | 7/2011 | Itakura et al. | 345/205 |
| 2006/0145985 | A1 * | 7/2006 | Hwang et al. | 345/92 |
| 2006/0152470 | A1 * | 7/2006 | Kim | 345/102 |
| 2007/0222744 | A1 * | 9/2007 | Okita et al. | 345/102 |

FOREIGN PATENT DOCUMENTS

| JP | 02-157815 | 6/1990 |
|---|---|---|
| JP | 11-119746 | 4/1999 |
| JP | 2000-298459 | 10/2000 |

* cited by examiner

*Primary Examiner* — Sumati Lefkowitz
*Assistant Examiner* — Rodney Amadiz
(74) *Attorney, Agent, or Firm* — Rader Fishman & Grauer, PLLC

(57) ABSTRACT

Disclosed herein is a display apparatus including: an available pixel section; a plurality of scan lines; a plurality of capacitor lines; a plurality of signal lines; a driving circuit; a monitor circuit having a first monitor pixel section and a second monitor pixel section; at least two of following three correction systems of a capacitor-signal correction system, a video-signal correction system and the second monitor pixel section, and a common-voltage correction system; and a switch for selectively supplying pixel electric potentials detected by the first monitor pixel section and the second monitor pixel section to a desired one of the two or three correction systems.

8 Claims, 54 Drawing Sheets

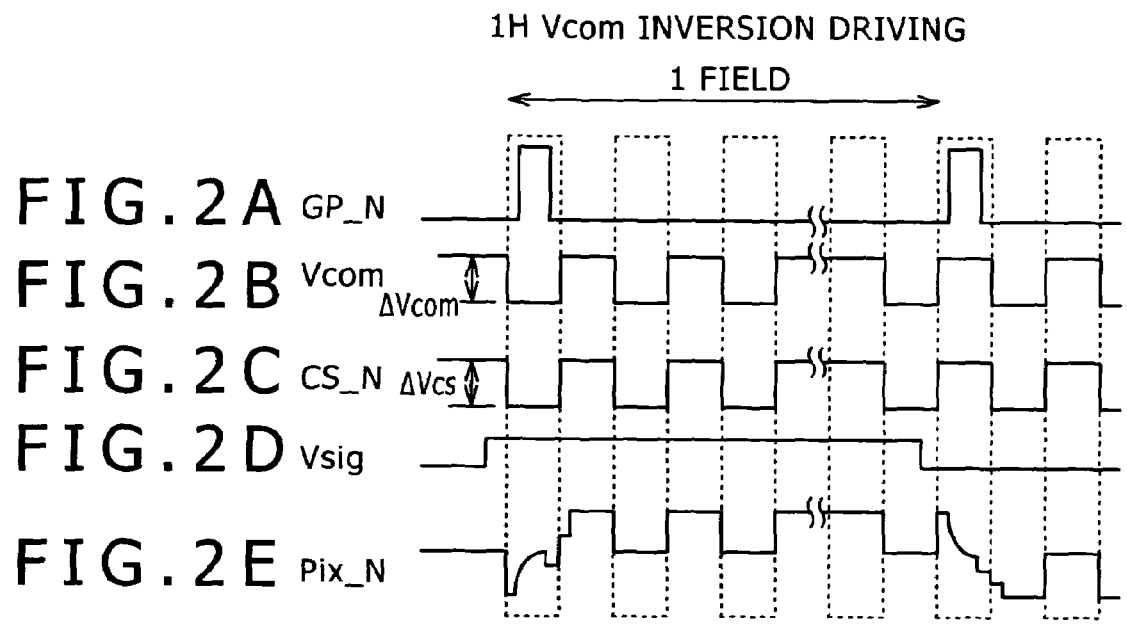
FIG. 2A GP_N
FIG. 2B Vcom
FIG. 2C CS_N
FIG. 2D Vsig
FIG. 2E Pix_N
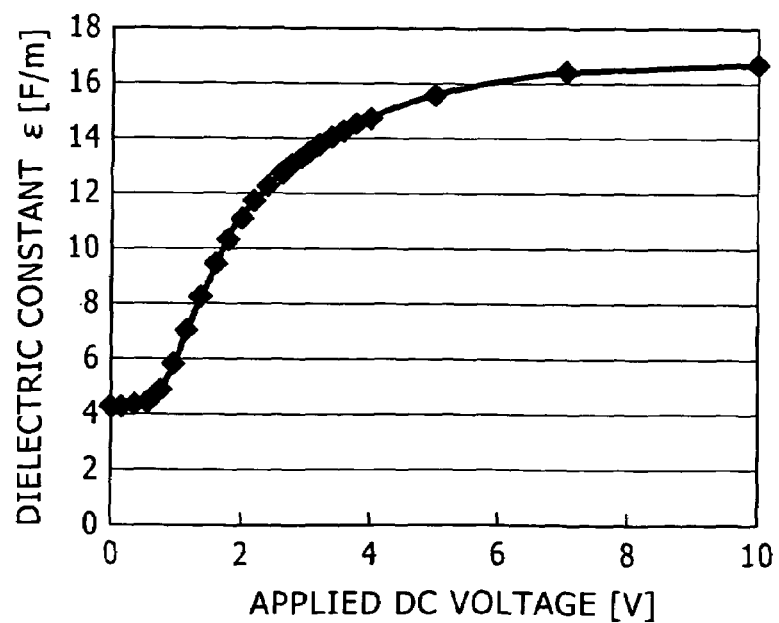
FIG. 3

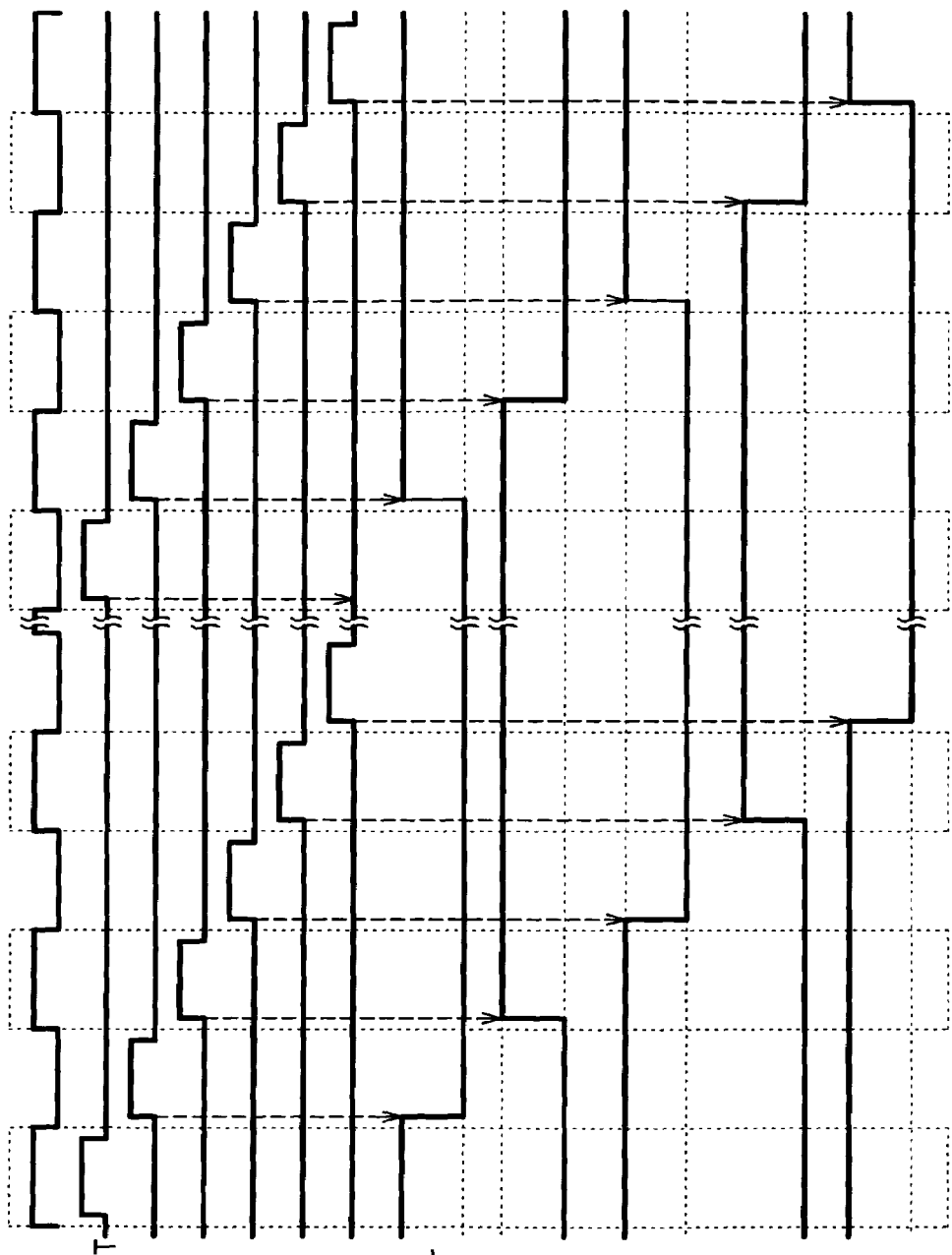

FIG. 15

| VARIATION CAUSE 1 | VARIATION CAUSE 2 | VARIATION CAUSES (AT SCAN TIME) | SCAN-TIME ADJUSTMENT | AUTOMATIC ADJUSTMENT |
|---|---|---|---|---|
| EFFECTIVE PIXEL ELECTRIC-POTENTIAL VARIATION | COUPLING ON FALLING EDGE OF GATE LINE | GATE-LINE VOLTAGE | ◯ | ◯ |
| | | GATE-LINE TIME CONSTANT | ◯ | ◯ |
| | PIXEL Tr LEAK | FREQUENCY (AT SCAN TIME) | ◯ | ◯ |
| | Tr OFF LEAK | FREQUENCY (AT ACTUAL UTILIZATION TIME)(*1) | × | ◯ |
| | | TEMPERATURE (AT SCAN TIME) | ◯ | ◯ |
| | | TEMPERATURE (AT UTILIZATION TIME) | × | ◯ |
| | | AGING | × | ◯ |
| | Tr OPTICAL LEAK | FREQUENCY (AT SCAN TIME) | ◯ | ◯ |
| | | FREQUENCY (AT ACTUAL UTILIZATION TIME)(*1) | × | ◯ |
| | | TEMPERATURE (AT SCAN TIME) | ◯ | ◯ |
| | | TEMPERATURE (AT UTILIZATION TIME) | × | ◯ |
| | | B/L LUMINANCE (AT SCAN TIME) | ◯ | ◯ |
| | | B/L LUMINANCE (AT ACTUAL UTILIZATION TIME)(*2) | × | ◯ |
| | | EXTERNAL LIGHT LUMINANCE | × | ◯ |

(*1: A CASE IN WHICH THE FRAME FREQUENCY IS CHANGED IN A LOW POWER CONSUMPTION MODE (A MODE FOR DISPLAYING THE PRESENT TIME ONLY))
(*2: A CASE IN WHICH THE BACKLIGHT LUMINANCE IS CHANGED IN ACCORDANCE WITH SETTING MADE BY AN ORDINARY USER)

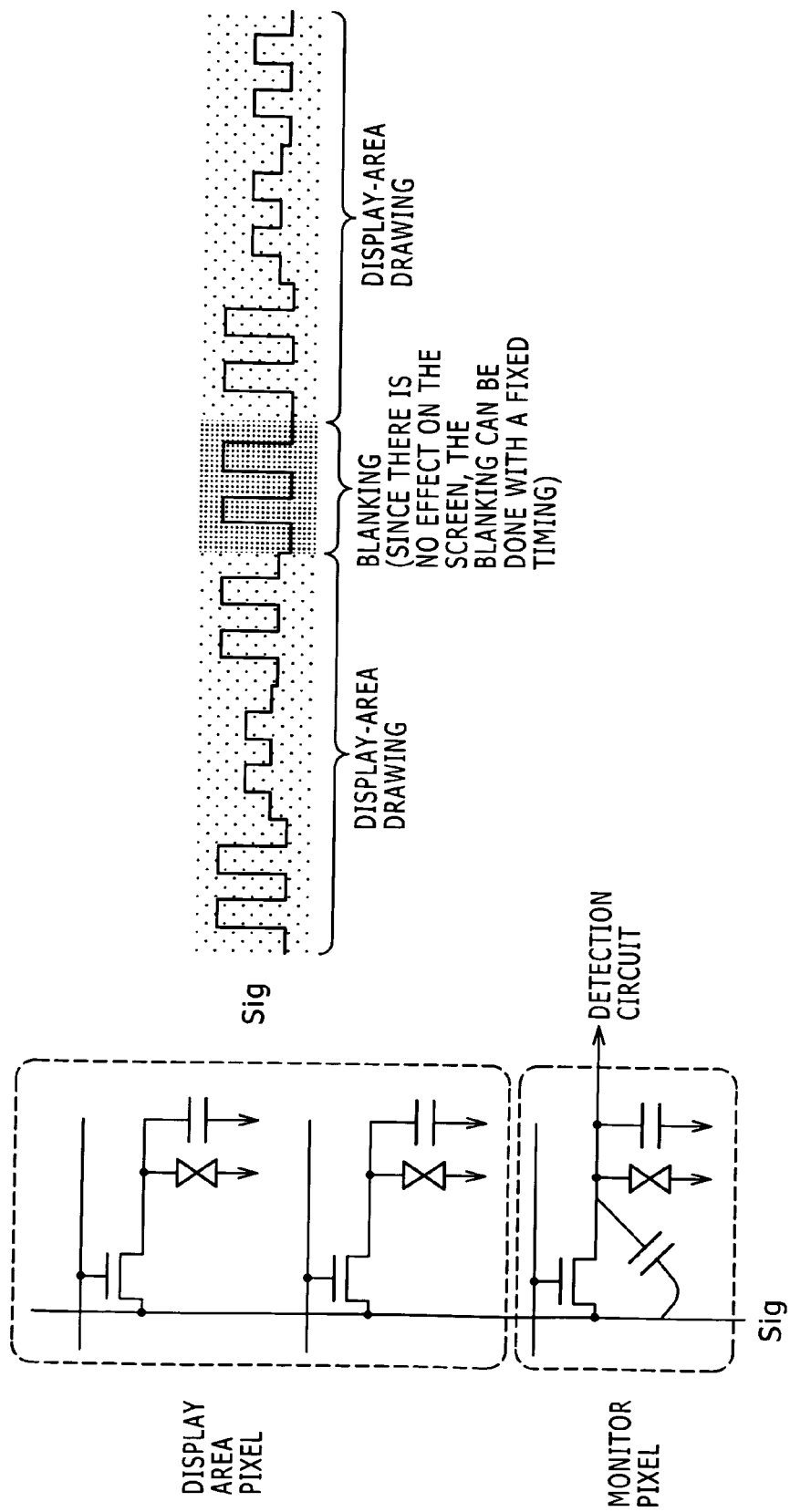

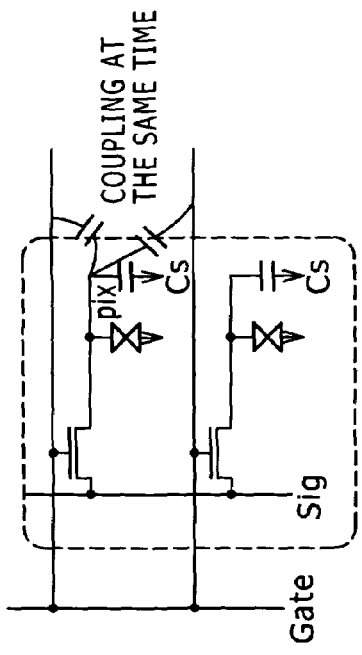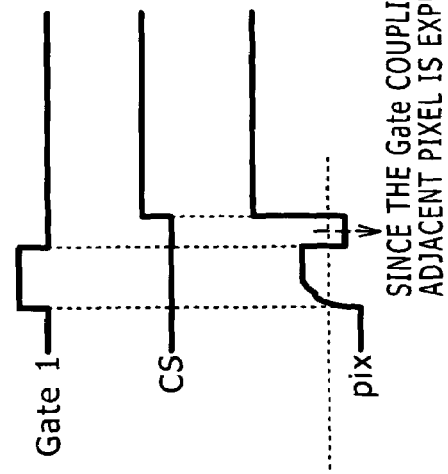
FIG.18A  FIG.18B
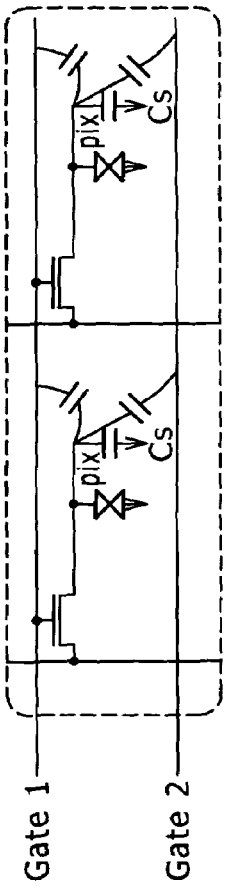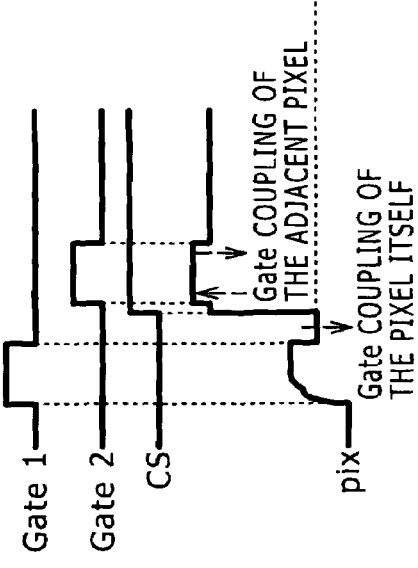

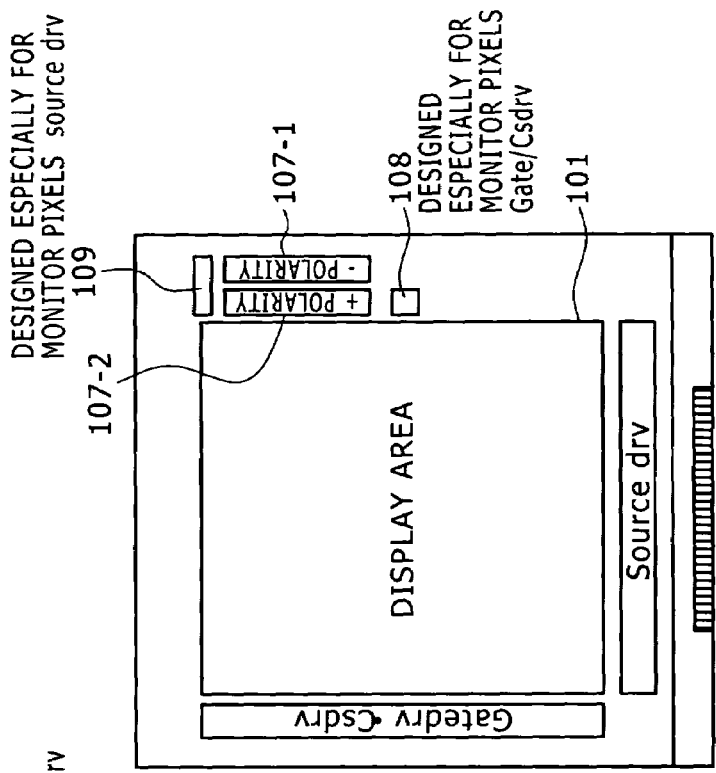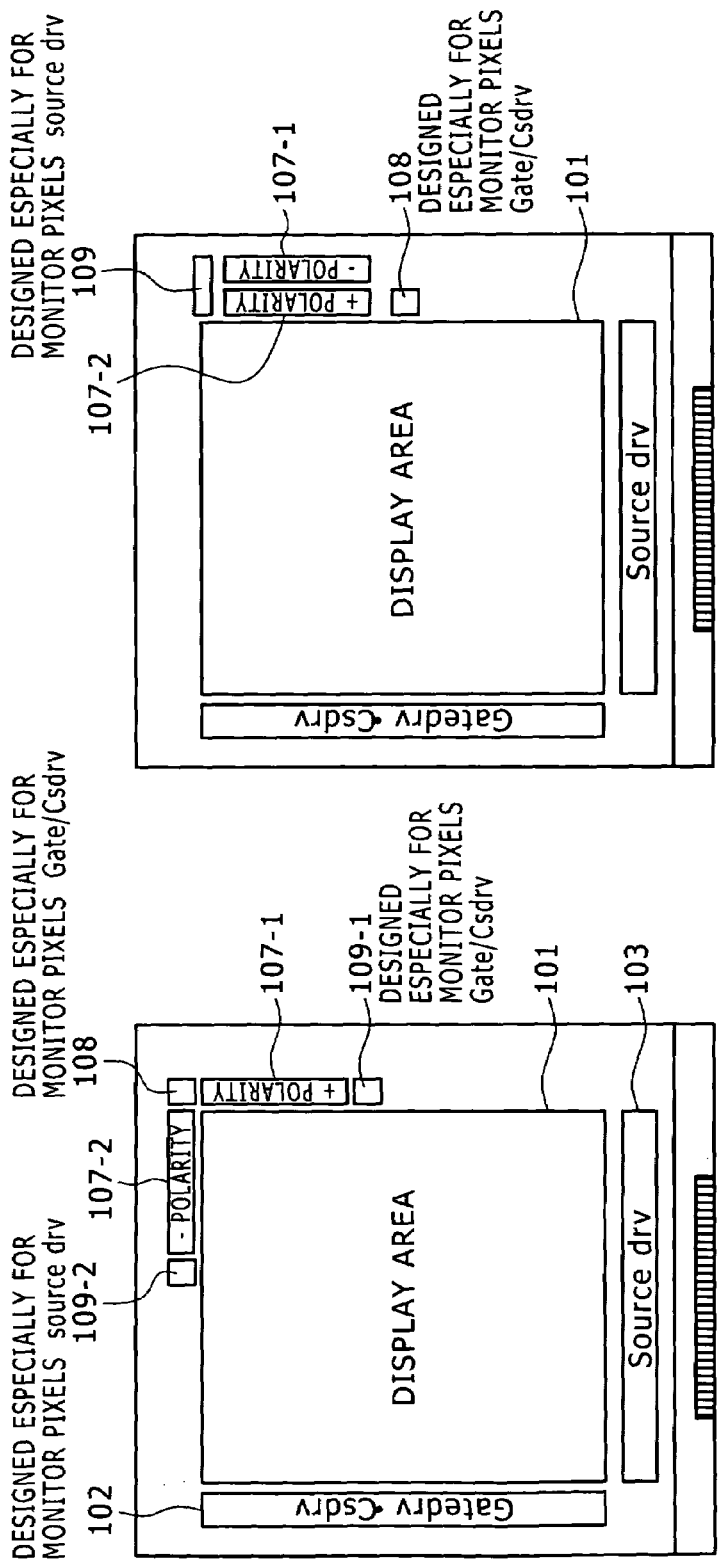

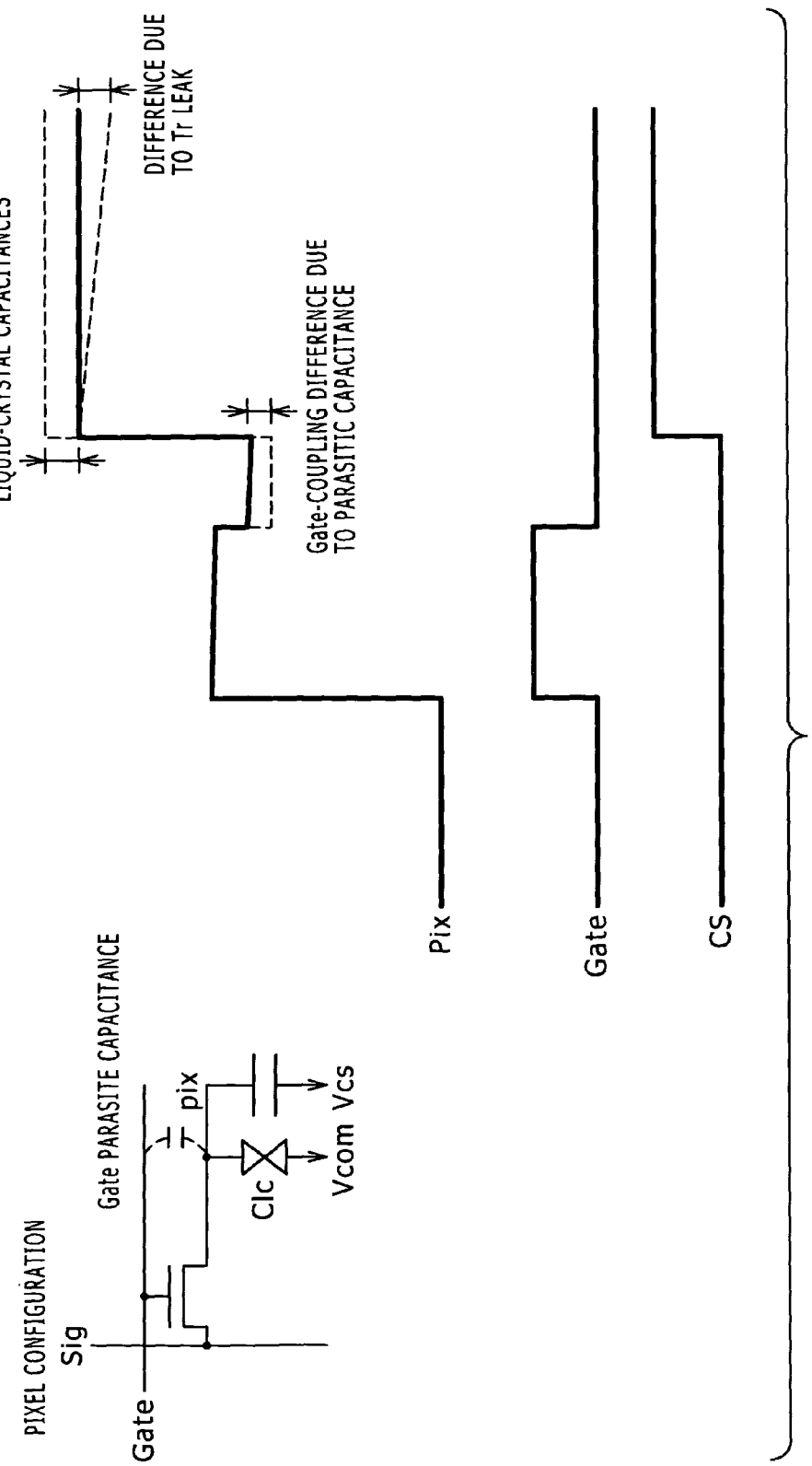

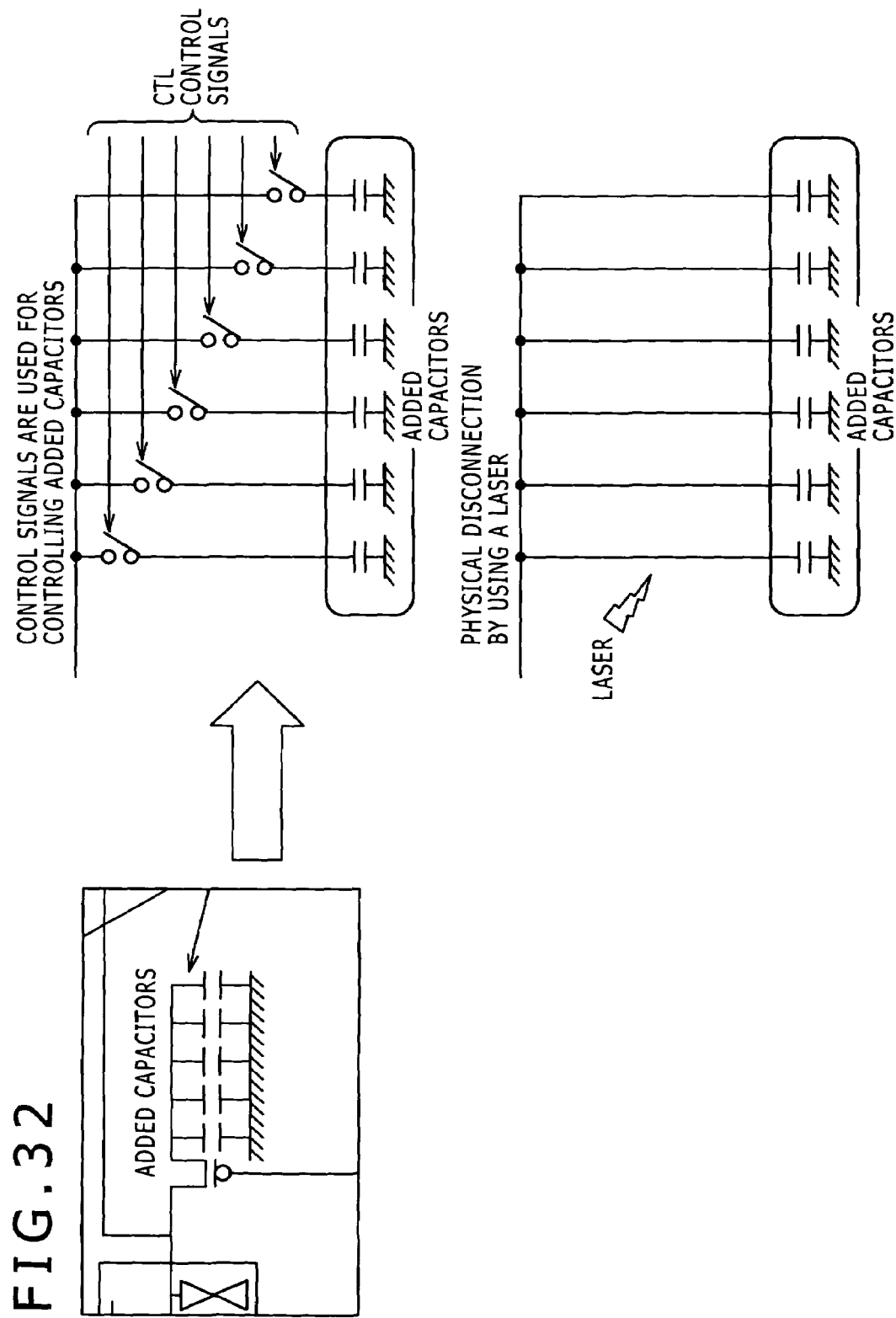

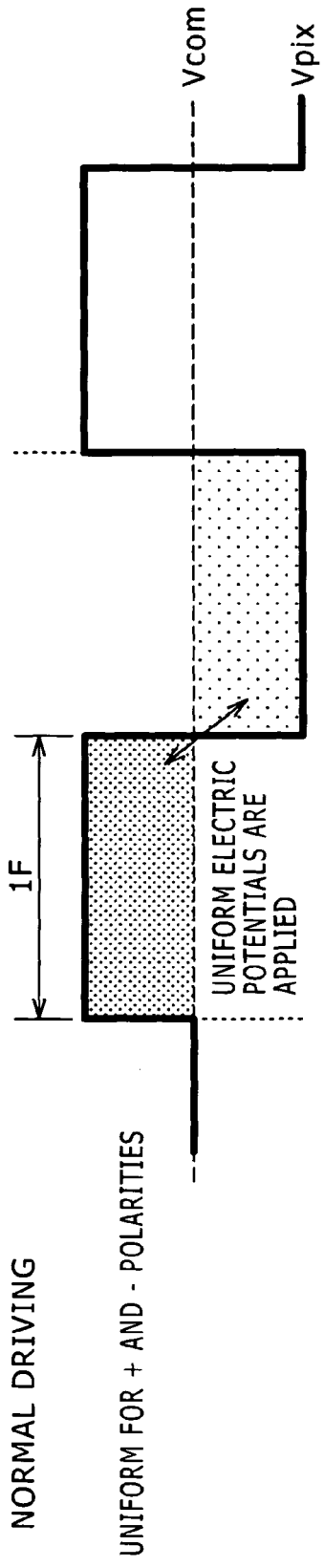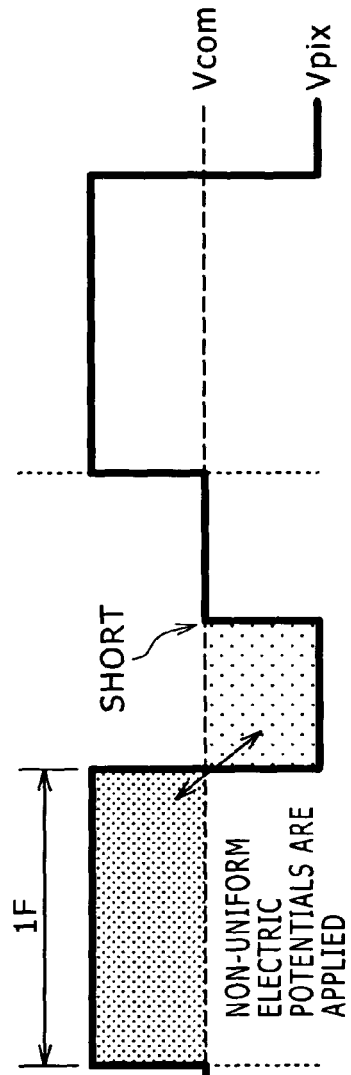
FIG. 33A NORMAL DRIVING
UNIFORM FOR + AND - POLARITIES
FIG. 33B CS/VCOM ALTERNATE DETECTION DRIVING
IN THE EVENT OF A SHORT, THE PERIOD OF APPLYING AN ELECTRIC POTENTIAL WITH A - POLARITY DECREASES SO THAT THE ELECTRIC POTENTIALS BECOME ONE-SIDED

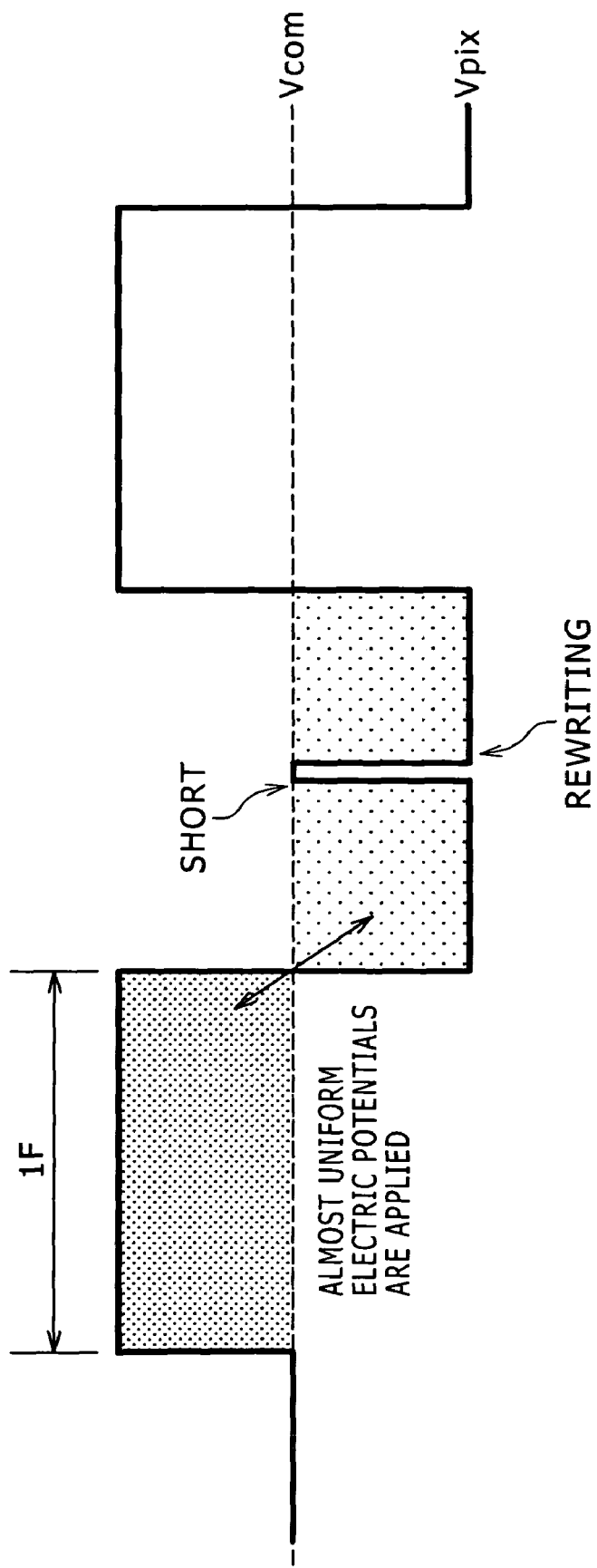

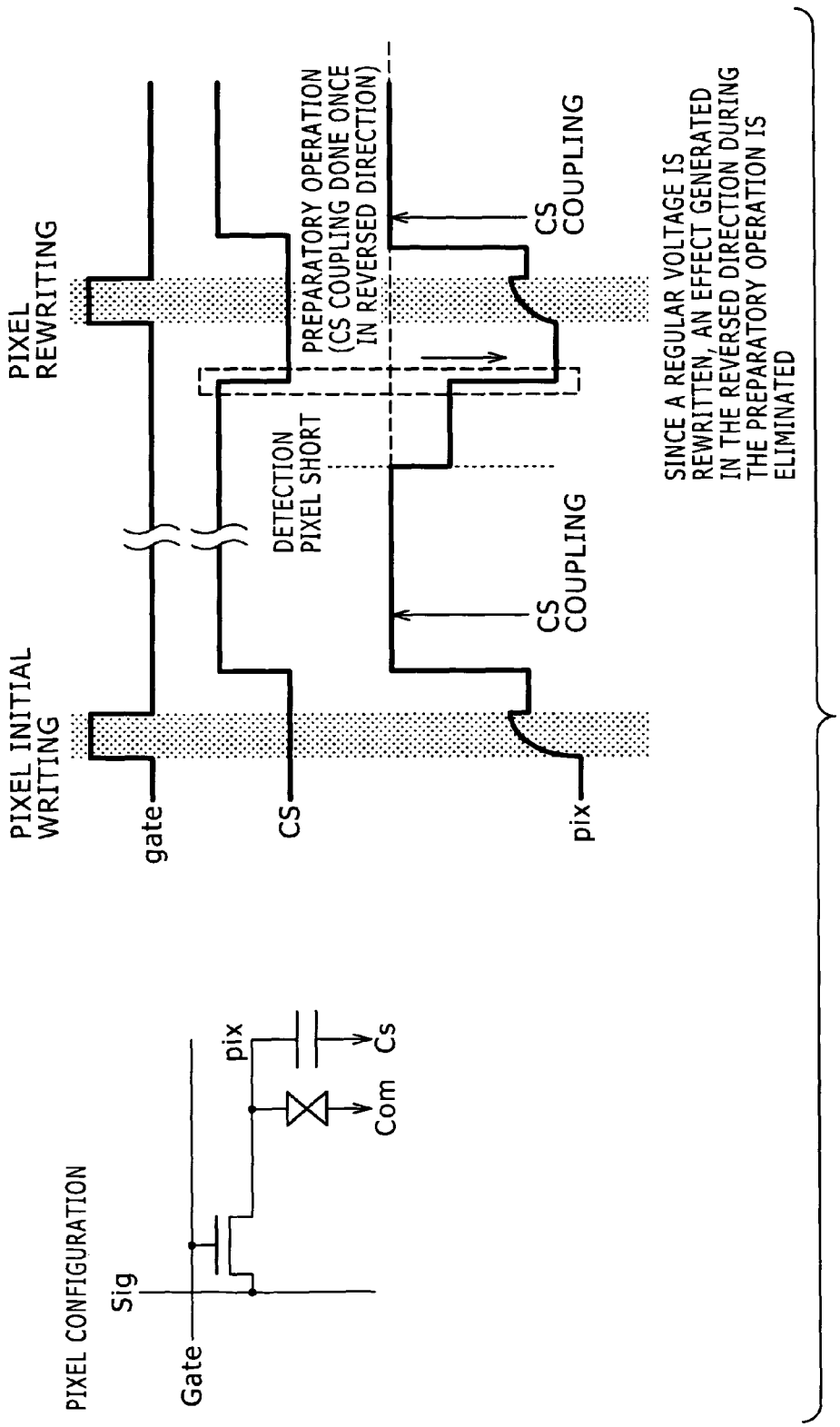

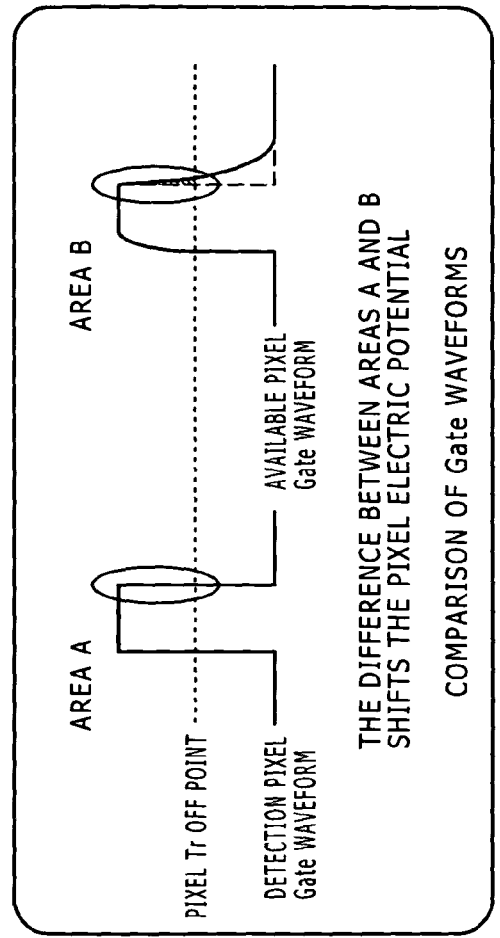

FIG. 40A — PIXEL CIRCUIT DIAGRAM

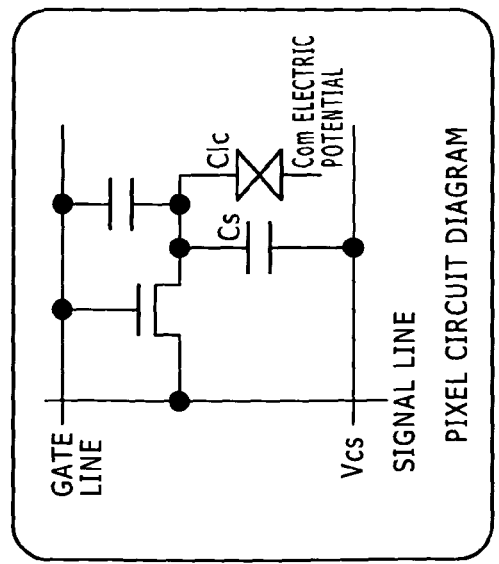

FIG. 40B — COMPARISON OF Gate WAVEFORMS

THE DIFFERENCE BETWEEN AREAS A AND B SHIFTS THE PIXEL ELECTRIC POTENTIAL

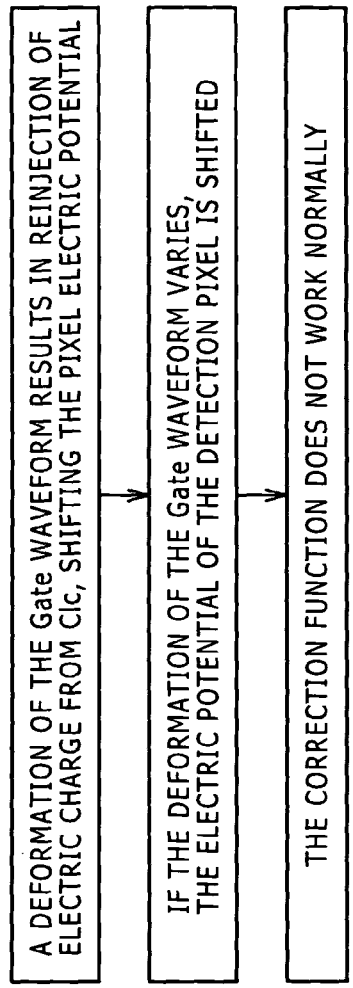

FIG. 40C

A DEFORMATION OF THE Gate WAVEFORM RESULTS IN REINJECTION OF ELECTRIC CHARGE FROM Clc, SHIFTING THE PIXEL ELECTRIC POTENTIAL IF THE DEFORMATION OF THE Gate WAVEFORM VARIES, THE ELECTRIC POTENTIAL OF THE DETECTION PIXEL IS SHIFTED

THE CORRECTION FUNCTION DOES NOT WORK NORMALLY

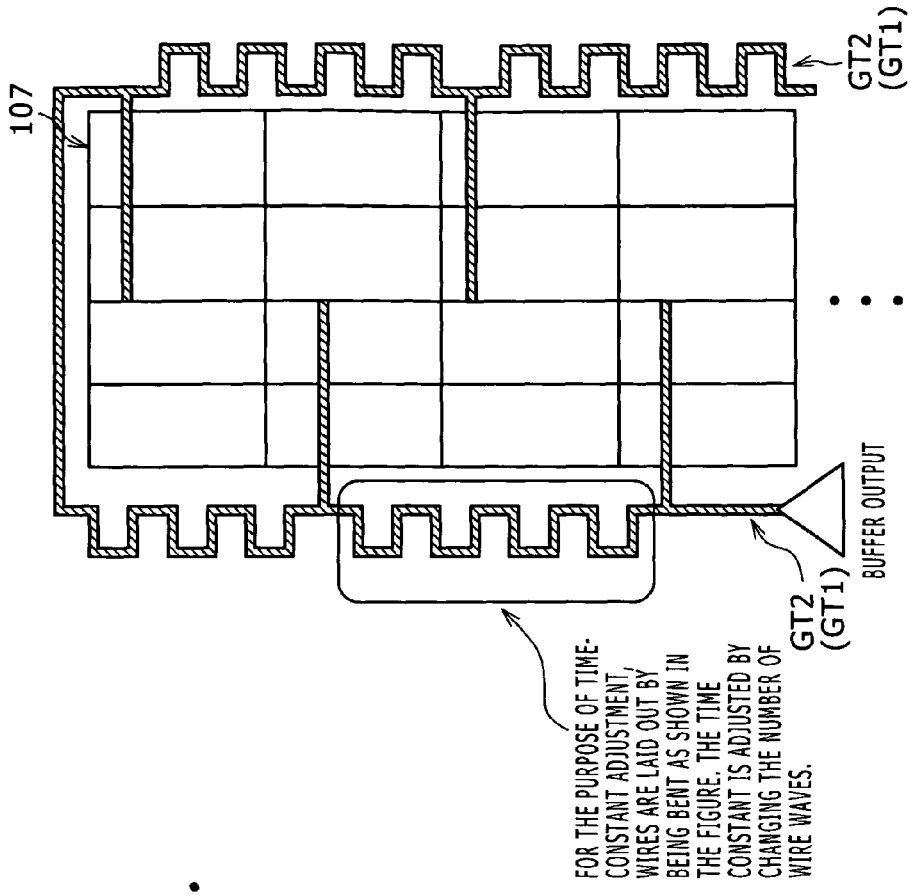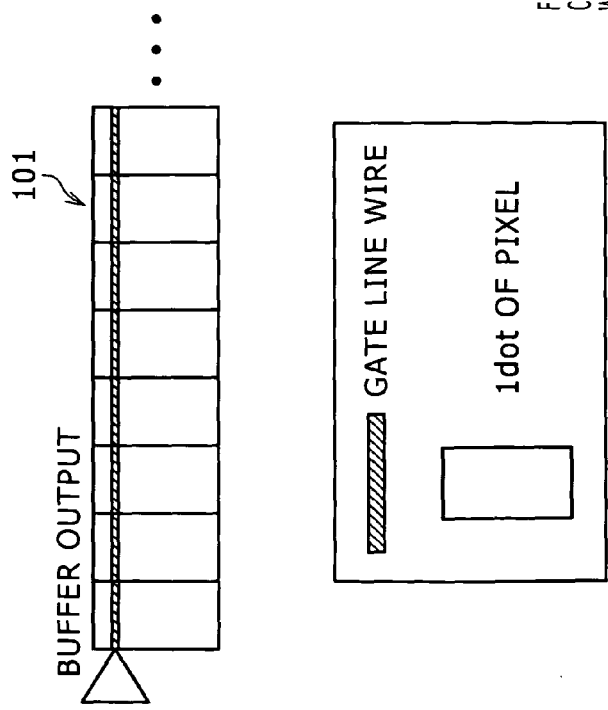

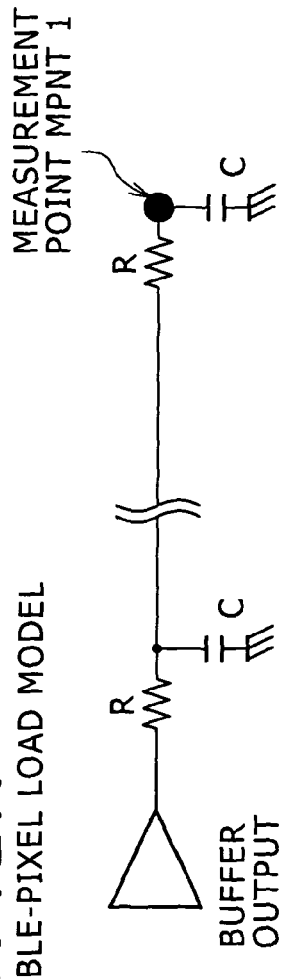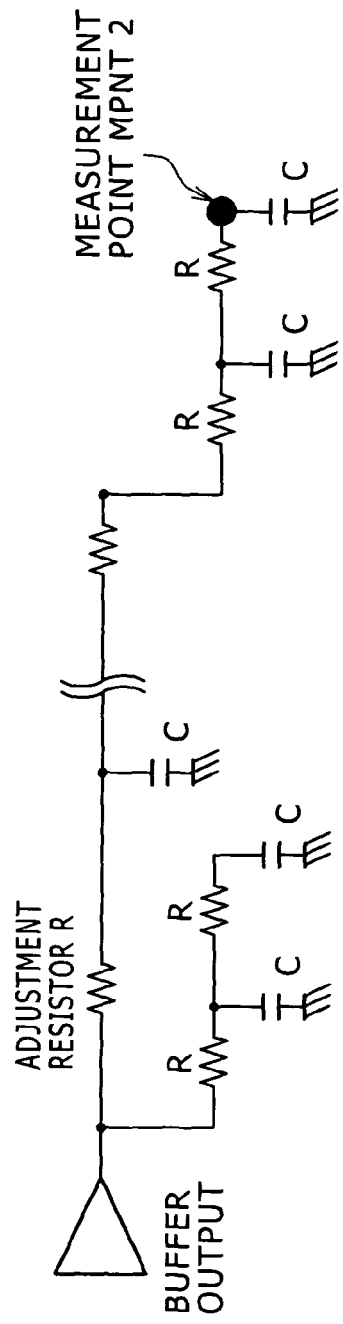

NORMAL LAYOUT

OPENED BY LASER REPAIR

OPTIONAL LAYOUT 1

SHORTED BY LASER REPAIR

OPTIONAL LAYOUT 2

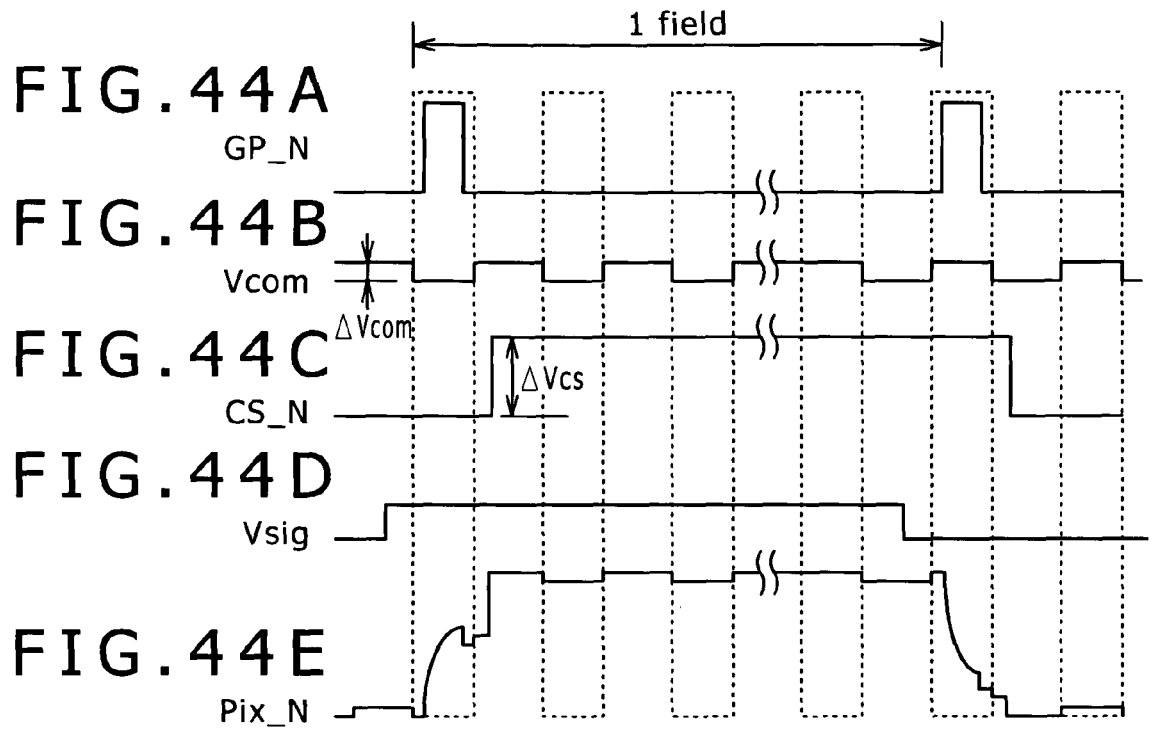
FIG. 44A GP_N
FIG. 44B Vcom
FIG. 44C CS_N
FIG. 44D Vsig
FIG. 44E Pix_N
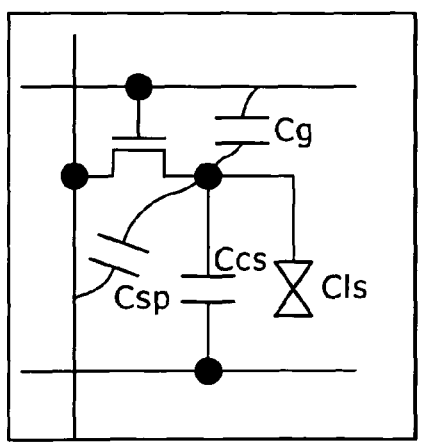
FIG. 45

DISPLAY APPARATUS AND ELECTRONIC EQUIPMENT

CROSS REFERENCES TO RELATED APPLICATIONS

The present invention contains subject matter related to Japanese Patent Application JP 2007-224922 filed in the Japan Patent Office on Aug. 30, 2007, the entire contents of which being incorporated herein by reference.

BACKGROUND OF THE INVENTION

1. Field of the Invention

The present invention relates to an active-matrix display apparatus employing pixel circuits arranged to form a matrix on the display area of the display apparatus as pixel circuits each having a display element also referred to as an electro-optical device and relates to electronic equipment including the display apparatus.

2. Description of the Related Art

By virtue of merits offered by a display apparatus as characteristics including a small thickness and a low power consumption, a display apparatus is employed widely in various kinds of electronic equipment including a PDA (Personal Digital Assistant), a hand-held phone, a digital camera, a video camera and the display unit of a personal computer. An example of the display apparatus is a liquid-crystal display apparatus making use of pixel circuits each employing a liquid crystal cell functioning as a display element which is also referred to as an electro-optical device.

FIG. 1 is a block diagram showing a typical configuration of the liquid-crystal display apparatus 1. For more information on this liquid-crystal display apparatus 1, the reader is suggested to refer to documents such as Japanese Patent Laid-Open Nos. Hei 11-119746 and 2000-298459 (hereinafter referred to as Patent documents 1 and 2). As shown in FIG. 1, the liquid-crystal display apparatus 1 employs an available pixel section 2, a vertical driving circuit (VDRV) 3 and a horizontal driving circuit (HDRV) 4 which are provided on the peripheries of the available pixel section 2. In the following description, the available pixel section is also referred to as a display pixel section or an effective display section.

In the available pixel section 2, a plurality of pixel circuits 21 are arranged to form a matrix. Each of the pixel circuits 21 includes a thin-film transistor TFT21 functioning as a switching device, a liquid-crystal cell LC21 and a storage capacitor Cs21. The first pixel electrode of the liquid-crystal cell LC21 is connected to the drain electrode (or the source electrode) of the thin-film transistor TFT21. The drain electrode (or the source electrode) of the thin-film transistor TFT21 is also connected to the first electrode of the storage capacitor Cs21.

Scan lines (each also referred to as a gate line) 5-1 to 5-$m$ are each provided for a row of the matrix and connected to the gate electrodes of the thin-film transistors TFT21 employed in the pixel circuits 21 provided on the row. The scan lines 5-1 to 5-$m$ are arranged in the column direction. Signal lines 6-1 to 6-$n$ arranged in the row direction are each provided for a column of the matrix.

As described above, the gate electrodes of the thin-film transistors TFT21 employed in the pixel circuits 21 provided on a row are connected to a scan line (one of the scan lines 5-1 to 5-$m$) provided for the row. On the other hand, the source (or drain) electrodes of the thin-film transistors TFT21 employed in the pixel circuits 21 provided on a column are connected to a signal line (one of the signal lines 6-1 to 6-$n$) provided for the column.

In addition, in the case of an ordinary liquid-crystal display apparatus, a capacitor line Cs is provided separately as shown in the diagram of FIG. 1. The storage capacitor Cs21 is connected between the capacitor line Cs and the first electrode of the liquid-crystal cell LC21. Pulses are applied to the capacitor line Cs at a phase causing a common voltage signal Vcom to be described later to vibrate at the same phase due to a capacitive coupling effect provided by the storage capacitor Cs21 connected to the capacitor line Cs. The capacitor line Cs connected to the second electrode of the storage capacitor Cs21 of every pixel circuit 21 on the available pixel section 2 serves as a line common to all the storage capacitors Cs21.

On the other hand, the second pixel electrode of the liquid-crystal cell LC21 of every pixel circuit 21 is connected to a supply line 7 serving as a line common to all the liquid-crystal cells LC21. The supply line 7 provides the aforementioned common voltage signal Vcom, which is a series of pulses with a polarity typically changing once every horizontal scan period. One horizontal scan period is referred to as 1H.

Each of the scan lines 5-1 to 5-$m$ is driven by the vertical driving circuit 3 whereas each of the signal lines 6-1 to 6-$n$ is driven by the horizontal driving circuit 4.

The vertical driving circuit 3 scans the rows of the matrix in the vertical direction or the row-arrangement direction in one field period. In the scan operation, the vertical driving circuit 3 scans the rows sequentially in order to select a row at one time, that is, in order to select pixel circuits 21 provided on a selected row as pixel circuits connected to a gate line (one of the gate lines 5-1 to 5-$m$) provided for the selected row. To put it in detail, the vertical driving circuit 3 asserts a scan pulse GP1 on the gate line 5-1 in order to select pixel circuits 21 provided on the first row. Then, the vertical driving circuit 3 asserts a scan pulse GP2 on the gate line 5-2 in order to select pixel circuits 21 provided on the second row. Thereafter, the vertical driving circuit 3 sequentially asserts gate pulses GP3 . . . and GPm on the gate lines 5-3 . . . and 5-$m$ respectively in the same way.

FIGS. 2A to 2E show timing charts of signals generated in execution of the so-called 1H Vcom inversion driving method of the ordinary liquid-crystal display apparatus shown in FIG. 1. To be more specific, FIG. 2A shows the timing chart of a gate pulse GP_N, FIG. 2B shows the timing chart of the common voltage signal Vcom asserted on the supply line 7, FIG. 2C shows the timing chart of the capacitor signal CS_N which is the pulses applied to the capacitor line Cs, FIG. 2D shows the timing chart of the video signal Vsig asserted on the signal line 6 and FIG. 2E shows the timing chart of the signal Pix_N applied to the liquid-crystal cell LC21.

The capacitive coupling driving method described above is known as a typical driving method adopted by the liquid-crystal display apparatus 1. For more information on this capacitive coupling driving method, the reader is suggested to refer to documents such as Japanese Patent Laid-Open No. Hei 2-157815 (hereinafter referred to as Patent document 3).

SUMMARY OF THE INVENTION

The capacitive coupling driving method is characterized that, in comparison with the 1H Vcom inversion driving method, the capacitive coupling driving method is capable of improving the response speed of the liquid-crystal cell due to the so-called overdrive, reducing audio noises generated in the frequency band of the common voltage signal Vcom and compensating the contrast for an ultra high definition display panel.

FIG. 3 is a diagram showing a relation between the dielectric constant $\epsilon$ of the liquid-crystal cell and the DC voltage applied to the liquid-crystal cell. If the capacitive coupling driving method disclosed in Patent document 3 is adopted in a liquid-crystal display apparatus employing liquid-crystal cells made of a liquid-crystal material having a characteristic like the one shown in FIG. 3, however, the display apparatus will introduce a big demerit concerning an electric potential appearing in the display pixel circuit. The demerit is a problem of big luminance variations due to liquid-crystal gap variations/gate oxidation film thickness variations caused by manufacturing process variations or due to liquid-crystal cell relative dielectric constant variations caused by environment temperature variations. The normally white material is a typical liquid-crystal material.

In addition, an effort to optimize the black luminance faces a problem of the white luminance becoming black, that is, a problem of the white luminance sinking.

By the way, an effective pixel electric potential $\Delta V_{pix1}$ applied to the liquid-crystal cell LC21 shown in FIG. 1 is expressed by the following equation:

[Eq. 1]

$$\Delta V_{pix1} = V_{sig} + \{C_{cs}/(C_{cs}+C_{lc})\} * \Delta V_{cs} - V_{com} \quad (1)$$

Notations used in Eq. (1) given above are explained by referring to FIG. 1 as follows. Notation $\Delta V_{pix}$ denotes the effective pixel electric potential, notation $V_{sig}$ denotes a video signal voltage applied to the signal line 6, notation $C_{cs}$ denotes the capacitance of the storage capacitor Cs21, notation $C_{lc}$ denotes the capacitance of the liquid-crystal cell LC21, notation $\Delta V_{cs}$ denotes the electric potential of a capacitor signal CS applied to the storage capacitor Cs21 and notation $V_{com}$ denotes a common voltage signal applied to the common-voltage supply line 7.

As described above, an effort to optimize the black luminance faces a problem of the white luminance becoming black, that is, a problem of the white luminance sinking. The white luminance becomes black, that is, the white luminance sinks because of the term $\{C_{cs}/(C_{cs}+C_{lc})\} * \Delta V_{cs}$ of Eq. (1). That is to say, the non-linear characteristic of the dielectric constant of the liquid-crystal cell has an effect on the electric potential appearing in the effective pixel circuit.

Addressing the problems described above, inventors of the present invention have innovated a liquid-crystal display apparatus capable of optimizing both the white luminance and the black luminance.

In accordance with a first embodiment of the present invention, there is provided a display apparatus. The display apparatus includes: an available pixel section having a plurality of available pixel circuits arranged to form a matrix as available pixel circuits each including a switching device through which pixel video data is written into the available pixel circuit; and a plurality of scan lines each provided for an individual one of rows of the available pixel circuits arranged on the available pixel section to form the matrix and each used for controlling the conduction states of the switching devices each employed in one of the available pixel circuits provided on the individual row. The display apparatus further includes: a plurality of capacitor lines each provided for any individual one of the rows and each connected to the available pixel circuits provided on the individual row; a plurality of signal lines each provided for any individual one of columns of the available pixel circuits arranged on the available pixel section to form the matrix and each used for propagating the pixel video data to the available pixel circuits provided on the individual column; and a driving circuit for selectively driving the scan lines and the capacitor lines. The display apparatus further includes a monitor circuit having: a first monitor pixel section created separately from the available pixel section as a monitor pixel section employing at least one monitor pixel circuit for a positive or negative polarity; and a second monitor pixel section created separately from the available pixel section as a monitor pixel section employing at least one monitor pixel circuit for the negative or positive polarity. The display apparatus still further includes at least two of following three correction systems: a capacitor-signal correction system for correcting a capacitor signal used for driving each of the capacitor lines on the basis of electric potentials detected by the first monitor pixel section and the second monitor pixel section; a video-signal correction system for correcting a video signal propagating through each of the signal lines as a signal conveying the pixel video data on the basis of the electric potentials detected by the first monitor pixel section and the second monitor pixel section; and a common-voltage correction system for correcting the center value of a common voltage signal with the level thereof changing at time intervals determined in advance on the basis of the electric potentials detected by the first monitor pixel section and the second monitor pixel section. The display apparatus further includes a switch for selectively supplying pixel electric potentials detected by the first monitor pixel section and the second monitor pixel section to a desired one of the two or three correction systems in accordance with a selection pattern determined in advance.

In the display apparatus, each of the available pixel circuits includes a display element having a first pixel electrode as well as a second pixel electrode and a storage capacitor having a first electrode as well as a second electrode, in each of the available pixel circuits, the first pixel electrode of the display element and the first electrode of the storage capacitor are connected to one terminal of the switching device, in each of the available pixel circuits provided on any individual one of the rows, the second electrode of the storage capacitor is connected to the capacitor line provided for the individual row, and the common voltage signal with the level thereof changing at time intervals determined in advance is supplied to the second pixel electrode of each of the display elements through a common-voltage signal line common to all the available pixel circuits.

In accordance with a second embodiment of the present invention, there is provided electronic equipment provided with a display apparatus. The display apparatus includes: an available pixel section having a plurality of available pixel circuits arranged to form a matrix as available pixel circuits each including a switching device through which pixel video data is written into the available pixel circuit; and a plurality of scan lines each provided for an individual one of rows of the available pixel circuits arranged on the available pixel section to form the matrix and each used for controlling the conduction states of the switching devices each employed in one of the available pixel circuits provided on the individual row. The display apparatus further includes a plurality of capacitor lines each provided for any individual one of the rows and each connected to the available pixel circuits provided on the individual row; a plurality of signal lines each provided for any individual one of columns of the available pixel circuits arranged on the available pixel section to form the matrix and each used for propagating the pixel video data to the available pixel circuits provided on the individual column; and a driving circuit for selectively driving the scan lines and the capacitor lines. The display apparatus further includes a monitor circuit having: a first monitor pixel section created separately from the available pixel section as a monitor pixel section employing at least one monitor pixel circuit for a positive or negative polarity; and a second monitor pixel section created separately from the available pixel section as a monitor pixel section employing at least one monitor pixel circuit for the negative or positive polarity. The display apparatus still further includes at least two of following three correction systems: a capacitor-signal correction system for correcting a capacitor signal used for driving each of the capacitor lines on the basis of electric potentials detected by the first monitor pixel section and the second monitor pixel section; a video-signal correction system for correcting a video signal propagating through each of the signal lines as a signal conveying the pixel video data on the basis of the electric potentials detected by the first monitor pixel section and the second monitor pixel section; and a common-voltage correction system for correcting the center value of a common voltage signal with the level thereof changing at time intervals determined in advance on the basis of the electric potentials detected by the first monitor pixel section and the second monitor pixel section. The display apparatus further includes a switch for selectively supplying pixel electric potentials detected by the first monitor pixel section and the second monitor pixel section to a desired one of the two or three correction systems in accordance with a selection pattern determined in advance.

In the display apparatus, each of the available pixel circuits includes a display element having a first pixel electrode as well as a second pixel electrode and a storage capacitor having a first electrode as well as a second electrode, in each of the available pixel circuits, the first pixel electrode of the display element and the first electrode of the storage capacitor are connected to one terminal of the switching device, in each of the available pixel circuits provided on any individual one of the rows, the second electrode of the storage capacitor is connected to the capacitor line provided for the individual row, and the common voltage signal with the level thereof changing at time intervals determined in advance is supplied to the second pixel electrode of each of the display elements through a common-voltage signal line common to all the available pixel circuits.

The present invention offers merits of a capability of optimizing both the white luminance and the black luminance.

BRIEF DESCRIPTION OF THE DRAWINGS

These and other features according to embodiments of the present invention will become clear from the following description of the preferred embodiments given with reference to the accompanying diagrams, in which:

FIGS. 2A to 2E show timing charts of signals generated in execution of the so-called 1H Vcom inversion driving method in the ordinary liquid-crystal display apparatus shown in FIG. 1;

FIG. 3 is a diagram showing a relation between the dielectric constant ε of a normally white liquid-crystal cell and a DC voltage applied to a liquid-crystal cell;

FIGS. 6A to 6L show typical timing charts of gate pulses generated by a vertical driving circuit according to the embodiment as pulses each appearing on a gate line and capacitor signals each asserted by the vertical driving circuit on a capacitor line;

FIG. 7A is a diagram showing a typical configuration of a monitor pixel circuit employed in a first monitor pixel section whereas

FIG. 12A is a diagram showing a relation between a gate pulse and the difference in electric potential between a pixel electric potential with the negative (−) polarity and a common voltage signal whereas FIG. 12B is a diagram showing a relation between a gate pulse and the difference in electric potential between a pixel electric potential with the positive (+) polarity and the common voltage signal;

FIG. 14A is a diagram showing a state obtained as a result of a gate coupling effect and leak currents each flowing through a transistor employed in a pixel circuit in implementation of a driving method according to the embodiment for the negative (−) polarity whereas FIG. 14B is a diagram showing a state obtained as a result of a gate coupling effect and leak currents each flowing through a transistor employed in a pixel circuit in implementation of a driving method according to the embodiment for the positive (+) polarity;

FIG. 15 is a table showing causes of pixel electric-potential variations as causes, the effects of which can be eliminated by automatically adjusting the center value of the common voltage signal in accordance with the embodiment;

FIG. 17 is an explanatory diagram to be referred to in description of a typical case in which an electric potential appearing in a monitor pixel circuit changes due to an effect of a signal line supplying a video signal to a display pixel circuit as a signal varying in the middle of a frame;

FIG. 18A is a diagram showing a plurality of monitor pixel circuits typically laid out in the horizontal direction as pixel circuits simply connected to a common gate line whereas FIG. 18B is a diagram showing a plurality of monitor pixel circuits typically laid out in the vertical direction as pixel circuits simply connected to a common gate line;

FIGS. 21A and 21B are each a diagram showing a typical layout of monitor pixel sections in a monitor circuit;

FIG. 22 is a diagram showing the configuration of a pixel circuit as well as an explanatory diagram to be referred to in description of the fact that it is quite within the bounds of possibility that differences between an electric potential detected in a monitor pixel circuit and an electric potential actually appearing in a display pixel circuit are generated due to variations in display panel surface such as variations in liquid-crystal cell gap and variations in interlayer insulation film even if the monitor pixel circuit and the display pixel circuit are put in the same operating conditions;

FIG. 26A is a diagram showing an average electric-potential detection system and/or a Sig write system which are implemented as an external IC such as a COG whereas

FIG. 32 is a diagram showing a typical configuration for changing the capacitances of the additional capacitors which are provided as a COF (chip on film);

FIG. 33A is a diagram showing the waveform of an undeformed electric potential appearing in a pixel circuit in a normal operation to drive a liquid-crystal cell by making use of an AC voltage as the common voltage signal whereas FIG. 33B is an explanatory diagram showing the waveform of a deformed electric potential in the case of a system in which a switch is put in shorted and open states alternately and repetitively in order to detect the electric potential;

FIG. 34 is an explanatory diagram to be referred to in description of a method for preventing an electric potential detected from a monitor pixel circuit from being deformed as a result of a process to put a detection line conveying the detected electric potential in a shorted state;

FIG. 35 is a diagram showing the configuration of a pixel circuit as well as an explanatory diagram to be referred to in concrete description of the method for preventing an electric potential detected from a monitor pixel circuit from being deformed as a result of a process to put a detection line conveying the detected electric potential in a shorted state;

FIGS. 40A to 40C are each an explanatory diagram to be referred to in description of causes of the difference in generated electric potential between a display pixel circuit and a monitor pixel circuit;

FIG. 41A is a diagram showing a layout model of an available pixel circuit (also referred to as a display pixel circuit) according to the embodiment whereas FIG. 41B is a diagram showing a layout model of a monitor pixel circuit (also referred to as a detection pixel circuit) according to the embodiment;

FIGS. 42A and 42B are each an explanatory diagram to be referred to in description of a method for making the time constants of gate lines match each other;

FIGS. 44A to 44E show the timing charts of main signals driving a liquid-crystal cell in the embodiment;

FIG. 45 is a diagram showing capacitances of a pixel circuit as capacitances used in Eq. 4;

DETAILED DESCRIPTION OF THE PREFERRED EMBODIMENTS

Preferred embodiments of the present invention are explained in detail by referring to diagrams as follows.

Figure 1:
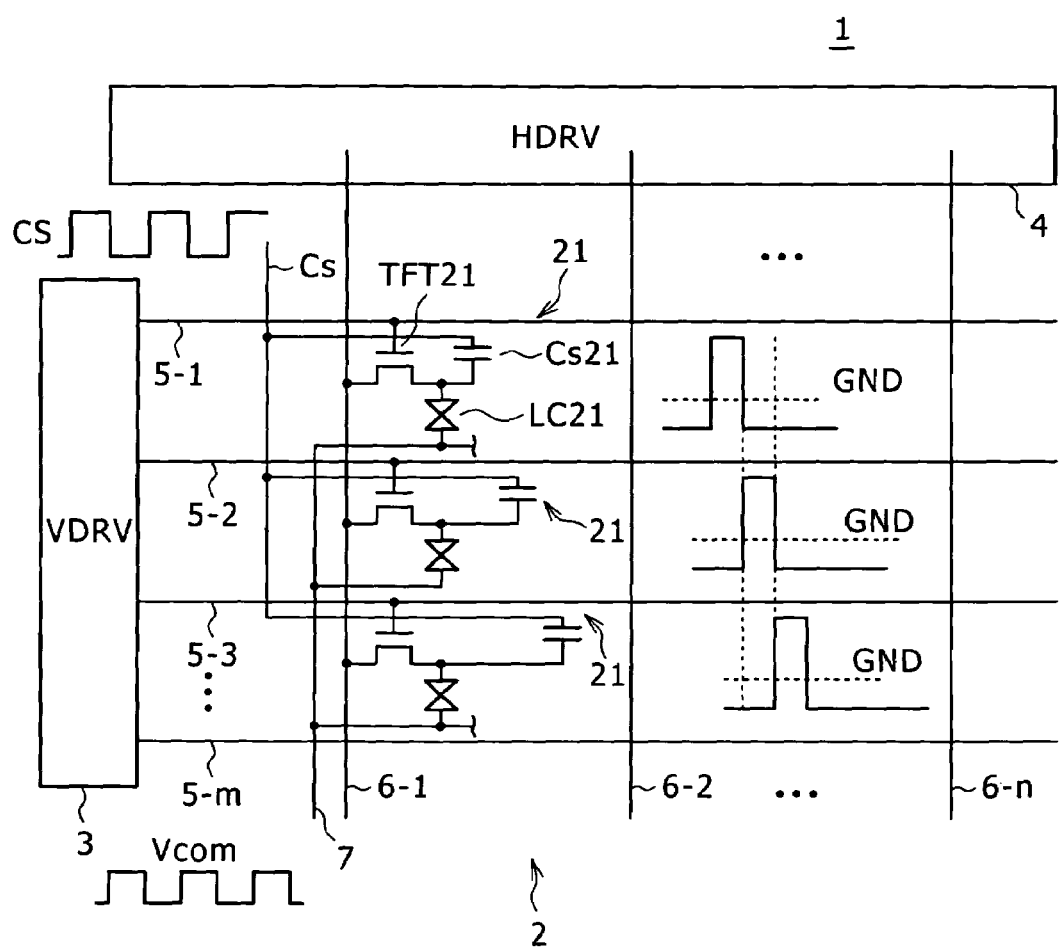
FIG. 1 is a block diagram showing a typical configuration of an ordinary liquid-crystal display apparatus.
Figure 4:
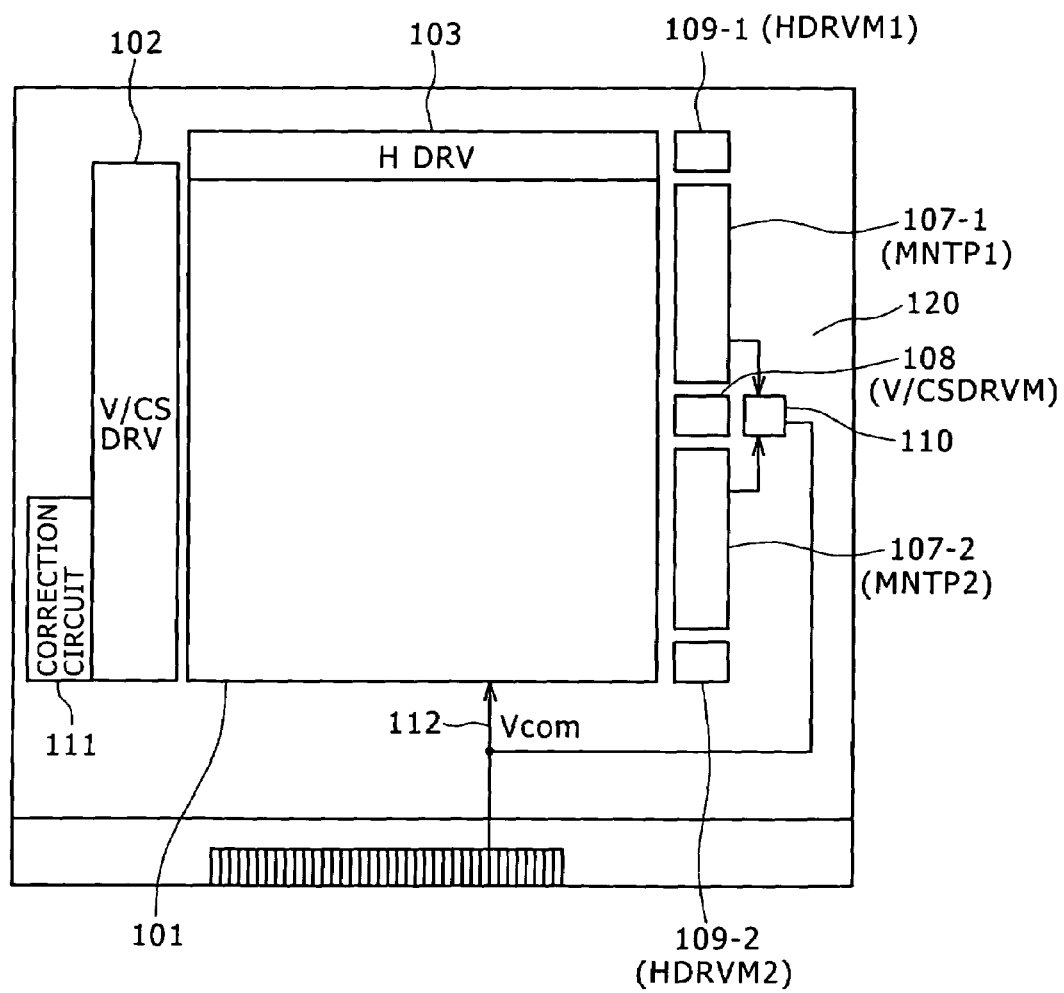
FIG. 4 is a diagram showing a typical configuration of an active-matrix display apparatus implemented by an embodiment of the present invention.
Figure 5:
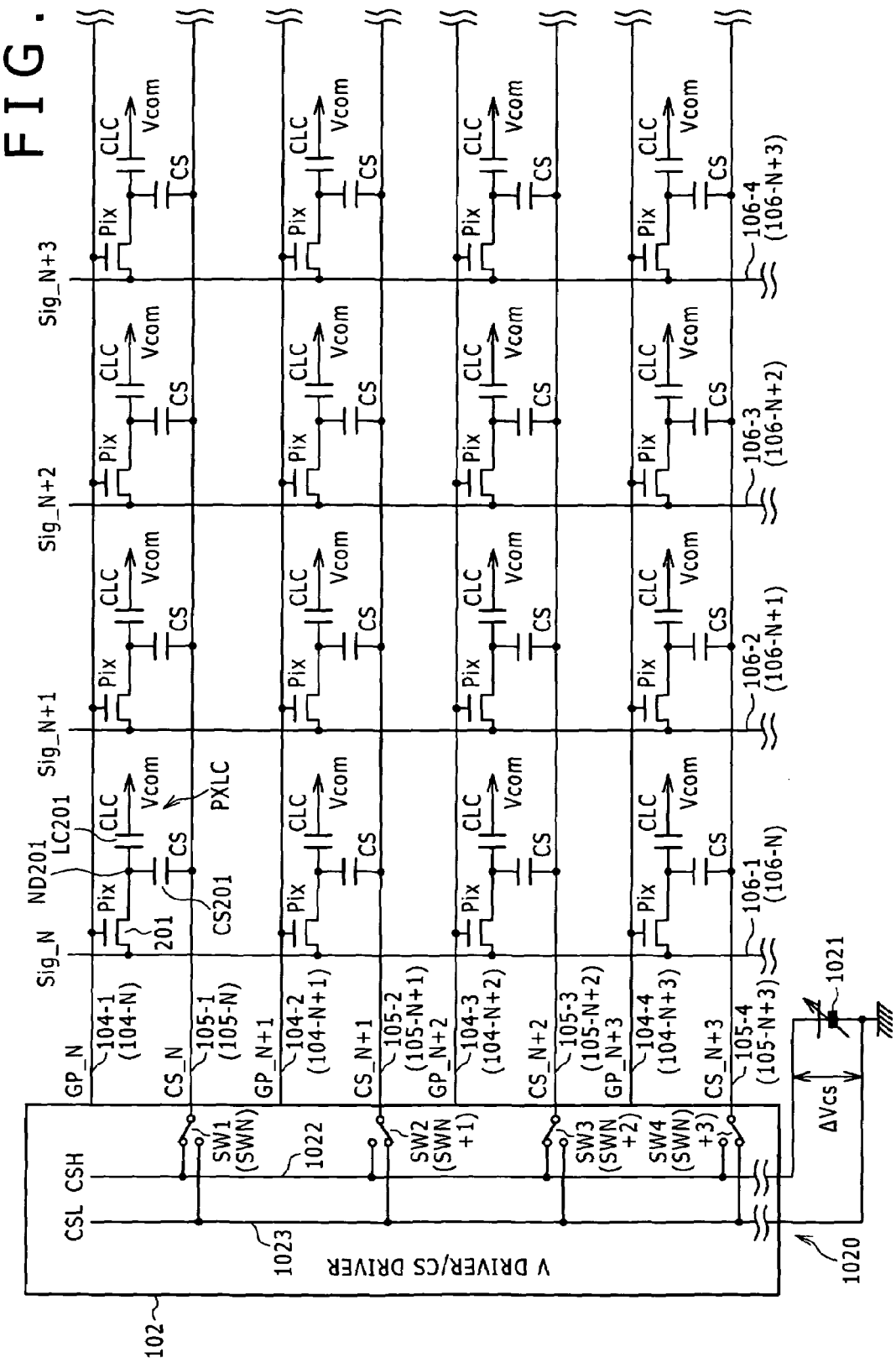
FIG. 5 is a circuit diagram showing a typical concrete configuration of an available pixel section employed in the active-matrix display apparatus shown in the diagram of FIG. 4.

FIG. 4 is a diagram showing a typical configuration of an active-matrix display apparatus 100 implemented by an embodiment of the present invention as a display apparatus employing typically a liquid-crystal cell as a display element (also referred to as an electro optical device) in each pixel circuit. FIG. 5 is a circuit diagram showing a typical concrete configuration of an available pixel section 101 of the active-matrix display apparatus 100 shown in the diagram of FIG. 4.

As shown in FIGS. 4 and 5, the active-matrix display apparatus 100 has main components including the available pixel section 101, a vertical driving circuit (V/CSDRV) 102, a horizontal driving circuit (HDRV) 103, gate lines (each also referred to as a scan line) 104-1 to 104-$m$, capacitor lines (each also referred to as a storage line) 105-1 to 105-$m$, signal lines 106-1 to 106-$n$, a first monitor (dummy) pixel section (MNTP1) 107-1, a second monitor pixel section (MNTP2) 107-2, a monitor vertical driving circuit (V/CSDRVM) 108 serving as a vertical driving circuit common to the first monitor pixel section 107-1 and the second monitor pixel section 107-2, a first monitor horizontal driving circuit (HDRVM1) 109-1 designed especially for the first monitor pixel section 107-1, a second monitor horizontal driving circuit (HDRVM2) 109-2 designed especially for the second monitor pixel section 107-2, a detection-result output circuit 110 and a correction circuit 111.

In this embodiment, a monitor circuit 120 provided independently at a location adjacent to the available pixel section 101 (in the diagram of FIG. 4, a location on the right side of the available pixel section 101) includes the first monitor pixel section 107-1 having one monitor pixel circuit or a plurality of monitor pixel circuits, the second monitor pixel section 107-2 also having one monitor pixel circuit or a plurality of monitor pixel circuits, the monitor vertical driving circuit (V/CSDRVM) 108 serving as a vertical driving circuit common to the first monitor pixel section 107-1 and the second monitor pixel section 107-2, the first monitor horizontal driving circuit (HDRVM1) 109-1 designed especially for the first monitor pixel section 107-1, the second monitor horizontal driving circuit (HDRVM2) 109-2 designed especially for the second monitor pixel section 107-2 and the detection-result output circuit 110. The first monitor pixel section 107-1, the second monitor pixel section 107-2, the monitor vertical driving circuit (V/CSDRVM) 108, the first monitor horizontal driving circuit (HDRVM1) 109-1, the second monitor horizontal driving circuit (HDRVM2) 109-2 and the detection-result output circuit 110 are provided independently of each other.

In addition, the vertical driving circuit 102 is provided at a location adjacent to the available pixel section 101. In the diagram of FIG. 4, the vertical driving circuit 102 is provided a location on the left side of the available pixel section 101. On the other hand, the horizontal driving circuit 103 is provided at a location adjacent to the available pixel section 101. In the diagram of FIG. 4, the horizontal driving circuit 103 is provided at a location above the available pixel section 101.

As will be described later in detail, this embodiment basically adopts a driving method by which, after the falling edge of a gate pulse GP asserted on a specific one of the gate lines 104-1 to 104-$m$, that is, after a video signal is written into a pixel circuit PXLC connected to the specific gate line 104, the capacitor lines 105-1 to 105-$m$ each provided independently for a row of the matrix are driven as described above, resulting in a capacitive coupling effect of the storage capacitor Cs201 employed in each of the pixel circuits PXLC and, in each of the pixel circuits PXLC, an electric potential appearing on the node ND201 is changed due to the capacitive coupling effect in order to modulate a voltage applied to the liquid-crystal cell LC201.

Then, in the course of an actual driving operation according to this driving method, as will be described later, the monitor circuit detects an electric potential found as an average of detected electric potentials appearing in monitor pixel circuits PXLC of the first monitor pixel section 107-1 and the second monitor pixel section 107-2, which are provided besides the available pixel section 101, as electric potentials having the positive and negative polarities and automatically corrects the center value of a common voltage signal Vcom on the basis of the detected electric-potential average. The center value of the common voltage signal Vcom is corrected by feeding back the average to the reference driver 140 in order to optimize the common voltage signal Vcom. The electric potential appearing in a monitor pixel circuit PXLC is an electric potential appearing on the connection node ND201 of the monitor pixel circuit PXLC.

In addition, as will be described later, the embodiment corrects the capacitor signal CS output by the CS driver in accordance with monitor pixel electric potentials detected from the first monitor pixel section 107-1 and the second monitor pixel section 107-2 in order to set the electric potential of each pixel circuit PXLC in the available pixel section 101 at a certain level.

The function and configuration of the monitor circuit as well as a capacitor-signal correction system for correcting the capacitor signal CS will be described later in detail.

As shown in FIG. 5, the available pixel section 101 has a plurality of pixel circuits PXLC arranged to form an m×n matrix where notation m denotes the number of rows in the matrix whereas notation n denotes the number of columns in the matrix. It is to be noted that, in order to make the diagram of FIG. 5 simple, the pixel circuits PXLC are arranged to form a 4×4 matrix.

As shown in the diagram of FIG. 5, each of the pixel circuits PXLC includes a thin-film transistor TFT201 functioning as a switching device, a liquid-crystal cell LC201 and a storage capacitor Cs201. The first pixel electrode of the liquid-crystal cell LC201 is connected to the drain (or the source) of the thin-film transistor TFT201. The drain (or the source) of the thin-film transistor TFT201 is also connected to the first electrode of the storage capacitor Cs201.

It is to be noted that the point of connection between the drain electrode of the thin-film transistor TFT201, the first pixel electrode of the liquid-crystal cell LC201 and the first electrode of the storage capacitor Cs201 forms a node ND201.

Each of scan lines (each also referred to as a gate line) 104-1 to 104-m and each of the capacitor lines 105-1 to 105-m are provided for a row of the matrix. The scan line 104 is connected to the gate electrode of the thin-film transistor TFT201 employed in each of the pixel circuits PXLC provided on the row. The scan lines 104-1 to 104-m and the capacitor lines 105-1 to 105-m are arranged in the column direction. On the other hand, signal lines 106-1 to 106-n arranged in the row direction are each provided for a column of the matrix.

The gate electrodes of the thin-film transistors TFT201 employed in the pixel circuits PXLC provided on a row are connected to a scan line (one of the scan lines 104-1 to 104-m) provided for the row. By the same token, the second electrodes of the storage capacitors Cs201 employed in the pixel circuits PXLC provided on a row are connected to a capacitor line (one of the capacitor lines 105-1 to 105-m) provided for the row.

On the other hand, the source (or drain) electrodes of the thin-film transistors TFT201 employed in the pixel circuits PXLC provided on a column are connected to a signal line (one of the signal lines 106-1 to 106-n) provided for the column. The second pixel electrodes of the liquid-crystal cells LC201 employed in the pixel circuits PXLC are connected to a supply line 112 serving as a line common to all the liquid-crystal cells LC201. The supply line 112 is a line used for providing a common voltage signal Vcom, which is a series of pulses with a small amplitude and a polarity typically changing once every horizontal scan period. A horizontal scan period is referred to as 1H. The common voltage signal Vcom will be described in detail later.

Each of the gate lines 104-1 to 104-m is driven by a gate driver employed in the vertical driving circuit 102 shown in the diagram of FIG. 4 whereas each of the capacitor lines 105-1 to 105-m is driven by a capacitor driver (also referred to as a CS driver) also employed in the vertical driving circuit 102. On the other hand, each of the signal lines 106-1 to 106-n is driven by the horizontal driving circuit 103.

The vertical driving circuit 102 basically scans the rows of the matrix in the vertical direction or the row-arrangement direction in one field period. In the scan operation, the vertical driving circuit 102 scans the rows sequentially in order to select a row at one time, that is, in order to select pixel circuits PXLC provided on a selected row as pixel circuits connected to a gate line (one of the gate lines 104-1 to 104-m) provided for the selected row. To put it in detail, the vertical driving circuit 102 asserts a gate pulse GP1 on the gate line 104-1 in order to select pixel circuits PXLC provided on the first row. Then, the vertical driving circuit 102 asserts a gate pulse GP2 on the gate line 104-2 in order to select pixel circuits PXLC provided on the second row. Thereafter, the vertical driving circuit 102 sequentially asserts gate pulses GP3 . . . and GPm on the gate lines 104-3 . . . and 104-m respectively in the same way.

In addition, the capacitor lines 105-1 to 105-m are provided independently of each other for respectively the gate lines 104-1 to 104-m which are each provided for one of the rows of the matrix. The vertical driving circuit 102 also asserts capacitor signals CS1 to CSm on the capacitor lines 105-1 to 105-m respectively. Each of the capacitor signals CS1 to CSm is set selectively at a first level CSH such as a voltage in the range 3 to 4 V or a second level CSL such as 0 V.

FIGS. 6A to 6L show typical timing charts of the gate pulses GP1 to GPm generated by the vertical driving circuit 102 as pulses appearing on the gate lines 104-1 to 104m respectively and the capacitor signals CS1 to CSm asserted by the vertical driving circuit 102 on the capacitor lines 105-1 to 105-m respectively. To be more specific, FIG. 6A shows a typical timing chart of a signal LSCS supplied to the vertical driving circuit 102 as a signal used for recognizing the polarity, FIG. 6B shows a typical timing chart of a pulse Gate_DT asserted on a dummy gate line shown in none of the figures as a gate line outside an area in which the gate lines 104-1 to 104-m are provided, FIGS. 6C to 6G show respectively typical timing charts of gate pulses GP1, GP2, GP3, GP4 and GP5 asserted on respectively the gate lines 104-1, 104-2, 104-3, 104-4 and 104-5 shown in the diagram of FIG. 5, FIG. 6H shows a typical timing chart of a pulse CS_DT asserted on a dummy capacitor line shown in none of the figures as a capacitor line outside an area in which the capacitor lines 105-1 to 105-m are provided and FIGS. 6I to 6L show respectively typical timing charts of capacitor pulses CS_1, CS_2, CS_3 and CS_4 asserted on respectively the capacitor lines 105-1, 105-2, 105-3 and 105-4 shown in the diagram of FIG. 5.

The vertical driving circuit 102 drives the gate lines 104-1 to 104-m and the capacitor lines 105-1 to 105-m sequentially, starting typically from the first gate line 104-1 and the first capacitor line 105-1 respectively. After a gate pulse GP is asserted on a gate line (one of the gate lines 104-1 to 104m) in order to write a video signal into a pixel circuit PXLC connected to the gate line, with the timing of the rising edge of a gate pulse asserted on the next gate line 104, the level of the capacitor signal (one of the capacitor signals CS1 to CSm) conveyed by the capacitor line (one of the capacitor lines 105-1 to 105-m) connected to the pixel circuit PXLC to supply the capacitor signal to the pixel circuit PXLC is changed from the first level CSH to the second level CSL or vice versa. The capacitor signals CS1 to CSm conveyed by the capacitor lines 105-1 to 105-m are set at the first level CSH or the second level CSL in an alternate way described as follows.

For example, when the vertical driving circuit 102 supplies the capacitor signal CS1 set at the first level CSH to the pixel circuit PXLC through the first capacitor line 105-1, the vertical driving circuit 102 then supplies the capacitor signal CS2 set at the second level CSL to the pixel circuit PXLC through the second capacitor line 105-2, the capacitor signal CS3 set at the first level CSH to the pixel circuit PXLC through the third capacitor line 105-3 and the capacitor signal CS4 set at the second level CSL to the pixel circuit PXLC through the fourth capacitor line 105-4 subsequently. In the same way, the vertical driving circuit 102 thereafter sets the capacitor signals CS5 to CSm at the first level CSH or the second level CSL alternately and supplies the capacitor signals CS5 to CSm to the pixel circuit PXLC through the capacitor lines 105-5 to 105-m respectively.

When the vertical driving circuit 102 supplies the capacitor signal CS1 set at the second level CSL to the pixel circuit PXLC through the first capacitor line 105-1, on the other hand, the vertical driving circuit 102 then supplies the capacitor signal CS2 set at the first level CSH to the pixel circuit PXLC through the second capacitor line 105-2, the capacitor signal CS3 set at the second level CSL to the pixel circuit PXLC through the third capacitor line 105-3 and the capacitor signal CS4 set at the first level CSH to the pixel circuit PXLC through the fourth capacitor line 105-4 subsequently. In the same way, the vertical driving circuit 102 thereafter sets the capacitor signals CS5 to CSm at the first level CSH or the second level CSL alternately and supplies the capacitor signals CS5 to CSm to the pixel circuit PXLC through the capacitor lines 105-5 to 105-m respectively.

In this embodiment, after the falling edge of a gate pulse GP asserted on a specific one of the gate lines 104-1 to 104-m, that is, after a video signal is written into a pixel circuit PXLC connected to the specific gate line 104, the capacitor lines 105-1 to 105-m are driven as described above, resulting in a capacitive coupling effect of the storage capacitor Cs201 employed in each of the pixel circuits PXLC and, in each of the pixel circuits PXLC, an electric potential appearing on the node ND201 is changed due to the capacitive coupling effect in order to modulate a voltage applied to the liquid-crystal cell LC201.

Then, in the course of an actual driving operation according to this driving method, as will be described later, the monitor circuit detects an electric potential found as an average of detected electric potentials appearing on monitor pixel circuits PXLC of the first monitor pixel section 107-1 and the second monitor pixel section 107-2, which are provided besides the available pixel section 101, as electric potentials having the positive and negative polarities and automatically corrects the center value of a common voltage signal Vcom on the basis of the detected electric-potential average. The center value of the common voltage signal Vcom is corrected by feeding back the average to the reference driver 140 in order to optimize the common voltage signal Vcom. The electric potential appearing on a monitor pixel circuit PXLC is an electric potential appearing on the connection node ND201 of the monitor pixel circuit PXLC.

In addition, as will be described later, the embodiment corrects the capacitor signal CS output by the CS driver in accordance with monitor pixel electric potentials detected from the first monitor pixel section 107-1 and the second monitor pixel section 107-2 in order to set the electric potential of each pixel circuit PXLC in the available pixel section 101 at a certain level.

FIG. 5 also shows a model of a typical level select output section of a CS driver 1020 employed in the vertical driving circuit 102. As shown in the figure, the CS driver 1020 includes a variable power supply 1021, a first-level supply line 1022, a second-level supply line 1023 and switches SW1 to SWm for selectively connecting the first-level supply line 1022 or the second-level supply line 1023 to the capacitor lines 105-1 to 105-m respectively. The first-level supply line 1022 which is connected to the positive terminal of the variable power supply 1021 is a line for conveying a voltage of the first level CSH. On the other hand, the second-level supply line 1023 which is connected to the negative terminal of the variable power supply 1021 is a line for conveying a voltage of the second level CSL.

Notation ΔVcs shown in the diagram of FIG. 5 denotes the difference between the first level CSH and the second level CSL. In the following description, this difference is also referred to as a CS electric potential ΔVcs.

As will be described later in detail, each of the CS electric potential ΔVcs and an amplitude ΔVcom is set at such a value that both the black luminance and the white luminance can be optimized. The amplitude ΔVcom is the amplitude of the AC common voltage signal Vcom having a small amplitude. As will be described later, for example, in the case of a white display, each of the CS electric potential ΔVcs and the amplitude ΔVcom is set at such a value that an effective pixel electric potential ΔVpix_W applied to the liquid-crystal does not exceed 0.5 V.

The vertical driving circuit 102 includes a set of vertical shift registers VSR. That is to say, the vertical driving circuit 102 employs a plurality of aforementioned vertical shift registers VSR. Each of the vertical shift registers VSR is provided for one of gate buffers connected to the gate lines 104-1 to 104-m each provided for one of the rows composing the matrix of pixel circuits. Each of the vertical shift registers VSR receives a vertical start pulse VST generated by a clock generator not shown in the figure as a pulse serving as a command to start a vertical scan operation and a vertical clock signal VCK generated by the clock generator as a clock signal serving as the reference of the vertical scan operation. It is to be noted that, in place of the vertical clock signal VCK, vertical clock signals VCK and VCKX having phases opposite to each other can be used.

For example, a vertical shift register VSR starts a shift operation with the timing of the vertical start pulse VST synchronously with the vertical clock signal VCK in order to supply pulses to a gate buffer associated with the vertical shift register VSR.

In addition, the vertical start pulse VST can also be supplied to the vertical shift registers VSR sequentially from a component above or below the available pixel section 101.

Thus, on the basis of the vertical start pulse VST and the vertical clock signal VCK, the shift registers VSR employed in the vertical driving circuit 102 sequentially supply gate pulses to the gate lines 104-1 to 104-m by turns by way of the gate buffers as pulses for driving the gate lines 104-1 to 104-m.

On the basis of a horizontal start pulse HST serving as a command to start a horizontal scan operation and a horizontal clock signal HCK serving as the reference signal of a horizontal scan operation, the horizontal driving circuit 103 sequentially samples the input video signal Vsig every 1H or for each horizontal scan period H in order to write the input video signal Vsig at one time into the pixel circuits PXLC provided on a row, which is selected by the vertical driving circuit 102, through the signal lines 106-1 to 106-n. It is to be noted that, in place of the horizontal clock HCK, vertical clocks HCK and HCKX having phases opposite to each other can be used.

The configuration of the monitor circuit 120 according to the embodiment as well as its functions is explained as follows.

As described earlier, the monitor circuit 120 provided at a location adjacent to the available pixel section 101 (in the diagram of FIG. 4, a location on the right side of the available pixel section 101) includes the first monitor pixel section 107-1 having one monitor pixel circuit or a plurality of monitor pixel circuits, the second monitor pixel section 107-2 also having one monitor pixel circuit or a plurality of monitor pixel circuits, the monitor vertical driving circuit (V/CSDRVM) 108 serving as a vertical driving circuit, the first monitor horizontal driving circuit (HDRVM1) 109-1, the second monitor horizontal driving circuit (HDRVM2) 109-2 and the detection-result output circuit 110. The first monitor pixel section 107-1, the second monitor pixel section 107-2, the monitor vertical driving circuit (V/CSDRVM) 108, the first monitor horizontal driving circuit (HDRVM1) 109-1, the second monitor horizontal driving circuit (HDRVM2) 109-2 and the detection-result output circuit 110 are provided independently of each other.

Figure 7A:
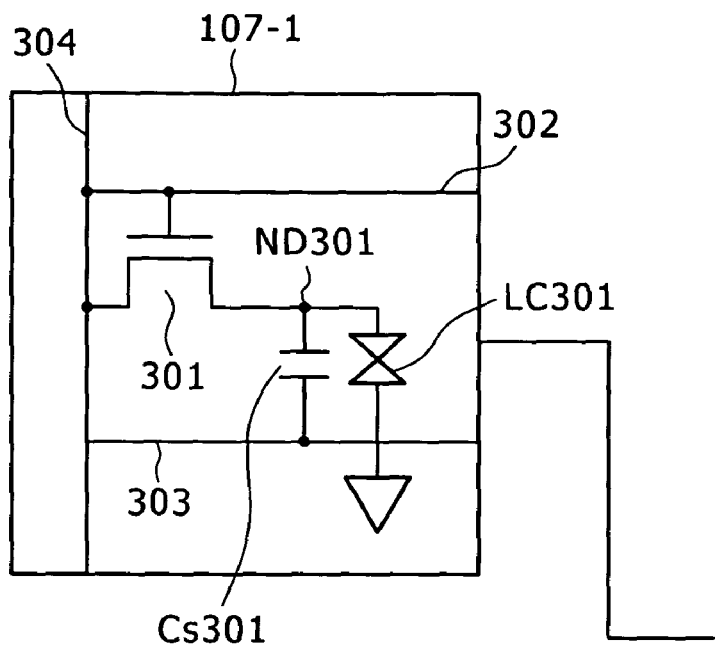
Figure 7B:
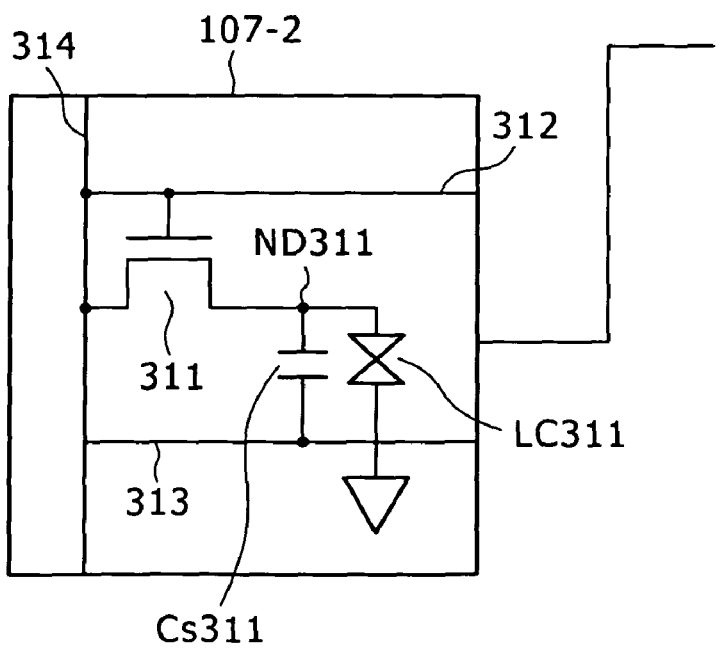
FIG. 7B is a diagram showing a typical configuration of a monitor pixel circuit employed in a second monitor pixel section.

The configuration of a monitor (dummy) pixel circuit or each of monitor (dummy) pixel circuits included in the first monitor pixel section 107-1 and the second monitor pixel section 107-2 is basically identical with the configuration of each of pixel circuits included in the available pixel section 101. FIG. 7A is a diagram showing a typical configuration of the first monitor pixel circuit PXLCM1 included in the first monitor pixel section 107-1 whereas FIG. 7B is a diagram showing a typical configuration of the second monitor pixel circuit PXLCM2 included in the second monitor pixel section 107-2.

As shown in the diagram of FIG. 7A, the first monitor pixel circuit PXLCM1 included in the first monitor pixel section 107-1 employs a thin-film transistor TFT301 serving as a switching device, a liquid-crystal cell LC301 and a storage capacitor Cs301. The first pixel electrode of the liquid-crystal cell LC301 is connected to the drain electrode (or the source electrode) of the thin-film transistor TFT301. The first electrode of the storage capacitor Cs301 is also connected to the drain electrode (or the source electrode) of the thin-film transistor TFT301.

It is to be noted that the first pixel electrode of the liquid-crystal cell LC301, the drain electrode (or the source electrode) of the thin-film transistor TFT301 and the first electrode of the storage capacitor Cs301 form a node ND301.

The gate electrode of the thin-film transistor TFT301 employed in the first monitor pixel circuit PXLCM1 is connected to a gate line 302 common to all first pixel circuits PXLCM1 provided on a row. The second electrode of the storage capacitor Cs301 employed in the first monitor pixel circuit PXLCM1 is connected to a capacitor line 303 common to all first pixel circuits PXLCM1 provided on a row. The source electrode (or the drain electrode) of the thin-film transistor TFT301 employed in the first monitor pixel circuit PXLCM1 is connected to a signal line 304 common to all first monitor pixel circuits PXLCM1 on a column. The second electrode of the liquid-crystal cell LC301 employed in the first monitor pixel circuit PXLCM1 is connected to a supply line 112 for conveying typically the common voltage signal Vcom with a small amplitude and a polarity inverted every horizontal scan period. In the following description, a horizontal scan period is referred to as 1H. The supply line 112 is a line common to all first monitor pixel circuits PXLCM1.

The gate line 302 is driven by a gate driver employed in the monitor vertical driving circuit 108 whereas the capacitor line 303 is driven by a capacitor driver (also referred to as a CS driver) also employed in the monitor vertical driving circuit 108. The signal line 304 is driven by a first monitor horizontal driving circuit 109-1.

As shown in the diagram of FIG. 7B, by the same token, the second monitor pixel circuit PXLCM2 included in the second monitor pixel section 107-2 employs a thin-film transistor TFT311 serving as a switching device, a liquid-crystal cell LC311 and a storage capacitor Cs311. The first pixel electrode of the liquid-crystal cell LC311 is connected to the drain electrode (or the source electrode) of the thin-film transistor TFT311. The first electrode of the storage capacitor Cs311 is also connected to the drain electrode (or the source electrode) of the thin-film transistor TFT311.

It is to be noted that the first pixel electrode of the liquid-crystal cell LC311, the drain electrode (or the source electrode) of the thin-film transistor TFT311 and the first electrode of the storage capacitor Cs311 form a node ND311.

The gate electrode of the thin-film transistor TFT311 employed in the second monitor pixel circuit PXLCM2 is connected to a gate line 312 common to all second monitor pixel circuits PXLCM2 provided on a row. The second electrode of the storage capacitor Cs311 employed in the second monitor pixel circuit PXLCM2 is connected to a capacitor line 313 common to all second monitor pixel circuits PXLCM2 provided on a row. The source electrode (or the drain electrode) of the thin-film transistor TFT311 employed in the second monitor pixel circuit PXLCM2 is connected to a signal line 314 common to all second monitor pixel circuits PXLCM2 on a column. The second electrode of the liquid-crystal cell LC311 employed in the second monitor pixel circuit PXLCM2 is connected to the aforementioned supply line 112 for conveying typically the common voltage signal Vcom with a small amplitude and a polarity inverted every horizontal scan period. In the following description, a horizontal scan period is referred to as 1H.

The gate line 312 is driven by a gate driver employed in the monitor vertical driving circuit 108 whereas the capacitor line 313 is driven by a capacitor driver (or a CS driver) also employed in the monitor vertical driving circuit 108. The signal line 314 is driven by a second monitor horizontal driving circuit 109-2.

In the typical configuration shown in the diagram of FIG. 4, the monitor vertical driving circuit 108 is a circuit common to the first monitor pixel section 107-1 and the second monitor pixel section 107-2. The basic function of the monitor vertical driving circuit 108 is identical with the function of the vertical driving circuit 102 for driving the available pixel section 101.

By the same token, the basic functions of the first monitor horizontal driving circuit 109-1 and the second monitor horizontal driving circuit 109-2 are each identical with the function of the horizontal driving circuit 103 for driving the available pixel section 101.

When the first monitor pixel circuit PXLCM1 employed in the first monitor pixel section 107-1 is driven as a pixel circuit having a positive polarity, the second monitor pixel circuit PXLCM2 employed in the second monitor pixel section 107-2 is driven as a pixel circuit having a negative polarity. When the first monitor pixel circuit PXLCM1 employed in the first monitor pixel section 107-1 is driven as a pixel circuit having a negative polarity, on the other hand, the second monitor pixel circuit PXLCM2 employed in the second monitor pixel section 107-2 is driven as a pixel circuit having a positive polarity.

The first monitor pixel circuit PXLCM1 employed in the first monitor pixel section 107-1 is driven as a pixel circuit having a positive polarity and as a pixel circuit having a negative polarity alternately, being switched from the positive polarity to the negative polarity and vice versa at time intervals of typically one horizontal scan period referred to as 1H. By the same token, the second monitor pixel circuit PXLCM2 employed in the second monitor pixel section 107-2 is also driven as a pixel circuit having a positive polarity and as a pixel circuit having a negative polarity alternately, being switched from the positive polarity to the negative polarity and vice versa at time intervals of typically one horizontal scan period.

The method for driving the available pixel section 101 in accordance with this embodiment is basically a method whereby, after the falling edge of a gate pulse GP asserted on a specific one of the gate lines 104-1 to 104-$m$, that is, after pixel video data from a signal line (that is, one of the signal lines 106-1 to 106-$n$) is written into a pixel circuit PXLC connected to the specific gate line 104, the capacitor lines 105-1 to 105-$m$ each connected independently for one of the rows are driven as described above, resulting in a capacitive coupling effect of the storage capacitor Cs201 employed in each of the pixel circuits PXLC and, in each of the pixel circuits PXLC, an electric potential appearing on the node ND201 is changed due to the capacitive coupling effect in order to modulate a voltage applied to the liquid-crystal cell LC201.

While a driving operation is being carried out in accordance with the driving method, the detection-result output circuit 110 employed in the monitor circuit 120 detects an average of the electric potentials of the monitor pixel circuits having positive and negative polarities as an average electric potential. The monitor pixel circuits having positive and negative polarities are the first monitor pixel circuit PXLCM1 driven as a pixel circuit having a positive or negative polarity and the second monitor pixel circuit PXLCM2 driven as a pixel circuit having a negative or positive polarity. The electric potential of the first monitor pixel circuit PXLCM1 is an electric potential appearing on the node ND301 whereas the electric potential of the second monitor pixel circuit PXLCM2 is an electric potential appearing on the node ND311.

The monitor circuit 120 then outputs the average electric potential from an output circuit 125 employed in the detection-result output circuit 110 in order to automatically adjust the center value of the common voltage signal Vcom.

Figure 8:
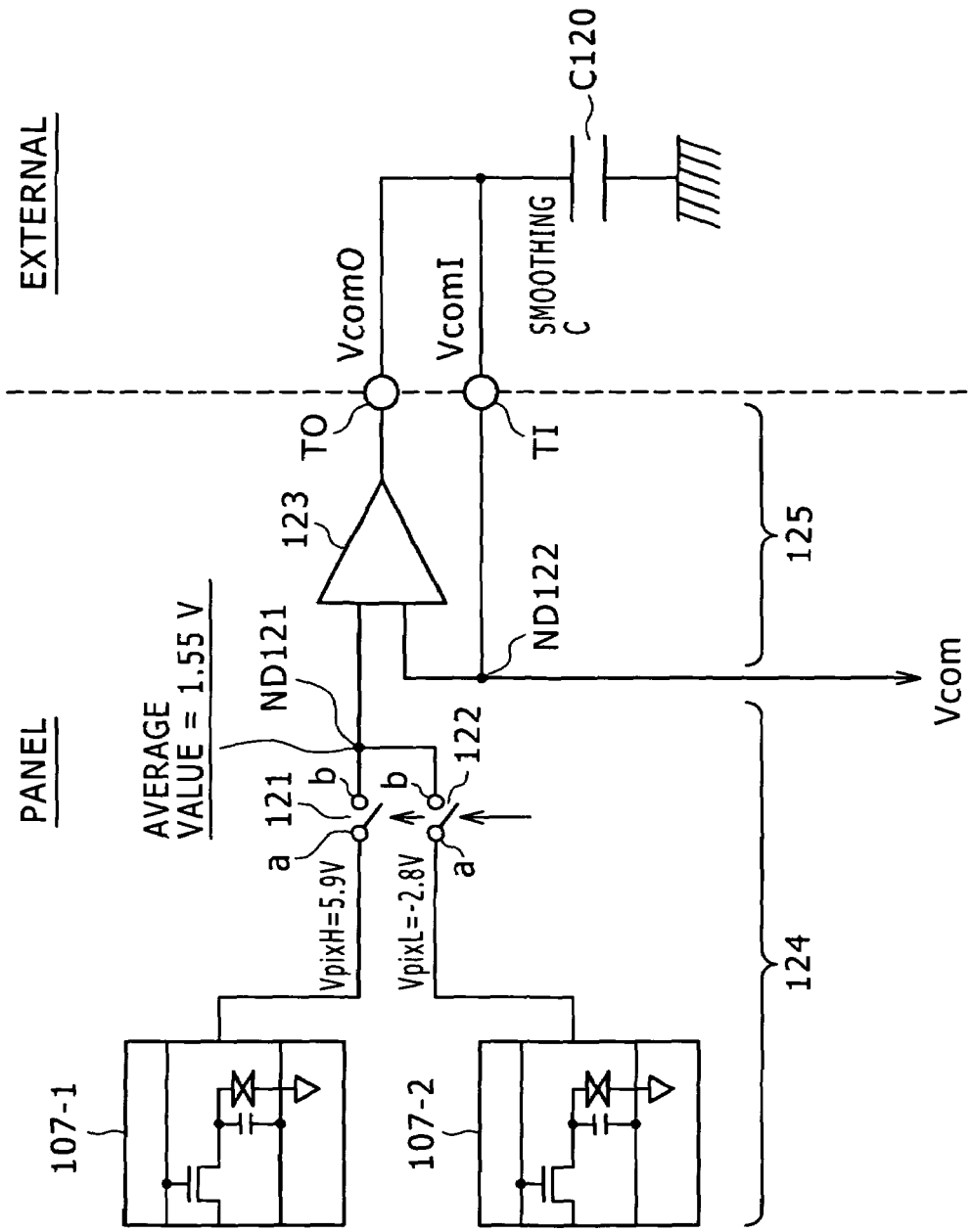
FIG. 8 is a diagram referred to in description of the basic concept of a monitor circuit according to the embodiment.

FIG. 8 is a diagram referred to in description of the basic concept of the monitor circuit 120 according to the embodiment. The monitor circuit 120 is shown in the diagram of FIG. 8 as a circuit not including the monitor vertical driving circuit 108, the first monitor horizontal driving circuit 109-1 and the second monitor horizontal driving circuit 109-2 only to make the diagram simple. In addition, in the monitor circuit 120 shown in the diagram of FIG. 8, as an example, the first monitor pixel section 107-1 is driven as a pixel circuit having a positive polarity whereas the second monitor pixel section 107-2 is driven as a pixel circuit having a negative polarity.

The detection-result output circuit 110 included in the monitor circuit 120 shown in the diagram of FIG. 8 employs switches 121 and 122 as well as a comparison-result output section 123. A smoothing capacitor C120 outside the liquid-crystal display panel is connected to an output terminal TO and an input terminal TI, which face the outside of the liquid-crystal display panel. In this case, by the liquid-crystal display panel, the active-matrix display apparatus 100 shown in the diagram of FIG. 4 is meant. The smoothing capacitor C120 is a capacitor for smoothing the common voltage signal Vcom.

The first monitor pixel section 107-1, the second monitor pixel section 107-2 as well as the switches 121 and 122, which are employed in the monitor circuit 120, form an average electric-potential detection circuit 124. On the other hand, the comparison-result output section 123 functions as the output circuit 125 cited above.

The active contact point "a" of the switch 121 is connected to a terminal supplying an electric potential detected by the first monitor pixel section 107-1 whereas the passive contact point "b" of the switch 121 is connected to the first input terminal of the comparison-result output section 123. By the same token, the active contact point "a" of the switch 122 is connected to a terminal supplying an electric potential detected by the second monitor pixel section 107-2 whereas the passive contact point "b" of the switch 122 is also connected to the first input terminal of the comparison-result output section 123. That is to say, the passive contact points b of the switches 121 and 122 are both connected to the first input terminal of the comparison-result output section 123 through a connection point which serves as a node ND121.

The second input terminal of the comparison-result output section 123 is connected to a connection point serving as a node ND122 between the input terminal TI and the line 112 supplying the common voltage signal Vcom. The comparison-result output section 123 supplies the common voltage signal Vcom having the center value thereof adjusted to the output terminal TO.

Figure 9:
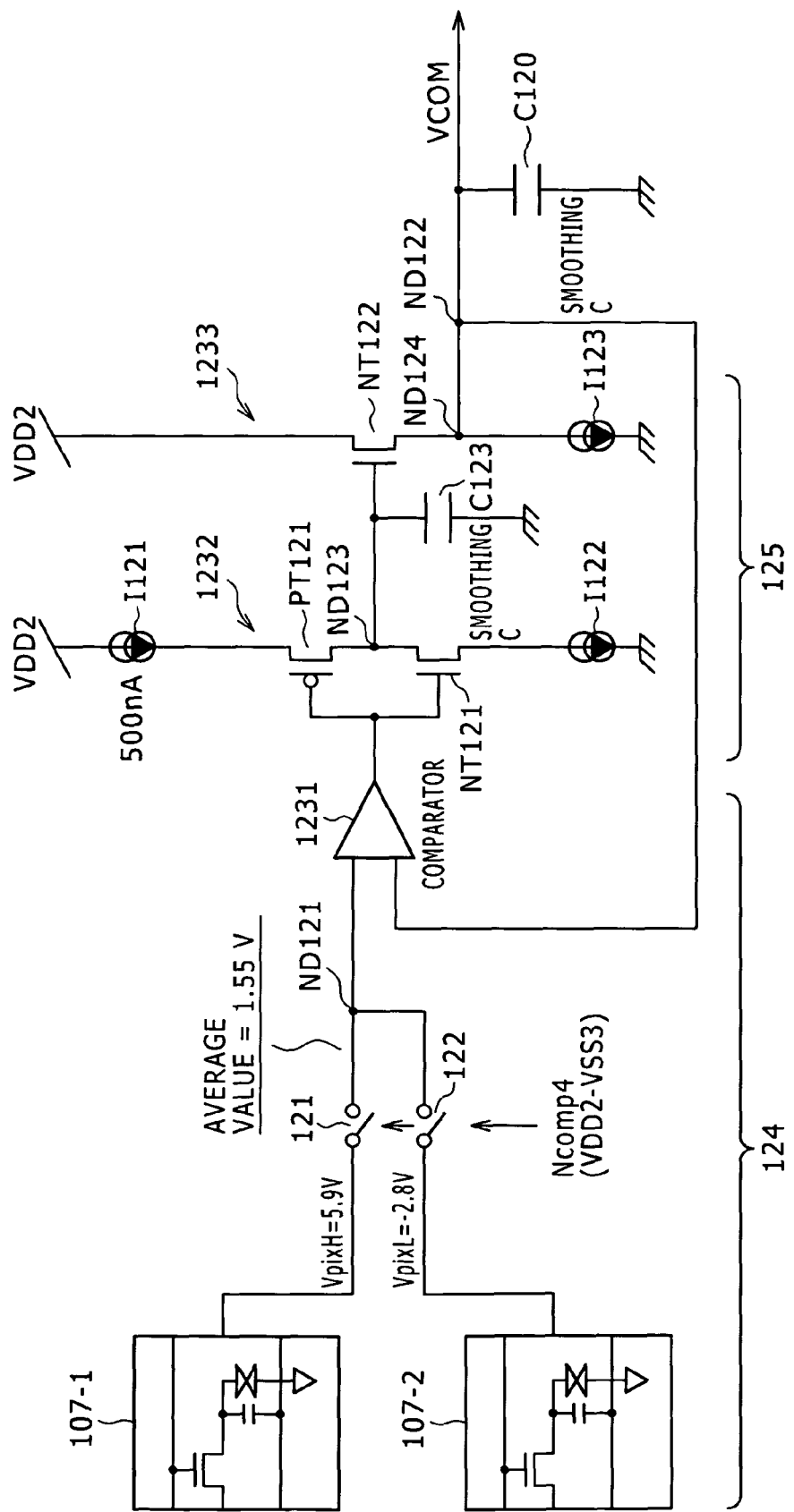
FIG. 9 is a diagram showing a concrete typical configuration of a comparison output section employed in the monitor circuit shown in the diagram of FIG. 8 as the monitor circuit according to the embodiment.

FIG. 9 is a diagram showing a concrete typical configuration of the comparison-result output section 123 employed in the monitor circuit 120 according to the embodiment.

The comparison-result output section 123 shown in the diagram of FIG. 9 employs a comparator 1231, a constant-current-source having inverter 1232, a source follower 1233 and a smoothing capacitor C123.

The comparator 1231 is a component for comparing an average electric potential VMHL appearing at the node ND121 with the output of the source follower 1233 and outputting an electric-potential difference representing the result of the comparison to the constant-current-source having inverter 1232.

The constant-current-source having inverter 1232 has a constant current source 1121, a constant current source 1122, a PMOS (p-channel MOS) transistor PT121 and an NMOS (n-channel MOS) transistor NT121. Both the gate electrode of the PMOS transistor PT121 and the gate electrode of the NMOS transistor NT121 are connected to the output of the comparator 1231. The drain electrode of the PMOS transistor PT121 and the drain electrode of the NMOS transistor NT121, which are connected to each other, are wired to the input of the source follower 1233 through a node ND123 serving as a point of connection.

The source of the PMOS transistor PT121 is wired to the constant current source 1121 which is connected to a 5V-system panel voltage VDD2. On the other hand, the source of the NMOS transistor NT121 is wired to the constant current source 1122 which is connected to a reference electric potential VSS such as the electric potential of the ground GND.

The constant-current-source having inverter 1232 functions as a CMOS inverter including the constant current source 1121 on the power-supply electric-potential side and the constant current source 1122 on the reference electric-potential side. The power-supply electric-potential side is the source side of the PMOS transistor PT121 whereas the reference electric-potential side is the source side of the NMOS transistor NT121. The constant current source 1121 supplies a constant current having a typical magnitude of 500 nA to the PMOS transistor PT121. On the other hand, the constant current source 1122 draws a constant current having a typical magnitude of 500 nA from the NMOS transistor NT121.

The source follower 1233 employs a NMOS transistor NT122 and a constant current source 1123. The gate electrode of the NMOS transistor NT122 is connected to the node ND123 serving as the output node of the constant-current-source having inverter 1232. The drain electrode of the NMOS transistor NT122 is wired to the 5V-system panel voltage VDD2. On the other hand, the source electrode of the NMOS transistor NT122 is wired to a constant current source 1123 through a connection point which serves as a node ND124. The node ND124 is connected to a node ND122 which is a connection point between the second input terminal of the comparator 1231 and the output terminal TO.

The constant current source 1123 is connected to the reference electric potential VSS such as the electric potential of the ground GND.

In the configurations described above, the comparison-result output section 123 automatically adjusts the center value of the common voltage signal Vcom so as to follow the average electric potential VMHL detected by the average electric-potential detection circuit 124.

Figure 10:
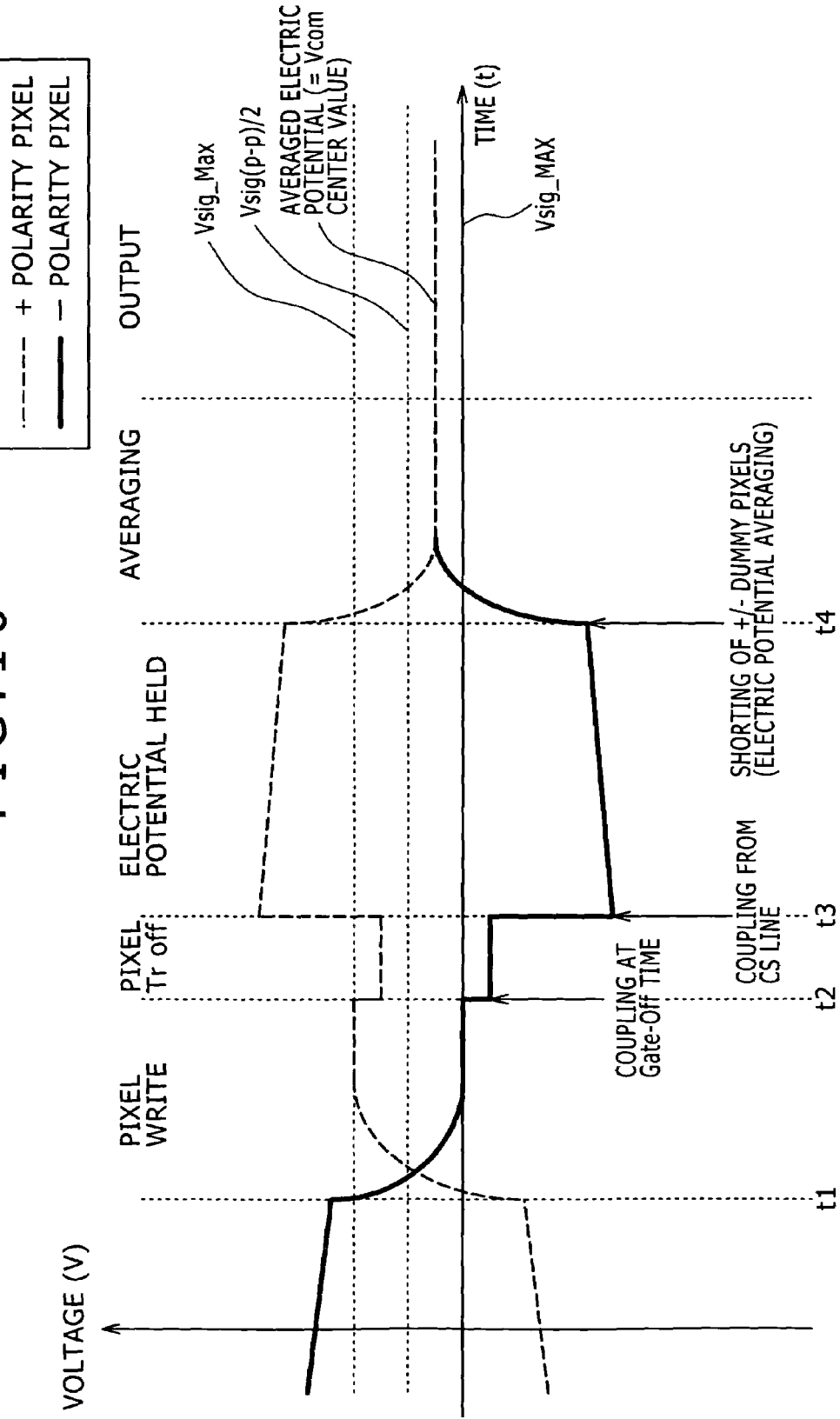
FIG. 10 is a diagram showing the waveforms of signals appearing along the time axis during processing carried out by adoption of a driving method according to the embodiment.

FIG. 10 is a diagram showing the waveforms of signals appearing along the time axis during processing carried out by adoption of the driving method according to the embodiment.

As shown in the diagram of FIG. 10, at a time t1, pixel video data from signal lines 106-1 to 106-$n$ is written into pixel circuits PXLC. Then, at a later time t2 after the lapse of a time period determined in advance since the time t1, gate pulses asserted on the gate lines 104-1 to 104-$n$ are pulled down in order to put the thin-film transistor TFT201 employed in each of the pixel circuits PXLC in a turned-off state.

Thereafter, at a time t3, the capacitor lines 105-1 to 105-$m$ each connected independently for one of the rows are driven, resulting in a capacitive coupling effect of the storage capacitor Cs201 employed in each of the pixel circuits PXLC and, in each of the pixel circuits PXLC, an electric potential appearing on the node ND201 is changed due to the capacitive coupling effect in order to modulate a voltage applied to the liquid-crystal cell LC201.

After the two electric potentials generated by the first monitor pixel section 107-1 and the second monitor pixel section 107-2 respectively are sustained for a time period determined in advance, each of the switches 121 and 122 employed in the average electric-potential detection circuit 124 is put in a turned-on state at a time t4 in order to short detection lines, which convey the two electric potentials, to each other at the node ND121. As a result, an average electric potential appears at the node ND121.

In the typical configuration shown in each of the diagrams of FIGS. 8 and 9, the positive-polarity pixel electric potential VpixH generated in the first monitor pixel circuit PXLCM1 of the first monitor pixel section 107-1 including pixel circuits each having the positive polarity is 5.9 V whereas the negative-polarity pixel electric potential VpixL generated in the second monitor pixel circuit PXLCM2 of the second monitor pixel section 107-2 including pixel circuits each having the negative polarity is −2.8 V. Thus, the detected average electric potential VMHL has a magnitude of 1.55 V and is supplied from the average electric-potential detection circuit 124 to the comparison-result output section 123 at the time t4.

The comparison-result output section 123 automatically adjusts the center value of the common voltage signal Vcom so as to follow the average electric potential VMHL detected by the average electric-potential detection circuit 124.

The following description explains the reason why a system for automatically adjusting the center value of the common voltage signal Vcom is provided in the active-matrix display apparatus 100 serving as a liquid-crystal display panel.

If the center value of the common voltage signal Vcom is not adjusted, there will be raised a problem that flickers are generated on the display screen. In addition, since the voltage applied to the liquid-crystal cell for a positive polarity is different from the voltage applied to the liquid-crystal cell for a negative polarity, a burn-in problem is raised.

As solutions to these problems, in an inspection process carried out at a shipping time at the factory, it is necessary to adjust the center value of the common voltage signal Vcom before the product is shipped from the factory. It is thus necessary to separately provide an adjustment circuit for the inspection process and, as a result, cumbersome-labor hours are required.

In addition, even if the center value of the common voltage signal Vcom is adjusted in the inspection process, after the active-matrix display apparatus 100 serving as the liquid-crystal display panel is shipped, the center value of the common voltage signal Vcom may be shifted from an optimum value due to the temperature of an environment in which the liquid-crystal display panel serving as the active-matrix display apparatus 100 is used, the driving method, the driving frequency, the backlight (B/L) luminance, the luminance of incoming light and a continuous usage.

Since the active-matrix display apparatus 100 includes a system for automatically adjusting the center value of the common voltage signal Vcom in the liquid-crystal display panel, however, the inspection process entailing the cumbersome-labor hours is not required. Thus, even if the center value of the common voltage signal Vcom is shifted from an optimum value due to the temperature of an environment in which the liquid-crystal display panel serving as the active-matrix display apparatus 100 is used, the driving method, the driving frequency, the backlight (B/L) luminance or the luminance of incoming light, the system for automatically adjusting the center value of the common voltage signal Vcom is capable of sustaining the center value of the common voltage signal Vcom at a value optimum for the environment. As a result, the active-matrix display apparatus 100 offers a merit of the capability of appropriately preventing flickers from being generated on the display screen.

In addition, the electric potential appearing in an effective pixel circuit employed in the available pixel section 101 changes due to a capacitive coupling effect occurring on the falling edge of a gate line connected to the pixel circuit or a leak current flowing through the thin-film transistor TFT201 employed in the pixel circuit. As a result, the optimum center value of the common voltage signal Vcom needs to be changed too. In the case of this embodiment, however, the center value of the common voltage signal Vcom may be always adjusted to an optimum value so that it is possible to avoid an effect of the changes of the electric potential appearing in the effective pixel circuit on the quality of the displayed picture.

The following description explains a mechanism of the changes of the electric potential appearing in the effective pixel circuit.

Figure 11:
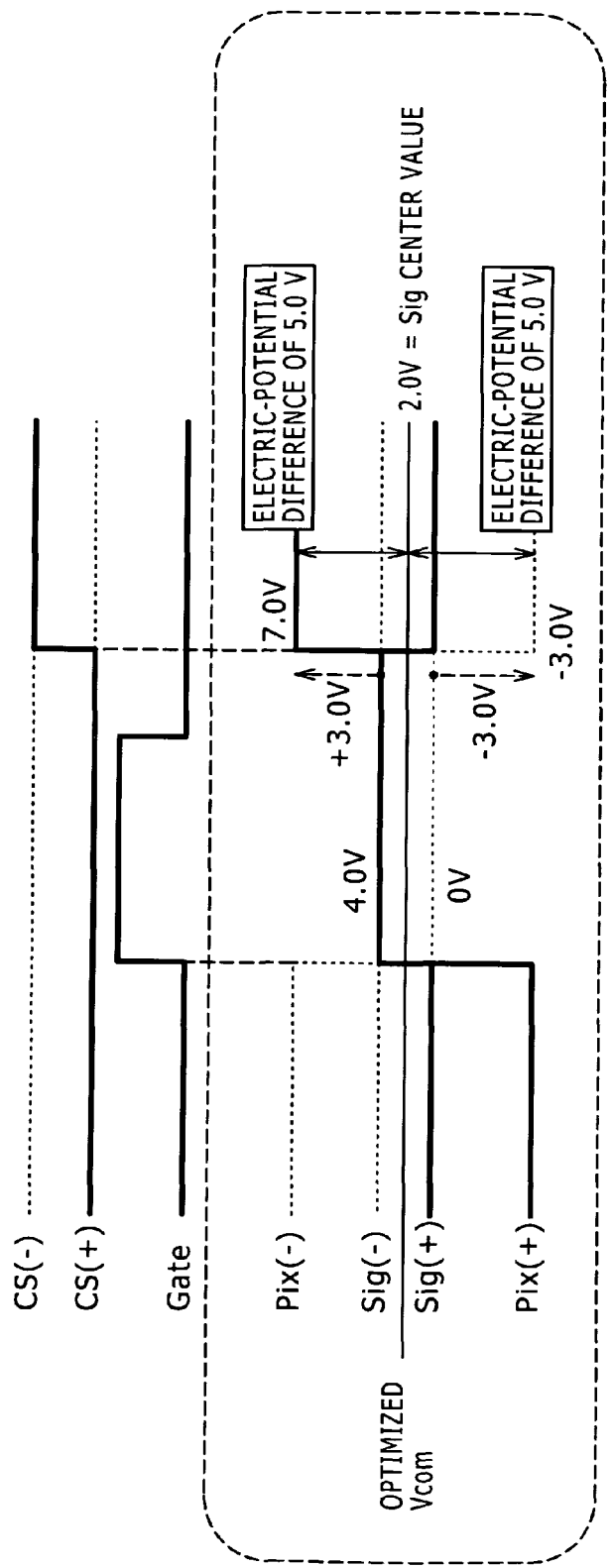
FIG. 11 is a diagram showing an ideal state obtained as a result of execution of the driving method according to the embodiment.

FIG. 11 is a diagram showing an ideal state obtained as a result of execution of the driving method according to the embodiment. It is to be noted that, in order to make the following description easy to understand, the values of voltages and other quantities shown in the diagram of FIG. 11 may be different from those for the actual driving operation.

As shown in the diagram of FIG. 11, in the ideal state, the electric potential appearing in a pixel circuit is vibrating at an amplitude symmetrical with respect to the center value of the video signal Sig.

If the difference in electric potential between the pixel electric potential Pix with the positive (+) polarity and the common voltage signal Vcom and the difference in electric potential between the pixel electric potential Pix with the negative (−) polarity and the common voltage signal Vcom are uniform, no differences in luminance are generated and, hence, no flickers are seen on the display screen.

That is to say, if the difference in electric potential between the pixel electric potential Pix with the positive (+) polarity and the common voltage signal Vcom is equal to the difference in electric potential between the pixel electric potential Pix with the negative (−) polarity and the common voltage signal Vcom as evidenced by the fact that no differences in luminance are generated, the center value of the video signal Sig should be equal to the optimum common voltage signal Vcom.

Figure 12:
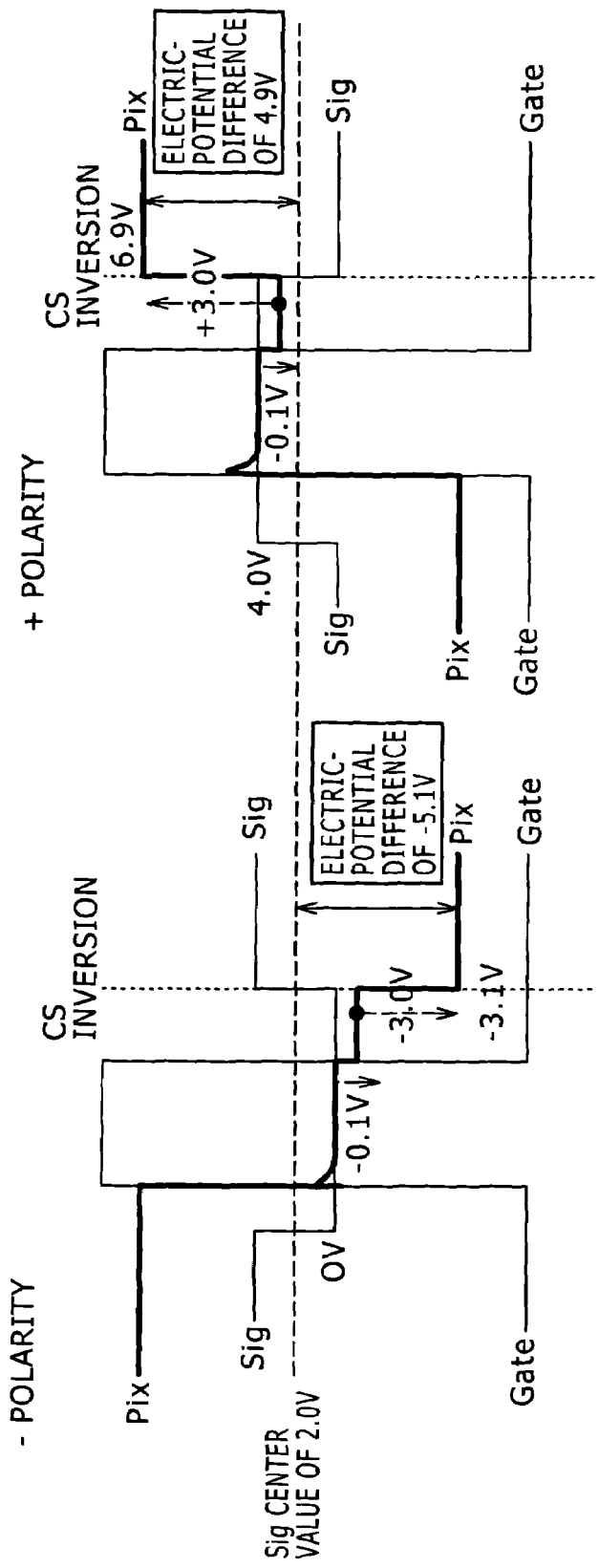

In a pixel circuit, however, the actual optimum common voltage signal Vcom is lower than the center value of the video signal Sig. This difference is considered to be a difference caused by a capacitive coupling effect occurring on the falling edge of a gate line connected to the pixel circuit or a leak current flowing through the thin-film transistor TFT201 employed in the pixel circuit. Gate Coupling FIG. 12A is a diagram showing a relation between the gate pulse and the difference in electric potential between the pixel electric potential Pix with the negative (−) polarity and the common voltage signal Vcom whereas FIG. 12B is a diagram showing a relation between the gate pulse and the difference in electric potential between the pixel electric potential Pix with the positive (+) polarity and the common voltage signal Vcom.

The capacitive coupling effect caused by the gate electrode of the thin-film transistor TFT201 as a capacitive coupling effect oriented in the + direction is cancelled due to the fact that the thin-film transistor TFT201 is in a turned-on period. However, the capacitive coupling effect caused by the gate electrode of the thin-film transistor TFT201 as a capacitive coupling effect oriented in the − direction is not cancelled, causing the electric potential appearing in the pixel circuit to drop.

Thus, if the center value of the video signal Sig is equal to the common voltage signal Vcom (Vcom=Sig), the difference in electric potential between the pixel electric potential Pix with the positive (+) polarity and the common voltage signal Vcom is not equal to the difference in electric potential between the pixel electric potential Pix with the negative (−) polarity and the common voltage signal Vcom so that the center value of the video signal Sig or the center value of the common voltage signal Vcom is not equal to the optimum common voltage signal Vcom.

Leak Currents of the Pixel Circuit Transistor

Figure 13:
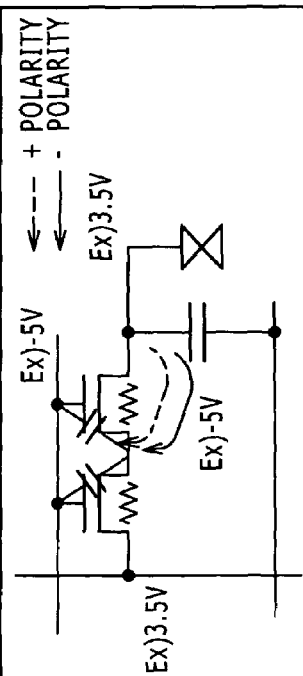
FIG. 13 is a diagram showing models of causes of leak currents each flowing through a transistor employed in a pixel circuit.

FIG. 13 is a diagram showing models of causes of leak currents each flowing through a TFT (thin-film transistor) employed in a pixel circuit. A leak current flowing through a pixel circuit transistor can be a leak current flowing to a signal line or a leak current caused by electrical charging and discharging processes as a leak current flowing to a gate line. The leak current flowing to a signal line is a leak current flowing between the S (source) and D (drain) electrodes of the TFT serving as the pixel circuit transistor whereas the leak current flowing to a gate line is a leak current flowing between the S (source) and G (gate) electrodes of the TFT. In the following description, the leak current flowing between the S (source) and D (drain) electrodes of the TFT is referred to as an S-D leak current whereas the leak current flowing between the S (source) and G (gate) electrodes of the TFT is referred to as an S-G leak current.

As a resultant result of a combination of the S-D and S-G leak currents, the pixel electric potential also referred to as an electric potential Pix drops. Thus, the pixel electric potential (or the electric potential Pix) is affected by causes such as a current increase caused by light as an increase in current Ioff and holding-period variations caused by frequency changes.

Figures 14A, 14B:
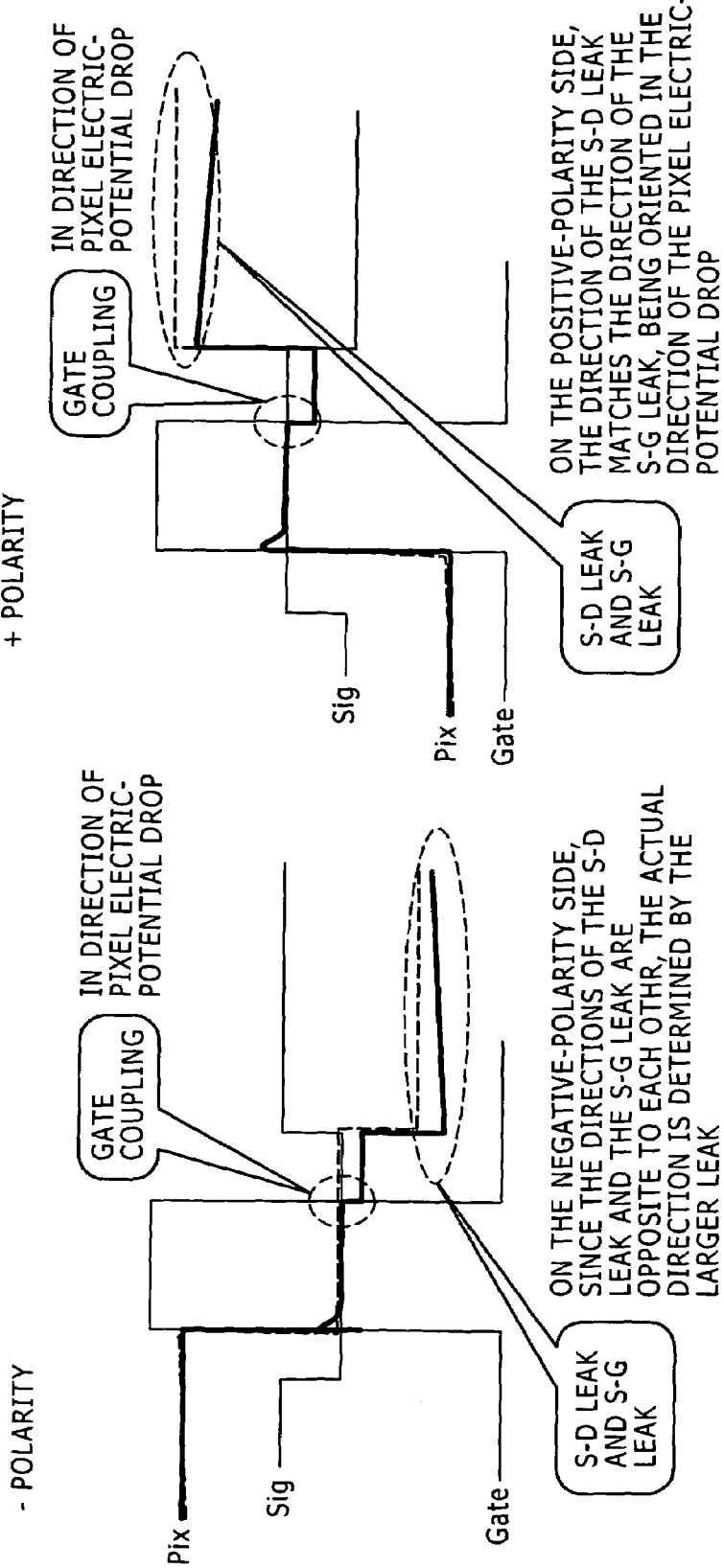

FIG. 14A is a diagram showing a state obtained as a result of a gate coupling effect and leak currents each flowing through a transistor employed in a pixel circuit in implementation of a driving method according to the embodiment for the negative (−) polarity whereas FIG. 14B is a diagram showing a state obtained as a result of a gate coupling effect and leak currents each flowing through a transistor employed in a pixel circuit in implementation of a driving method according to the embodiment for the positive (+) polarity.

In each of the diagrams of FIGS. 14A and 14B, dashed lines show the waveforms of signals obtained as a result of no gate coupling effect and no leak currents flowing through the transistor employed in the pixel circuit whereas solid lines show the waveforms of signals obtained as a result of a gate coupling effect and leak currents each flowing through the transistor employed in the pixel circuit.

On the negative-polarity side, the direction of the S-D leak current is opposite to the direction of the S-G leak current. Thus, the actual direction is determined by the larger one of the S-D leak current and the S-G leak current.

On the positive-polarity side, on the other hand, the direction of the S-D leak current matches the direction of the S-G leak current, being oriented in the direction of a drop in pixel electric potential.

As described above, the gate coupling effect and the leak currents each flowing through a transistor employed in a pixel circuit cause the electric potential appearing in the pixel electric to drop so that the optimum common voltage signal Vcom is shifted in the downward direction.

In this embodiment, the center value of the common voltage signal Vcom is automatically adjusted as described above so that it is possible to eliminate effects of variations in effective pixel electric potential on the quality of the picture.

FIG. 15 is a table showing causes of variations in pixel electric potential as causes, the effects of which can be eliminated by automatically adjusting the center value of the common voltage signal Vcom in accordance with the embodiment. For the purpose of comparison, the table also shows causes of variations in pixel electric potential as causes, the effects of which can be eliminated by carrying out an inspection process at the factory. In the table of FIG. 15, a circle symbol indicates a cause, the effect of which can be eliminated. On the other hand, an X symbol indicates a cause, the effect of which cannot be eliminated.

The effects of specific causes of variations in pixel electric potential cannot be eliminated by merely carrying out an inspection process. By automatically adjusting the center value of the common voltage signal Vcom in accordance with the embodiment, however, it is possible to eliminate the effects of the specific causes of variations in pixel electric potential. The specific causes of variations in pixel electric potential are driving-frequency variations occurring at an actual utilization time, environment temperature variations also occurring at the actual utilization time and aging. The variations in driving frequency, the variations in environment temperature and the aging are caused by off leak currents flowing through the transistor (Tr) employed in the pixel circuit and cannot be eliminated by merely carrying out an inspection process.

By the same token, the effects of other specific causes of variations in pixel electric potential cannot be eliminated by merely carrying out an inspection process. By automatically adjusting the center value of the common voltage signal Vcom in accordance with the embodiment, however, it is possible to eliminate the effects of the other specific causes of variations in pixel electric potential. The other specific causes of variations in pixel electric potential are driving-frequency variations occurring at an actual utilization time, environment-temperature variations also occurring at the actual utilization time, backlight-luminance variations also occurring at the actual utilization time and variations in external-light luminance. The variations in driving frequency, the variations in environment temperature, the variations in backlight luminance and the variations in external-light luminance are caused by optical leak currents flowing through the transistor employed in the pixel circuit and cannot be eliminated by merely carrying out an inspection process.

The automatic adjustment of the center value of the common voltage signal Vcom has been described above. The following description explains layouts of pixel circuits composing the first and second monitor pixel sections 107-1 and 107-2 according to the embodiment.

As described previously, in accordance with the embodiment, the monitor circuit 120 provided at a location adjacent to the available pixel section 101 (in the diagram of FIG. 4, a location on the right side of the available pixel section 101) includes the first monitor pixel section 107-1 having one monitor pixel circuit or a plurality of monitor pixel circuits, the second monitor pixel section 107-2 also having one monitor pixel circuit or a plurality of monitor pixel circuits, the monitor vertical driving circuit (V/CSDRVM) 108 serving as a vertical driving circuit, the first monitor horizontal driving circuit (HDRVM1) 109-1, the second monitor horizontal driving circuit (HDRVM2) 109-2 and the detection-result output circuit 110.

The reason for having the above layout at a location on the right side of the available pixel section 101 is explained as follows.

Figure 16:
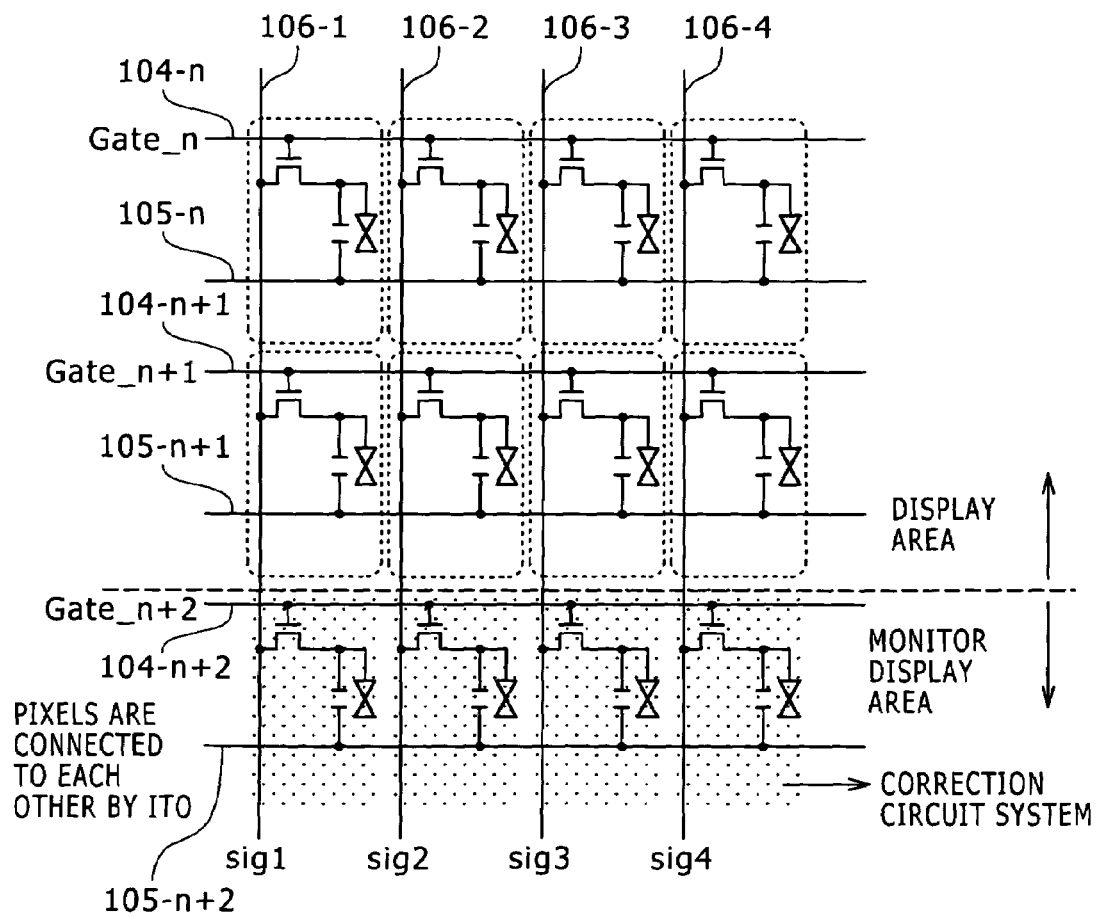
FIG. 16 is a diagram showing monitor pixel circuits as a portion which is included in an available pixel section as a portion including typically one detection pixel circuit or a plurality of detection pixel circuits.

As shown in a diagram of FIG. 16, a monitor pixel circuit or a plurality of monitor pixel circuits are created as a portion of the available pixel section 101. For example, the monitor pixel circuit is created as a pixel circuit of the available pixel section 101 or the monitor pixel circuits are created as a row of the available pixel section 101. In this configuration, in the same way as the available pixel section 101, the monitor pixel circuits are connected to the gate, capacitor and signal lines which are driven by the vertical driving circuit 102 and the horizontal driving circuit 103 so that monitor-pixel electric potentials similar to electric potentials generated in available pixel circuits are obtained.

In the case of this configuration, however, each of the monitor pixel circuits requires an electric potential similar to that required by each of the available pixel circuits. Thus, since the configuration of the monitor pixel section cannot be changed much, the monitor pixel section needs to be placed at a location above or below the available-pixel section (or the available display area) and the monitor pixel section needs to be oriented in the horizontal direction.

In addition, since the same driving signals (or the same control signals) as the display pixel circuits (or the available pixel circuits) are used, the freedom of making use of the control signals is low. On top of that, since the signal lines are also shared with the available display area, this configuration raises a problem that a capacitive coupling effect generated by each of the signal lines cannot be ignored.

In accordance with the embodiment, after an operation to write data into a monitor pixel circuit is carried out, an electric-potential detection process can be performed in the middle of one frame period so as to accomplish an optimum correction operation.

As shown in a diagram of FIG. 17, however, affected by signal line voltage variations due to display pixel circuits each receiving the video signal from the signal line in the middle of one frame period, the electric potential of the monitor pixel circuit also inevitably changes. Thus, the correction operation needs to be carried out in the blanking period of the video signal.

In addition, it is also difficult to lay out monitor pixel circuits for both polarities, i.e., the positive and negative polarities, as pixel circuits required for a system for automatically adjusting the center value of the common voltage signal Vcom described above.

In order to solve the problems described above, the monitor circuit 120 is created independently of the available pixel section 101 at a location adjacent to the available pixel section 101 as a circuit employing the first monitor pixel section 107-1, the second monitor pixel section 107-2, the monitor vertical driving circuit (V/CSDRVM) 108, the first monitor horizontal driving circuit (HDRVM1) 109-1 and the second monitor horizontal driving circuit (HDRVM2) 109-2.

In addition, in the case of a configuration in which the monitor pixel section includes a plurality of monitor pixel circuits, if gate lines are merely shared by a plurality of monitor pixel circuits as shown in diagrams of FIGS. 18A and 18B, the amount of gate coupling varies unavoidably.

In a configuration shown in the diagram of FIG. 18A, the layout of the monitor pixel circuits is oriented in the horizontal direction, and the monitor pixel circuits share the gate lines. In this case, any particular pixel circuit is affected by a gate coupling effect of a pixel circuit adjacent to the particular one.

In a configuration shown in the diagram of FIG. 18B, on the other hand, the layout of the monitor pixel circuits is oriented in the vertical direction, and the monitor pixel circuits share the gate lines. In this case, any particular pixel circuit is affected by not only a gate coupling effect of the particular pixel circuit itself, but also a gate coupling effect of a pixel circuit adjacent to the particular one at the same time. Thus, the drop of the electric potential appearing in the pixel circuit is large.

In order to solve the problems described above, in the case of the embodiment, the gate lines are provided so as to form the so-called nesting layout as described below. It is thus desirable to provide a configuration in which any particular monitor pixel circuit is affected by only a gate coupling effect of a line connected to the particular pixel circuit itself even if the layout of the monitor pixel circuits is oriented in the vertical direction.

Figure 19:
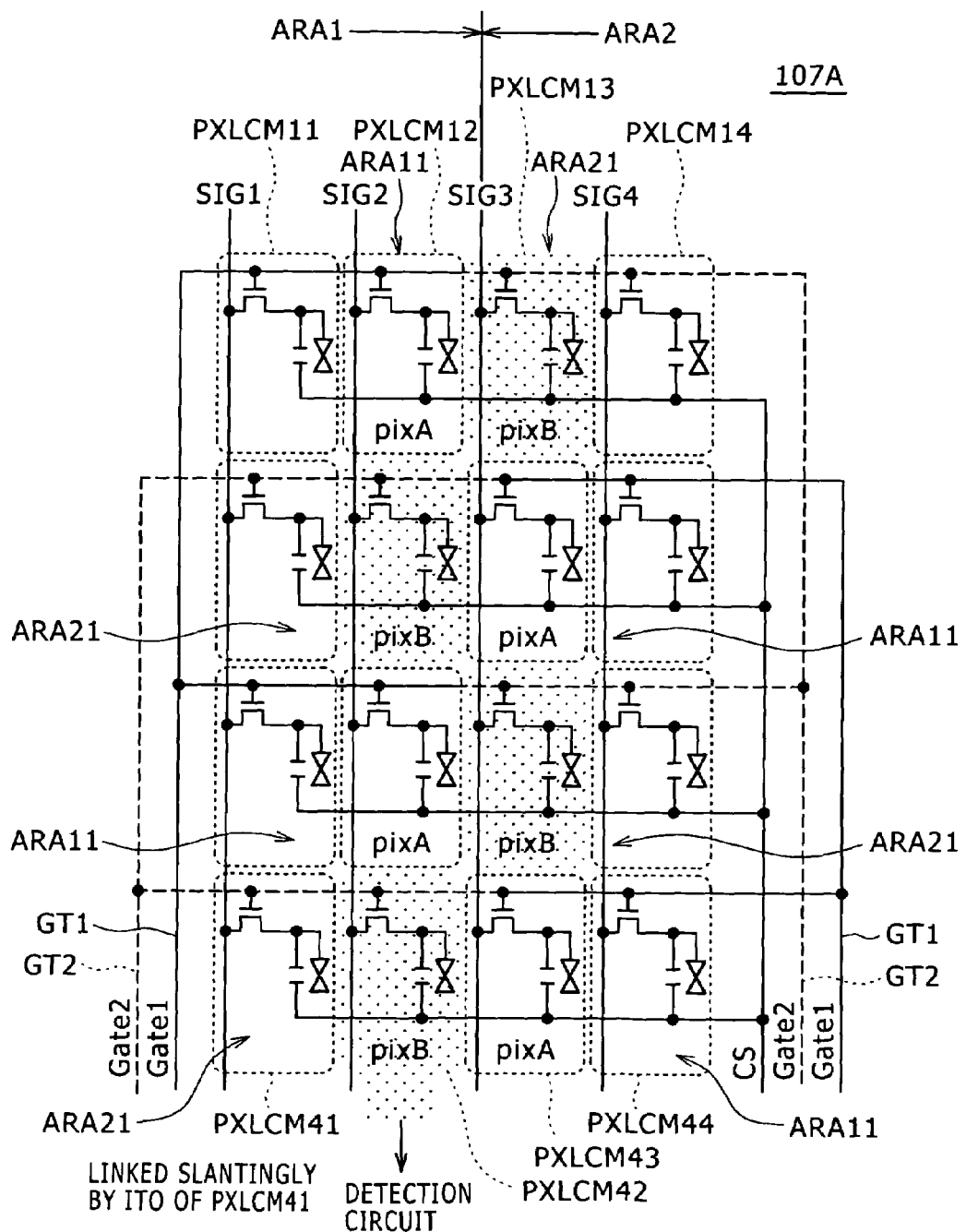
FIG. 19 is a diagram showing a typical layout of pixel circuits in a monitor pixel section according to the embodiment.
Figure 20:
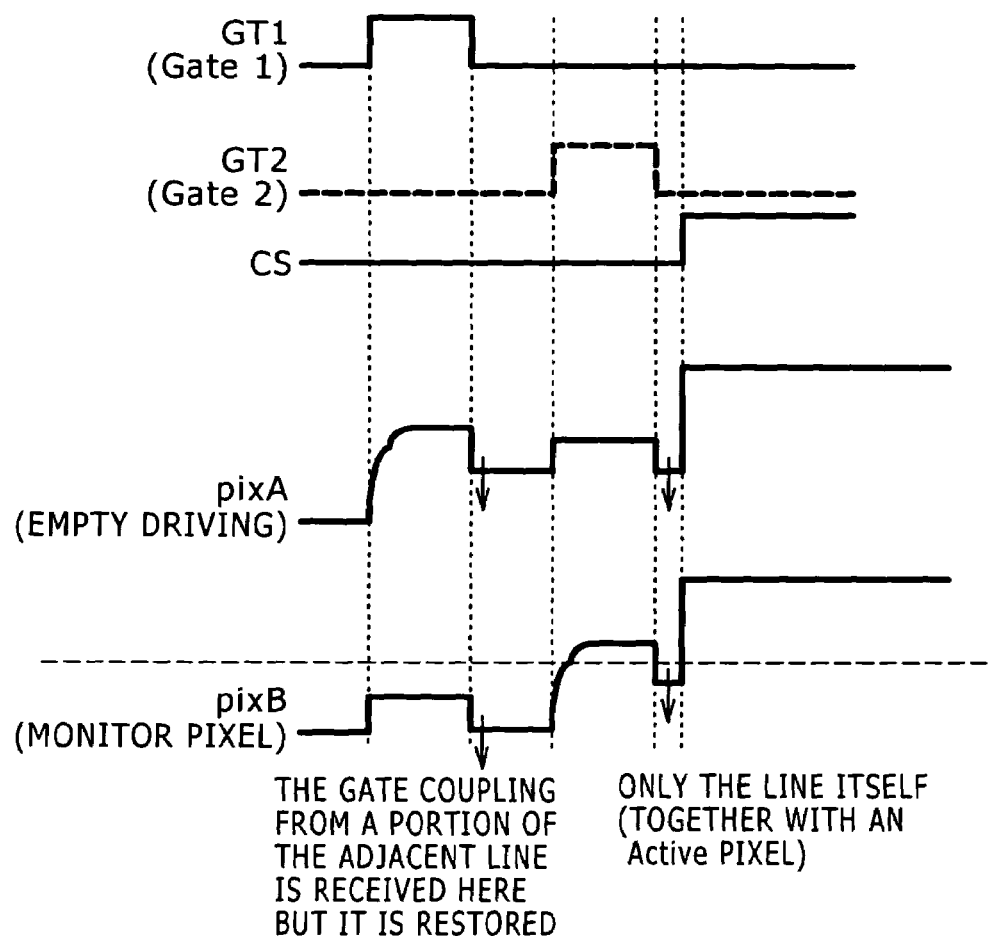
FIG. 20 is a diagram showing the waveforms of driving signals appearing in the monitor pixel section shown in the diagram of FIG. 19.

FIG. 19 is a diagram showing a typical layout of pixel circuits in a monitor pixel section 107A according to the embodiment. FIG. 20 is a diagram showing the waveforms of driving signals appearing in the monitor pixel section 107A shown in the diagram of FIG. 19.

The monitor pixel section 107A shown in the diagram of FIG. 19 is a typical monitor pixel section in which 16 monitor pixel circuits PXLCM11 to PXLCM44 are laid out to form a 4×4 matrix. However, the number of monitor pixel circuits forming the matrix is by no means limited to sixteen. That is to say, the matrix can be an n×n matrix where notation n denotes any integer other than four.

The matrix of pixel circuits composing the monitor pixel section 107A is divided by a line parallel to the columns into two areas, namely, ARA1 and ARA2.

On each row of the pixel matrix, there are an area ARA11 for a first monitor pixel circuit not used in actual monitoring and an area ARA21 for a second monitor pixel circuit used in actual monitoring. In the diagram of FIG. 19, the first monitor pixel circuit is denoted by notation pixA whereas the second monitor pixel circuit is denoted by notation pixB. The areas ARA11 and ARA21 are laid out alternately in the column direction in each of the two areas ARA1 and ARA2. Thus, the first monitor pixel circuits pixA form a zigzag line in the column direction in the pixel circuit matrix. By the same token, the second monitor pixel circuits pixB form a zigzag line in the column direction in the pixel circuit matrix.

As shown in FIG. 19, each of the first monitor pixel circuit pixA and the second monitor pixel circuit pixB, which are employed in the monitor pixel section 107A, employs a thin-film transistor TFT321 functioning as a switching device, a liquid-crystal cell LC321 and a storage capacitor Cs321. The first pixel electrode of the liquid-crystal cell LC321 is connected to the drain electrode (or the source electrode) of the thin-film transistor TFT321. The drain electrode of the thin-film transistor TFT321 is also connected to the first electrode of the storage capacitor Cs321. It is to be noted that the point of connection between the drain electrode of the thin-film transistor TFT321, the first pixel electrode of the liquid-crystal cell LC321 and the first electrode of the storage capacitor Cs321 forms a node ND321.

The monitor pixel section 107A shown in the diagram of FIG. 19 makes use of two gate lines, i.e., a first gate line GT1 and a second gate line GT2. The first gate line GT1 is connected to the gate electrode of the thin-film transistor TFT321 employed in the first monitor pixel circuit pixA in the first monitor pixel area ARA11 whereas the second gate line GT2 is connected to the gate electrode of the thin-film transistor TFT321 employed in the second monitor pixel circuit pixB in the second monitor pixel area ARA21.

The node ND321 of the second monitor pixel circuit pixB is connected to a conductive wire such as an ITO wire. The node ND321 of the second monitor pixel circuit PXLCM42 located at the intersection of the fourth row and the second column is connected to the detection-result output circuit 110.

As actual monitor pixel circuits, the typical configuration shown in the diagram of FIG. 19 employs monitor pixel circuits PXLCM13, PXLCM22, PXLCM33 and PXLCM42.

The second electrode of the storage capacitor Cs321 of each of the first monitor pixel circuit pixA and the second monitor pixel circuit pixB is connected to a capacitor line L321 which is a line common to all pixel circuits on a row.

In addition, the source electrode (or the drain electrode) of the thin-film transistor TFT321 employed in each of the first monitor pixel circuit pixA and the second monitor pixel circuit pixB which are located on the same column is connected to a signal line provided for the column. Signal lines provided for the first to fourth columns are signal lines L322-1 to L322-4 respectively.

The second pixel electrode of the liquid-crystal cell LC321 employed in each of the first monitor pixel circuit pixA and the second monitor pixel circuit pixB is connected to a line for supplying typically the common voltage signal Vcom with a small amplitude and a polarity inverted every horizontal scan period as a signal common to all pixel circuits. In the following description, a horizontal scan period is referred to as 1H.

In the monitor pixel section 107A, as shown in timing charts of FIG. 20, first of all, the first gate line GT1 is driven to a high level in order to put the first monitor pixel circuit pixA in an empty driving state. With the first monitor pixel circuit pixA put in an empty driving state, the second monitor pixel circuit pixB adjacent to the first monitor pixel circuit pixA is affected by the gate coupling effect of the first monitor pixel circuit pixA. With the timing of the falling edge of the first gate line GT1, however, the second monitor pixel circuit pixB is restored to the original state thereof.

Next, the second gate line GT2 is driven to a high level in order to put the second monitor pixel circuit pixB in a real driving state. With the second monitor pixel circuit pixB put in a real driving state, the second monitor pixel circuit pixB experiences only the gate coupling effect generated by itself and is by no means affected by the gate coupling effect generated by the first monitor pixel circuit pixA adjacent to the second monitor pixel circuit pixB. Thus, the magnitude of an electric-potential drop experienced by the pixel circuit can be made the same as the drop of the pixel circuit PXLC employed in the available pixel section 101.

As described above, in this embodiment, by providing the gate lines so as to form the so-called nesting layout, the gate coupling effect generated by a monitor pixel circuit is a capacitive coupling effect caused by only the gate line connected to the monitor pixel circuit itself.

The monitor pixel section 107A shown in the diagram of FIG. 19 can be used as either of the first monitor pixel section 107-1 and the second monitor pixel section 107-2 which are employed in the active-matrix display apparatus 100 shown in the diagram of FIG. 4.

As described above, this embodiment has a configuration in which the monitor circuit 120 is created independently of the available pixel section 101 at a location adjacent to the available pixel section 101 as a circuit employing the first monitor pixel section 107-1, the second monitor pixel section 107-2, the monitor vertical driving circuit (V/CSDRVM) 108, the first monitor horizontal driving circuit (HDRVM1) 109-1 and the second monitor horizontal driving circuit (HDRVM2) 109-2. In addition, the gate lines are provided so as to form the so-called nesting layout. Thus, the embodiment offers a merit of a higher degree of freedom with which the liquid-crystal display panel is designed.

As a result, it is easier to lay out the configuration circuits of the monitor circuit 120, that is, easier to lay out the first monitor pixel section 107-1, the second monitor pixel section 107-2, the monitor vertical driving circuit (V/CSDRVM) 108, the first monitor horizontal driving circuit (HDRVM1) 109-1 and the second monitor horizontal driving circuit (HDRVM2) 109-2.

It is possible to lay out all configuration circuits of the monitor circuit 120 independently of the available pixel section 101 at a location adjacent to (or, in diagram of FIG. 4, on the right side of) the available pixel section 101 as shown in the diagram of FIG. 4. In addition, the layout of the configuration circuits can be designed into a variety of shapes.

For example, as shown in a diagram of FIG. 21A, the layout is split into a location above the available pixel section 101 and a location on the right side of the available pixel section 101. In addition, it is also possible to provide another typical layout shown in a diagram of FIG. 21B as a layout in which the first monitor pixel section 107-1 is parallel to the second monitor pixel section 107-2, the monitor horizontal driving circuit 109 is located above the first monitor pixel section 107-1 and the second monitor pixel section 107-2 whereas the monitor vertical driving circuit 108 is located below the first monitor pixel section 107-1 and the second monitor pixel section 107-2.

On top of that, the vertical and horizontal driving circuits designed especially for the monitor pixel section can thus be provided separately from the available pixel section 101 so that it is possible to solve a problem that the correction operation needs to be carried out in the blanking period of the video signal. As described previously, this problem is caused by the fact that, affected by signal line voltage variations due to display pixel circuits each receiving the video signal from the signal line in the middle of one frame period, the electric potential of the monitor pixel circuit also inevitably changes.

By the way, as described earlier, driving operations are carried out on available pixel circuits (each also referred to as a display pixel circuit) and monitor pixel circuits located at locations separated from the available pixel circuits so that it is feared that the monitor-pixel electric potential is shifted from a target electric potential intended for the display pixel circuit due to a structural difference. However, the embodiment employs a circuit for adjusting the shift of the electric potential appearing in the monitor pixel circuit from a target electric potential intended for the display pixel circuit.

This embodiment adopts a system in which the monitor circuit 120 includes a pair of monitor pixel sections, i.e., the first monitor pixel section 107-1 with the positive (+) polarity and the second monitor pixel section 107-2 with the negative (−) polarity. In the system, by shorting detection lines, which convey the pixel electric-potentials detected in the first monitor pixel section 107-1 and the second monitor pixel section 107-2, to each other, an average detected electric potential can be generated as an electric potential for adjusting (correcting) the electric potential (or the center value) of the common voltage signal Vcom.

The generated average electric potential should agree with the electric potential of the common voltage signal Vcom applied to the available pixel circuit (or the display pixel circuit). If the monitor pixel circuit and the display pixel circuit (or the available pixel circuit) are provided independently of each other, however, it is quite within the bounds of possibility that differences between an electric potential Pix detected in the monitor pixel circuit and an electric potential Pix actually appearing in the display pixel circuit are generated due to variations in the liquid-crystal display panel surface as shown in a diagram of FIG. 22 even if the monitor pixel circuit and the display pixel circuit are put in the same operating conditions. Typical variations in the liquid-crystal display panel surface are variations in liquid-crystal cell gap and variations in interlayer insulation film.

For example, the variations in liquid-crystal cell gap have an effect on the capacitance of the liquid-crystal cell whereas the variations in interlayer insulation film have an effect on typically the capacitance of the storage capacitor, the capacitance of the parasitic capacitor of the gate electrode of the TFT and the characteristics of the TFT.

Due to such variations in the liquid-crystal display panel surface and differences in electric potential, errors also exist in the monitor circuit so that it is feared that a detected electric potential is shifted from the target electric potential intended for the display pixel circuit. In order to solve this problem, it is necessary to adopt one of the following two typical methods or a combination of the methods.

In accordance with the first method, video signals having amplitudes different from each other are written into monitor pixel circuits so that an offset is deliberately provided to an average electric potential detected in each of the pixel circuits as an offset for correcting the detected average electric potential so as to eliminate the shift of the detected electric potential from the target electric potential intended for the display pixel circuit. In accordance with the second method, on the other hand, each monitor pixel circuit is provided with a capacitor so that an offset is deliberately provided to a detected average electric potential as an offset for correcting the detected average electric potential so as to eliminate the shift of the detected electric potential from the target electric potential intended for the display pixel circuit.

By adopting one of the first and second methods or a combination of the methods, it is possible to cancel the shift of the detected electric potential from the target electric potential intended for the display pixel circuit.

First of all, the first method is explained. As described above, in accordance with this method, an operation is carried out to correct a detected average electric potential by deliberately providing the detected average electric potential with an offset caused by a difference in amplitude between video signals Sig applied to monitor pixel circuits.

Figure 23A:
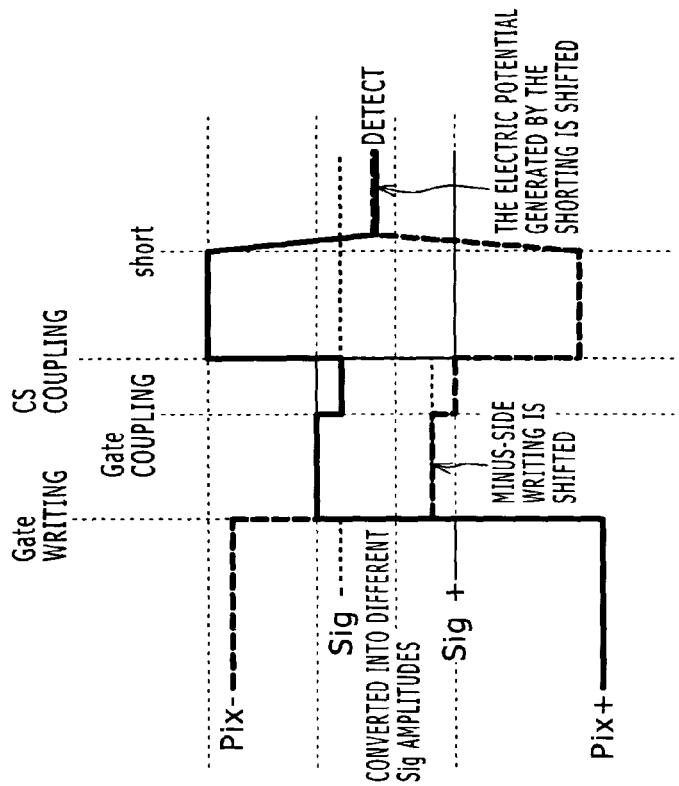
FIGS. 23A and 23B are each an explanatory diagram to be referred to in description of an operation carried out to correct a detected average electric potential by deliberately providing the detected average electric potential with an offset caused by a difference in amplitude between video signals Sig applied to monitor pixel circuits.
Figure 23B:
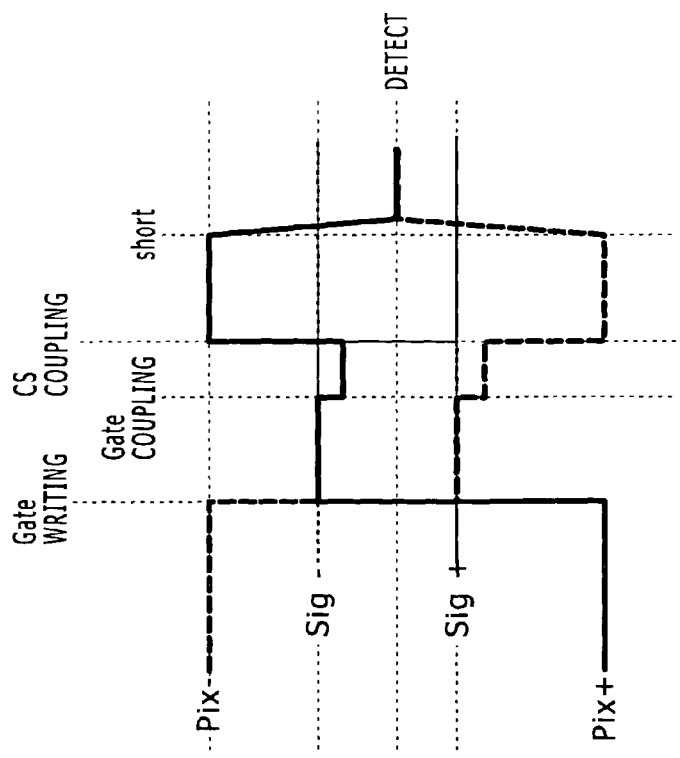

Each of FIGS. 23A and 23B is an explanatory diagram referred to in description of the operation carried out to correct a detected average electric potential by deliberately providing the detected average electric potential with an offset caused by a difference in amplitude between video signals Sig applied to monitor pixel circuits. To be more specific, FIG. 23A is an explanatory diagram showing a detected output obtained as a result of detecting the average of electric potentials Pix for a case in which signals Sig having the same amplitudes are applied to monitor pixel circuits. On the other hand, FIG. 23B is an explanatory diagram showing a detected output obtained as a result of detecting the average of electric potentials Pix for a case in which signals Sig having amplitudes different from each other are applied to monitor pixel circuits in order to deliberately provide an offset to the detected output so as to eliminate the shift of the detected electric potential from the target electric potential intended for the display pixel circuit.

In accordance with the first method, an offset is provided deliberately to the detected output so as to eliminate the shift of the detected electric potential from the target electric potential intended for the display pixel circuit. As shown in the diagram of FIG. 23B, signals Sig having amplitudes different from each other are written into a pair of monitor pixel sections employed in the embodiment. Since the detected average electric potential is generated by shorting detection lines, which convey the electric potentials detected from the monitor pixel sections, to each other, the detected electric potential can be shifted by a difference equal to the offset for canceling the shift of the detected electric potential from the target electric potential intended for the display pixel circuit. In the case shown in the diagram of FIG. 23B, the amplitude of the video signal Sig− on the negative side is changed and then the video signal Sig− is written into the monitor pixel section on the negative side. It is to be noted, however, that it is also possible to provide a configuration in which the amplitude of the video signal Sig+ on the positive side is changed and then the video signal Sig+ is written into the monitor pixel section on the positive side.

Figure 24:
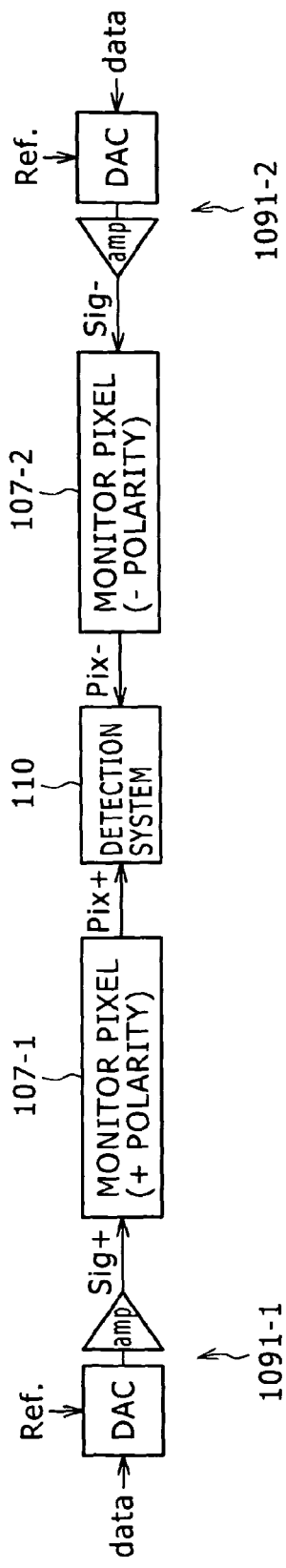
FIG. 24 is a diagram showing a first typical configuration of a circuit for carrying out the operation to correct a detected average electric potential by deliberately providing the detected average electric potential with an offset caused by a difference in amplitude between video signals Sig applied to monitor pixel circuits.

FIG. 24 is a diagram showing a first typical configuration of a circuit for carrying out the operation to correct a detected average electric potential by deliberately providing the detected average electric potential with an offset caused by a difference in amplitude between video signals Sig applied to monitor pixel circuits.

The circuit shown in the diagram of FIG. 24 typically employs a positive-polarity write circuit 1091-1 provided at the output stage of the first monitor horizontal driving circuit 109-1 associated with the first monitor pixel section 107-1 as a write circuit designed especially for the positive polarity. By the same token, the circuit typically employs a negative-polarity write circuit 1091-2 provided at the output stage of the second monitor horizontal driving circuit 109-2 associated with the second monitor pixel section 107-2 as a write circuit designed especially for the negative polarity. Each of the positive-polarity write circuit 1091-1 and the negative-polarity write circuit 1091-2 generates a video signal Sig with an amplitude controllable independently.

Each of the positive-polarity write circuit 1091-1 and the negative-polarity write circuit 1091-2 employs a digital-analog converter DAC and an amplifier amp for amplifying an analog signal generated by the digital-analog converter DAC.

Figure 25:
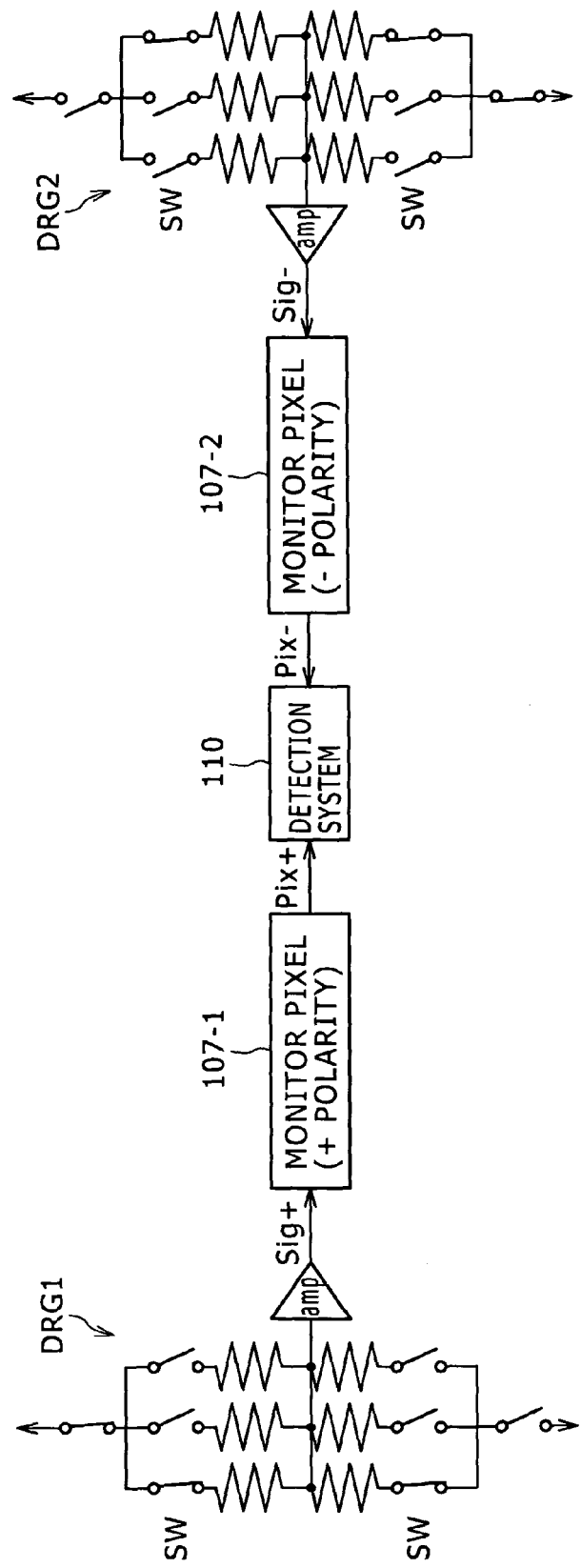
FIG. 25 is a diagram showing a second typical configuration of a circuit for carrying out the operation to correct a detected average electric potential by deliberately providing the detected average electric potential with an offset caused by a difference in amplitude between video signals Sig applied to monitor pixel circuits.

FIG. 25 is a diagram showing a second typical configuration of a circuit for carrying out the operation to correct a detected average electric potential by deliberately providing the detected average electric potential with an offset caused by a difference in amplitude between video signals Sig applied to monitor pixel circuits.

In the case of the circuit shown in the diagram of FIG. 25, voltage dividing resistors DRG1 and DRG2 are employed at the output stage of the first and second monitor horizontal driving circuits 109-1 and 109-2 associated with the first and second monitor pixel sections 107-1 and 107-2 respectively in place of the digital-analog converters DAC in addition to the amplifiers amp each used for amplifying an analog signal generated by one of the voltage dividing resistors DRG1 and DRG2. Each of the voltage dividing resistors DRG1 and DRG2 generates a video signal Sig with an amplitude controllable independently.

In the typical configuration shown in the diagram of FIG. 25, each of the voltage dividing resistors DRG1 and DRG2 employs switches for selecting a resistor series circuit for generating a video signal Sig with a desired amplitude. However, it is also possible to adopt another control method by which a resistor is disconnected by making use of a laser repair technique in order to select a resistor series circuit for generating a video signal Sig with a desired amplitude.

Figure 26A:
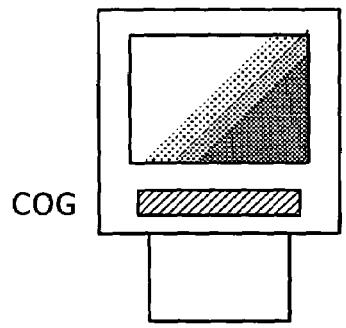
Figure 26B:
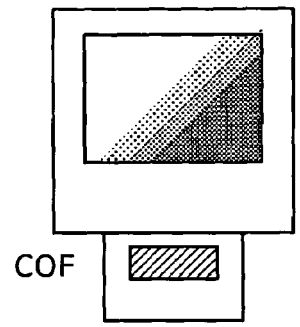
FIG. 26B is a diagram showing an average electric-potential detection system and/or a Sig write system which are implemented as an external IC such as a COF.

It is to be noted that the average electric-potential detection system and/or the Sig writing system do not have to be integrated with the LCD (liquid-crystal display) panel and embedded in the liquid-crystal display panel. That is to say, the average electric-potential detection system and/or the Sig write system can be implemented as an external IC such as a COG (chip on glass), a COF (chip on film) or the like as shown in FIG. 26A or 26B respectively.

Next, the second method is explained. As described earlier, in accordance with the second method, each monitor pixel circuit is provided with an additional capacitor so that an offset is provided deliberately to a detected average electric potential as an offset for correcting the detected electric potential so as to eliminate the shift of the detected electric potential from the target electric potential intended for the display pixel circuit.

Figure 27:
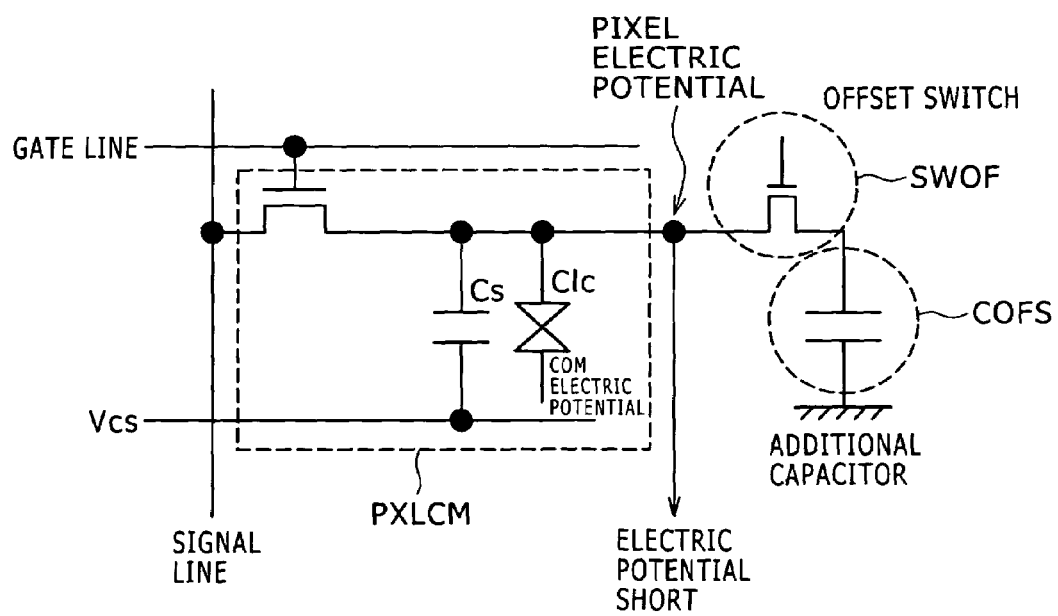
FIG. 27 is an explanatory diagram to be referred to in description of an outline of an operation carried out to correct a detected average electric potential by deliberately providing the detected average electric potential with an offset generated by an additional capacitor.

FIG. 27 is an explanatory diagram referred to in description of an outline of an operation carried out to correct a detected average electric potential by deliberately providing the detected average electric potential with an offset generated by an additional capacitor.

In accordance with the second method, an additional capacitor COFS is attached to the node ND321 of the monitor pixel circuit PXLCM as a capacitor used for adjusting the amount of electric charge accumulated in the monitor pixel circuit PXLCM.

The additional capacitor COF is added to each of the positive-polarity monitor pixel circuit and the negative-polarity monitor pixel circuit. The additional capacitor COF is connected to or disconnected from the monitor pixel circuit PXLCM by adoption of the switching or laser-repair technique in order to adjust the capacitance of the monitor pixel circuit PXLCM. By adjusting the capacitance of the monitor pixel circuit PXLCM, the offset provided to the detected electric potential of the monitor pixel circuit PXLCM can be controlled.

In the typical configuration shown in the diagram of FIG. 27, the switching technique based on an offset switch SWOF is adopted.

Figure 28:
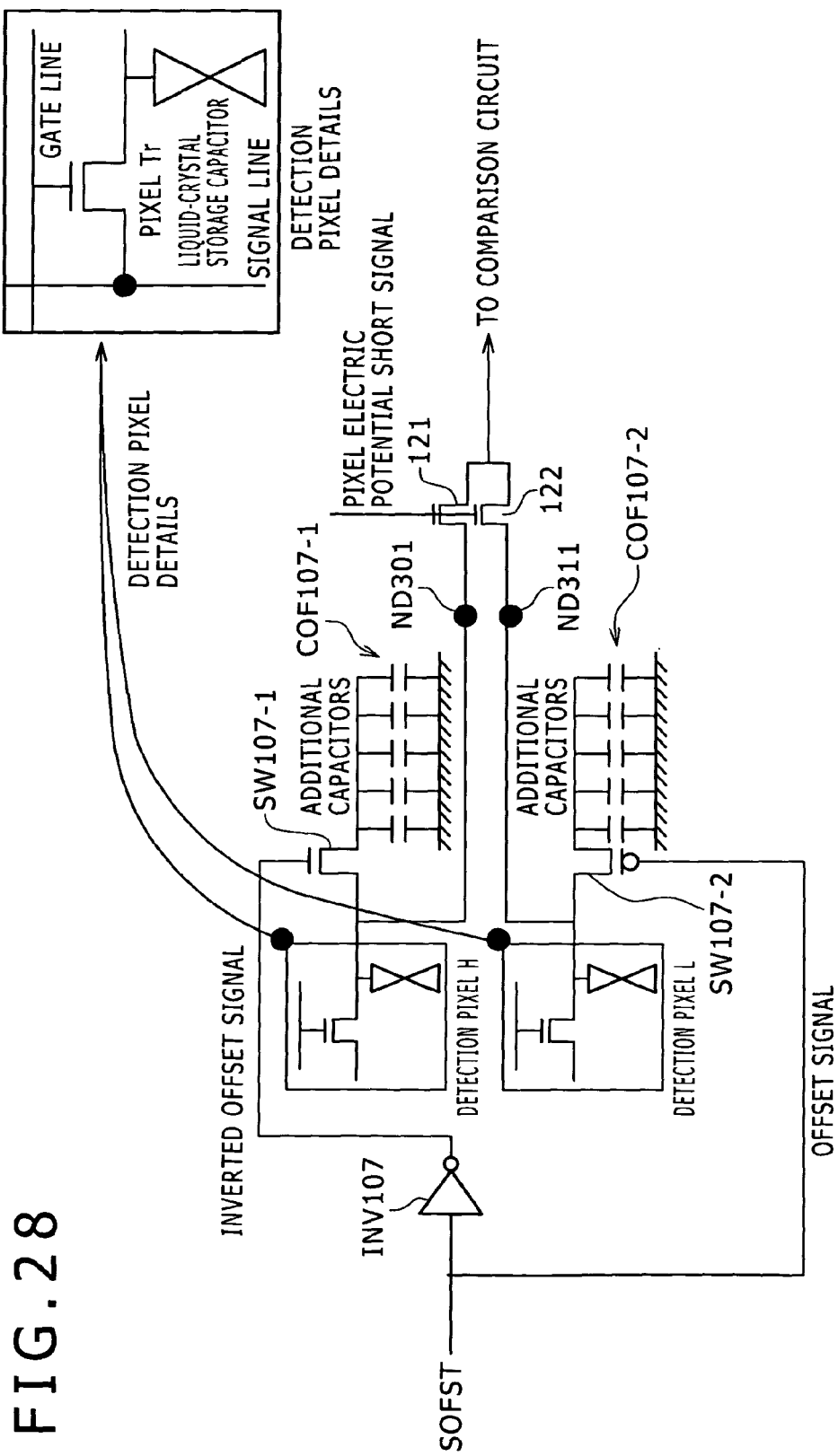
FIG. 28 is a circuit diagram showing a typical configuration of an average electric-potential detection circuit for carrying out an operation to correct a detected average electric potential by deliberately providing the detected average electric potential with an offset generated by additional capacitors.

FIG. 28 is a circuit diagram showing a typical configuration of an average electric-potential detection circuit 124A for carrying out an operation to correct a detected average electric potential by deliberately providing the detected average electric potential with an offset generated by additional capacitors.

The average electric-potential detection circuit 124A shown in the diagram of FIG. 28 includes a plurality of additional capacitors COF107-1 forming a parallel circuit connected to the node ND301 of the first monitor pixel section 107-1 through an NMOS transistor functioning as a switch SW107-1 and a plurality of additional capacitors COF107-2 forming a parallel circuit connected to the node ND311 of the second monitor pixel section 107-2 through a PMOS transistor functioning as a switch SW107-2.

The gate electrode (also referred to as a control electrode) of the switch SW107-1 is connected through an inverter INV107 to a line supplying an offset signal SOFST. On the other hand, the gate electrode (also referred to as a control electrode) of the switch SW107-2 is connected directly to the line supplying the offset signal SOFST.

In the typical configuration shown in the diagram of FIG. 28, the first monitor pixel section 107-1 is shown as a pixel circuit of the positive polarity whereas the second monitor pixel section 107-2 is shown as a pixel circuit of the negative polarity. In addition, in the typical configuration shown in the diagram of FIG. 28, each of switches 121 and 122 for taking the average of the electric potentials appearing in the first monitor pixel section 107-1 and the second monitor pixel section 107-2 is a transistor.

Figure 29:
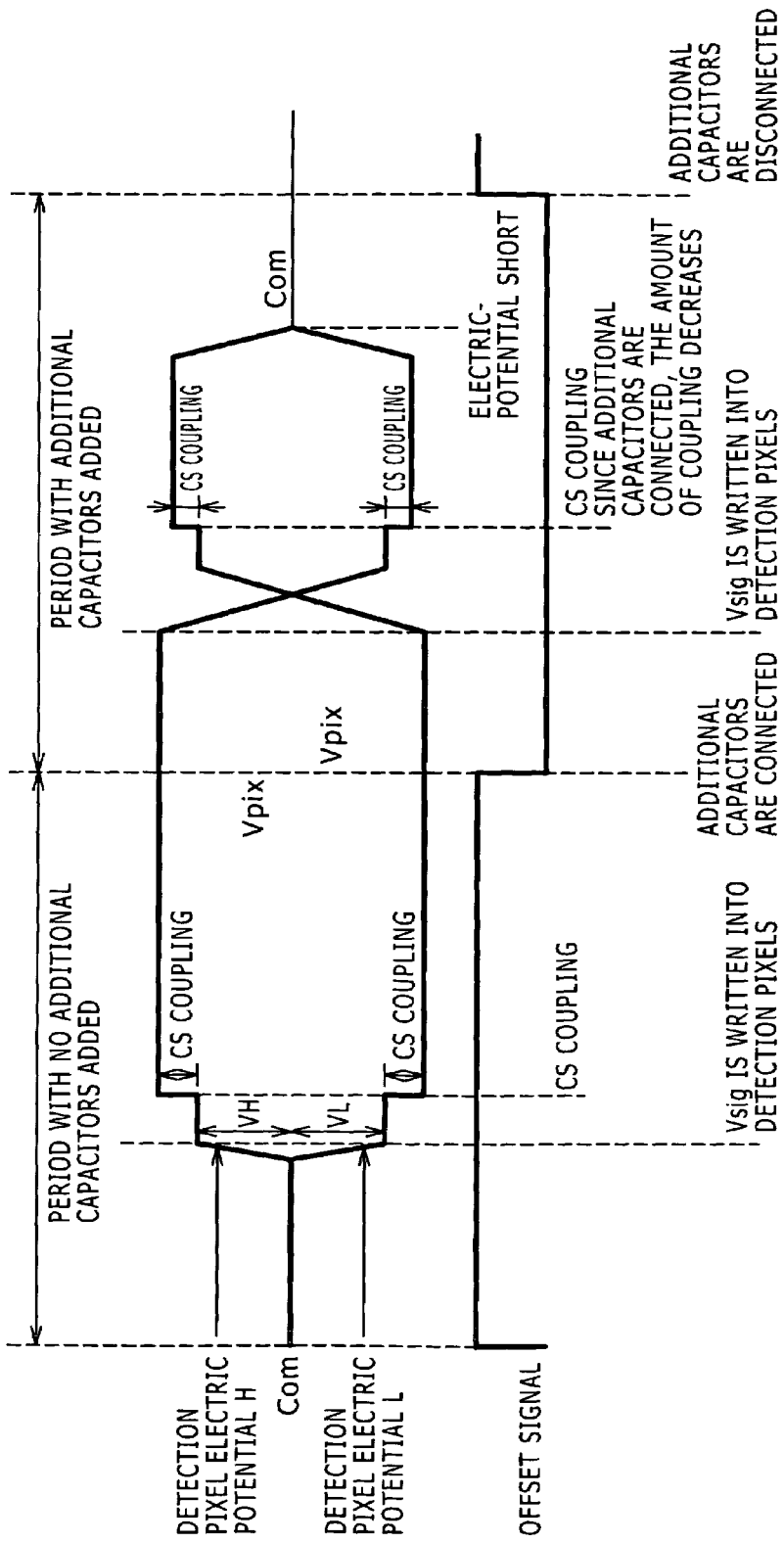
FIG. 29 shows typical timing charts of timings with which the additional capacitors are connected to their respective nodes.

FIG. 29 shows typical timing charts indicating timings with which the additional capacitors COF107-1 and COF107-2 are connected to the nodes ND301 and ND311 respectively.

As shown in the timing charts of FIG. 29, during a period to detect electric potentials each appearing in a pixel circuit, the active-low offset signal SOFTS is set at a low level which is the active-state level. In this state, the additional capacitors COF107-1 and COF107-2 are connected to respectively the nodes ND301 and ND311 at which the pixel electric potentials to be detected appear.

During a period to detect no electric potentials each appearing in a pixel circuit, on the other hand, the offset signal SOFTS is set at a high level which is the inactive-state level. In this state, the additional capacitors COF107-1 and COF107-2 are disconnected from respectively the nodes ND301 and ND311.

In addition, during a period to detect electric potentials each appearing in a pixel circuit, the additional capacitors COF107-1 and COF107-2 are connected to respectively the nodes ND301 and ND311 as described above. Thus, the magnitude of the CS coupling effect decreases.

Figure 30:
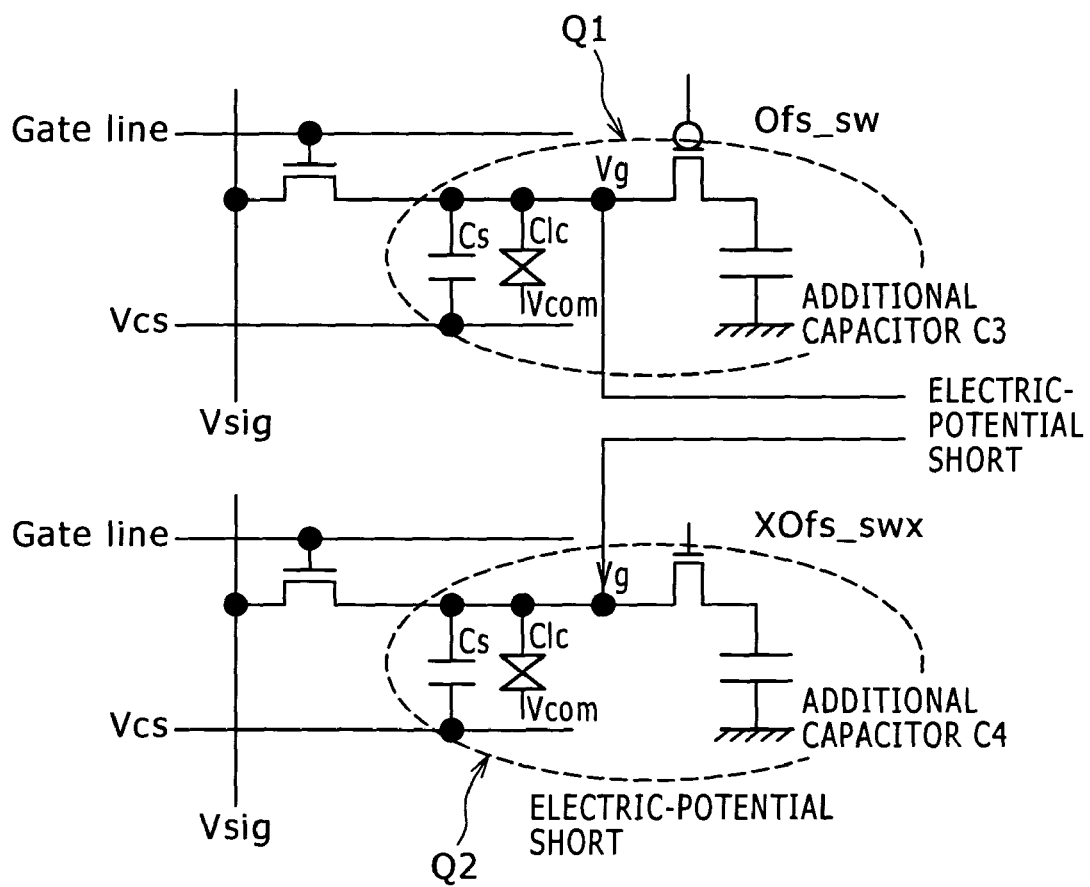
FIG. 30 is a diagram showing a pixel electric-potential shorted-state model of a circuit for correcting detected electric potentials by deliberately providing an offset to each of the electric potentials.

FIG. 30 is a diagram showing a pixel electric-potential short model of a circuit for correcting detected electric potentials by deliberately providing an offset to each of the electric potentials. Model equations based on the pixel electric-potential short model are explained below as equations for the circuit for correcting detected electric potentials by deliberately providing an offset to each of the electric potentials.

[Eq. 2]

$$Q1 = (C1 + C2 + C3)VL + \frac{C1}{(C1 + C2 + C3)} \times Vcs \times (C1 + C2 + C3) \quad (2)$$

$$Q2 = (C1 + C2 + C4)VH - \frac{C1}{(C1 + C2 + C4)} \times Vcs \times (C1 + C2 + C4)$$

$$Q1 + Q2 = (C1 + C2)(VH + VL) +$$

$$C3VL + C4VH = [2(C1 + C2) + C3 + C4]Vcom$$

$$Vcom = \frac{(C1 + C2)(VH + VL) + C3VL + C4VH}{2(C1 + C2) + C3 + C4}$$

Notations used in the above equations are explained as follows:

Notation C1 denotes the capacitance of the liquid-crystal cell Clc;

Notation C2 denotes the capacitance CS of the storage capacitor Cs;

Notation C3 denotes the capacitance of an additional capacitor added on the L (negative-polarity) side;

Notation C4 denotes the capacitance of an additional capacitor added on the H (positive-polarity) side;

Notation VH denotes an electric potential to be written into the pixel circuit from the signal line on the positive-polarity side; and Notation VL denotes an electric potential to be written into the pixel circuit from the signal line on the negative-polarity side.

Figure 31:
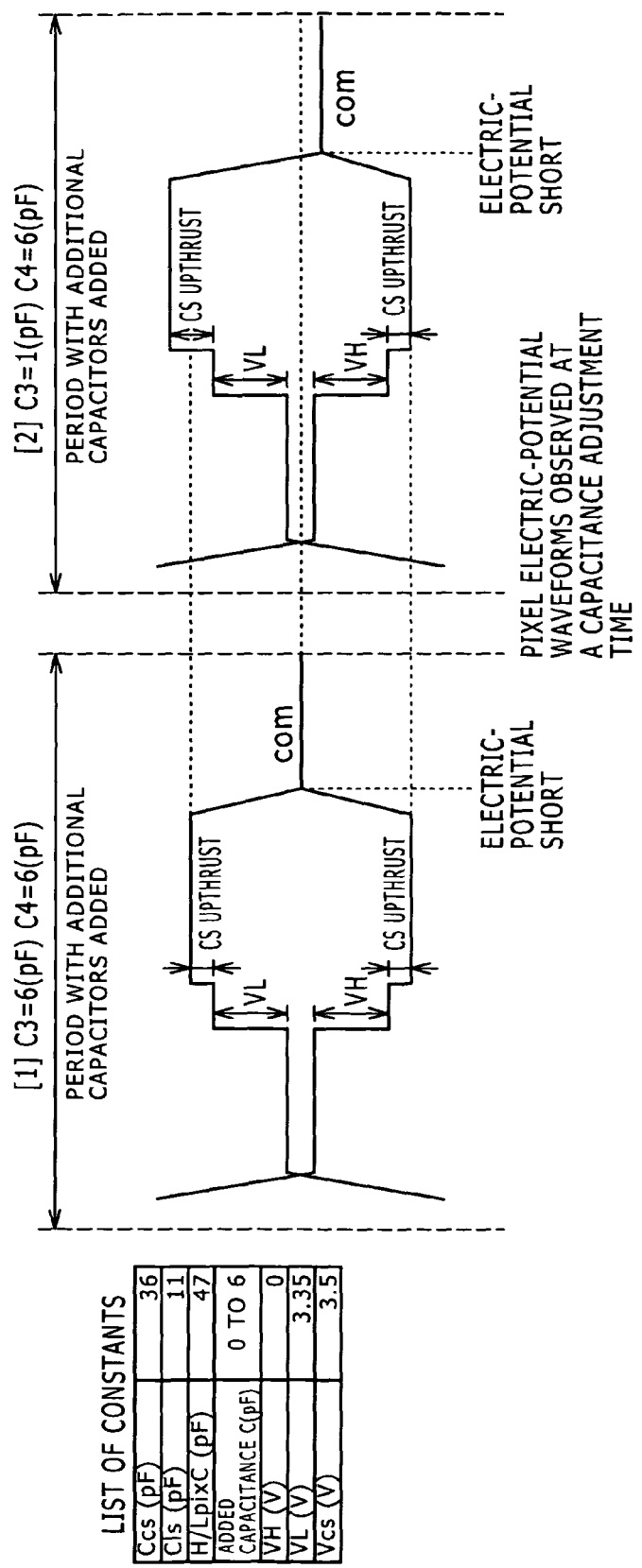
FIG. 31 shows the waveforms of the electric potentials, [1] of FIG. 31 is a diagram showing the waveforms of the electric potentials for certain capacitances of the additional capacitors whereas [2] of FIG. 31 is a diagram showing the waveforms of the electric potentials for other capacitances (different from the other capacitances) of the additional capacitors.

A model equation is given below. FIG. 31 is a plurality of diagrams each showing the waveforms of the electric potentials VL and VH for certain capacitances of capacitors. To be more specific, [1] of FIG. 31 is a diagram showing the waveforms of the electric potentials VL and VH for C3=6 pF and C4=6 pF whereas [2] of FIG. 31 is a diagram showing the waveforms of the electric potentials VL and VH for C3=1 pF and C4=6 pF. When the capacitance C3 is changed from 6 pF to 1 pF, the center value com of the common voltage signal Vcom changes as described below.

[Eq. 3]

First of all, from Eq. (2) of the model equations given above, the center value com of the common voltage signal com is expressed as follows:

$$com = \frac{(C1 + C2)(VH + VL) + C3VL + C4VH}{2(C1 + C2) + C3 + C4} \quad (3)$$

Let us assume that C1=11 pF, C2=36 pF, VL=3.35 V and VH=0 V (which is a value taken as a reference voltage). Then, the typical numerical values are substituted into Eq. (3) as follows.

For the waveforms shown in the diagram of FIG. 31:

$$com = \frac{(11 + 36)(0 + 3.35) + 6 \times 3.35 + 6 \times 0}{2(11 + 36) + 6 + 6} \quad (3\text{-}1)$$

$$= 1.675 \, (V)$$

For the waveforms shown in the diagram of FIG. 31:

$$com = \frac{(11 + 36)(0 + 3.35) + 6 \times 3.35 + 6 \times 0}{2(11 + 36) + 1 + 6} \quad (3\text{-}2)$$

$$= 1.593 \, (V)$$

As is obvious from the values expressed by Eqs. (3-1) and (3-2) as the computed values of the average com, a change of the capacitance C3 of the additional capacitor added on the L (negative-polarity) side provides an offset for correcting the detected electric potential. That is to say, the values expressed by Eqs. (3-1) and (3-2) as the computed values of the average com prove that the offset deliberately given to a detected electric potential can be used as an offset for correcting the detected electric potential.

FIG. 32 is a diagram showing a typical configuration for changing the capacitances of the additional capacitors which are provided as a COF.

As shown in the diagram of FIG. 32, the capacitances of the additional capacitors COF can be controlled by putting each of switches SWOF in a turned-on or turned-off state in accordance with control signals CTL applied to the switches SWOF. As an alternative, any one of the additional capacitors COF can be physically disconnected by making use of a laser in order to set the capacitances of the additional capacitors COF.

In addition, as described previously, in a configuration according to the embodiment, available pixel circuits (also each referred to as a display pixel circuit or an effective pixel circuit) and monitor pixel circuits are laid out individually. Detection lines which convey electric potentials detected from the monitor pixel circuits are shorted to each other by making use of the switches 121 and 122 in order to find the average of the detected electric potentials.

In this configuration, an electric potential may be deformed, depending on whether or not a process to rewrite a video signal into each of the monitor pixel circuits is carried out after the operation to short the detection lines, which convey electric potentials detected from the monitor pixel circuits, to each other. Thus, the pixel function may deteriorate as evidenced by, for example, a burn-in phenomenon.

In order to solve this problem, in accordance with the embodiment, there is provided a configuration in which a process to rewrite a video signal is carried out after the operation to short the detection lines, which convey electric potentials detected from the monitor pixel circuits, to each other. By carrying out the process to rewrite a video signal, the deformation of the electric potential is corrected so as to provide electrical protection to the pixel circuit.

In accordance with the embodiment, an operation is carried out in order to short the detection lines, which convey electric potentials detected from the monitor pixel circuits for the positive (+) and negative (−) polarities, to each other. By shorting the detection lines, the average of the electric potential can be generated as an average used for adjusting the center value of the common voltage signal Vcom.

In a normal operation to drive a liquid-crystal cell, the common voltage signal Vcom for driving the liquid-crystal cell is an AC voltage like one shown in a diagram of FIG. 33A. With such an AC voltage, the electric potential of the pixel circuit can be prevented from being deformed.

In the case of a system in which a switch is put in shorted and open states alternately and repetitively in order to detect an electric potential of a pixel circuit, however, it is feared that the electric potential is deformed as shown in a diagram of FIG. 33B.

In a shorted state, the period of the negative polarity becomes short, causing the electric potential to deform. In the typical case shown in the diagram of FIG. 33B, the period of the negative polarity becomes short in a particular pixel circuit but it is the period of the positive polarity that adversely becomes short in a pixel circuit forming a pair with the particular pixel circuit.

FIG. 34 is an explanatory diagram referred to in description of a method for preventing an electric potential detected from a monitor pixel circuit from being deformed as a result of a process to put a detection line conveying the detected electric potential in a shorted state.

After the detection-result output circuit 110 serving as a detection system fetches a desired average electric potential from the pixel circuits, it is not necessary to sustain the shorted state. Thus, after a detection process is completed, the same pixel electric potential as the pre-short one is again written into the pixel circuit. Prior to the operation to rewrite the pixel electric potential into the pixel circuit, it is necessary to once carry out a rewrite preparation process. A system for carrying out a rewrite preparation process prior to the operation to rewrite the pixel electric potential into the pixel circuit will be described later.

FIG. 35 is an explanatory diagram referred to in concrete description of the method for preventing an electric potential detected from a monitor pixel circuit from being deformed as a result of a process to put a detection line conveying the detected electric potential in a shorted state.

As shown in the diagram of FIG. 35, after a pixel electric potential pix is written into the pixel circuit by way of the TFT serving as the pixel transistor, the pixel electric potential pix reaches a desired level due to a CS coupling effect. In a first write operation, once such a CS coupling effect occurs. Thus, an ingenious attempt needs to be made in order to prevent another CS coupling effect from further raising the pixel electric potential pix at a rewrite time.

Such an attempt is made in a rewrite preparation process to change the capacitor signal CS in a direction opposite to the present polarity of the capacitor signal CS. The rewrite preparation process may lower or raise the capacitor signal CS by changing the capacitor signal CS in the L (downward) or H (upward) direction in accordance with the polarity of the pixel circuit. That is to say, the rewrite preparation process generates a CS coupling effect in a direction opposite to the direction of the other CS coupling effect which will occur at the rewrite time.

Of course, when the capacitor signal CS is changed, the electric potential pix appearing in the pixel circuit is also affected by the change. If the rewrite preparation process is carried out with a timing immediately preceding the gate pulse used to trigger the operation to rewrite the video signal represented by the electric potential pix into the pixel circuit as shown in the diagram of FIG. 35, however, the normal video signal will be rewritten into the pixel circuit right after the rewrite preparation process so that the effect of the change occurring in the preparation process on the electric potential pix will be canceled by a pix change caused by the video signal rewrite operation.

Figure 36:
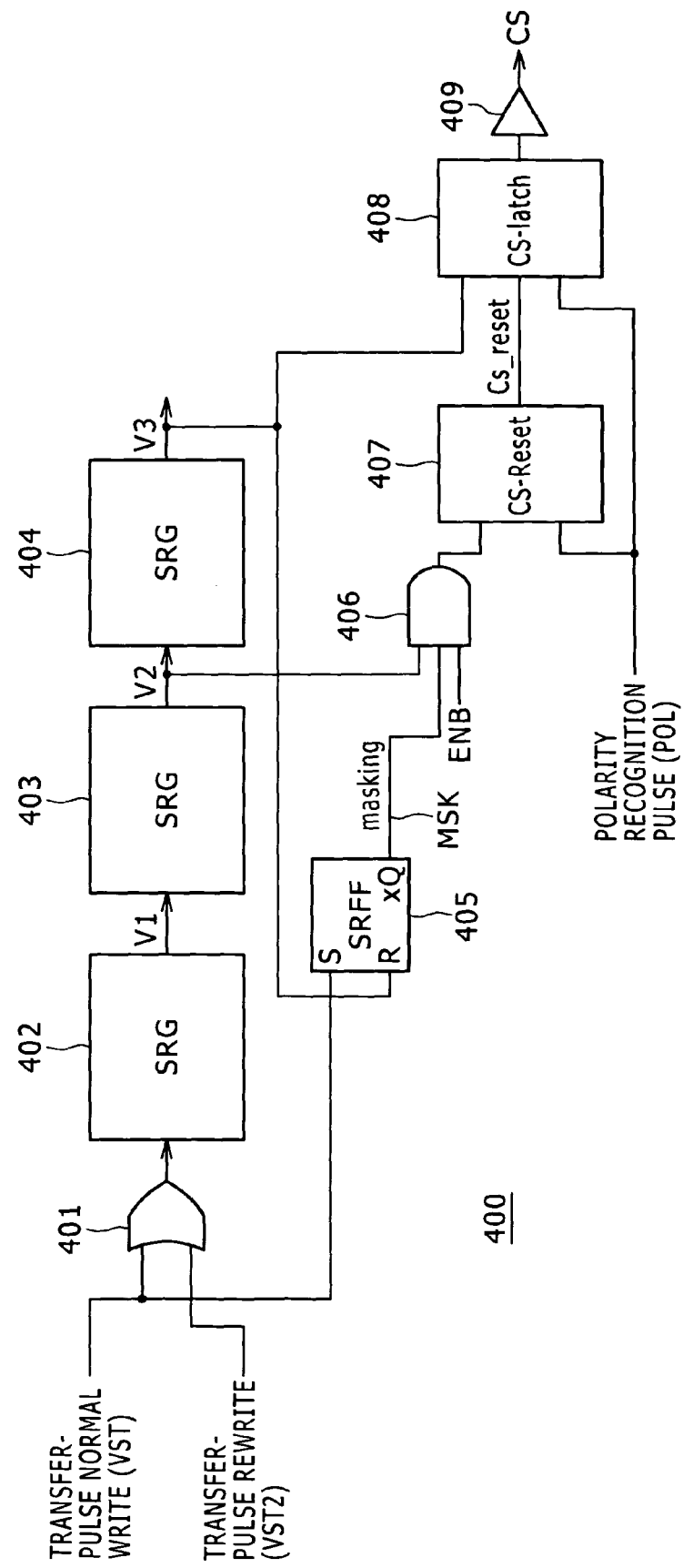
FIG. 36 is a diagram showing a first typical configuration of an electric-potential deformation preventing circuit for preventing a detected electric potential from being deformed in a process of shorting detection lines, which convey electric potentials each appearing in a monitor pixel circuit, to each other.
Figure 37A:
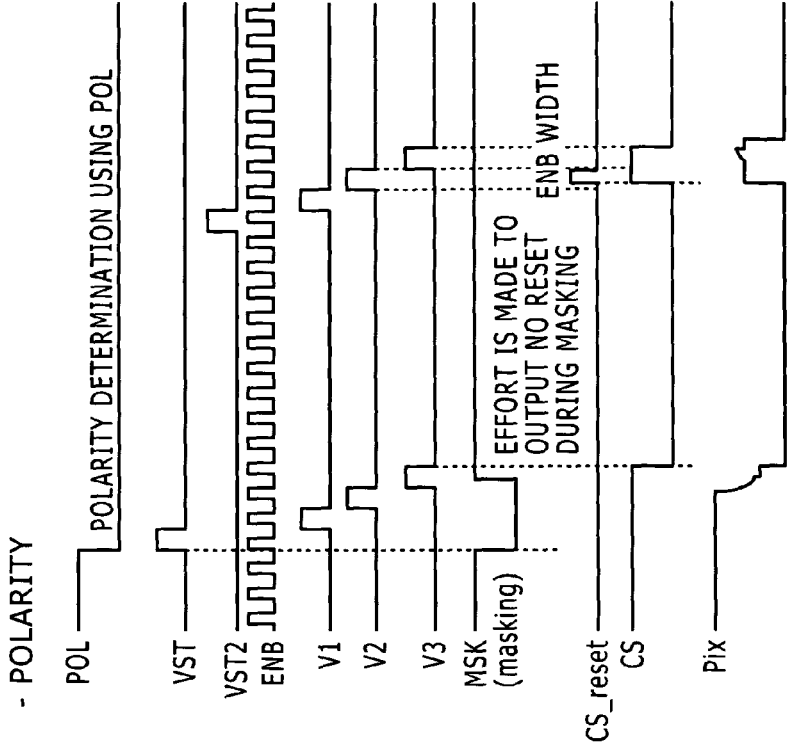
FIGS. 37A and 37B show timing charts of signals appearing in the electric-potential deformation preventing circuit shown in the diagram of FIG. 36.
Figure 37B:
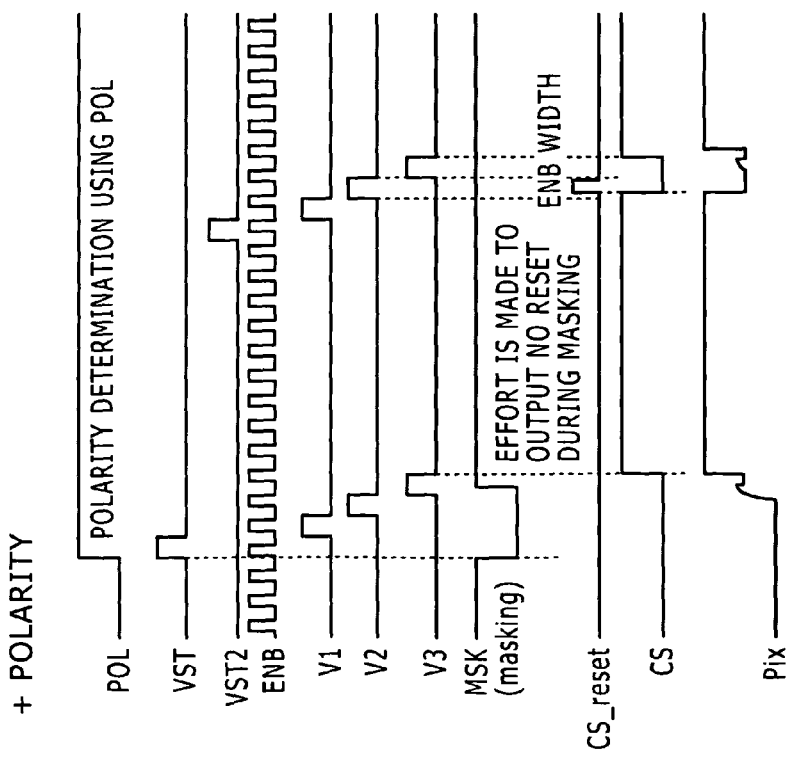

FIG. 36 is a diagram showing a first typical configuration of an electric-potential deformation preventing circuit 400 for preventing a detected electric potential from being deformed in a process of shorting the detection lines, which convey electric potentials each appearing in a monitor pixel circuit, to each other. FIGS. 37A and 37B show timing charts of signals appearing in the electric-potential deformation preventing circuit 400 shown in the diagram of FIG. 36.

As shown in the diagram of FIG. 36, the electric-potential deformation preventing circuit 400 includes a 2-input OR gate 401, shift registers 402 to 404, an SR flip-flop (SRFF) 405, a 3-input AND gate 406, a CS reset circuit 407, a CS latch circuit 408 and an output buffer 409. The 2-input OR gate 401 receives a transfer pulse VST (also referred to as a vertical start pulse VST) used for normal signal write operations and another rewrite transfer pulse VST2 used for video signal rewrite operations, computing a logical sum of the normal-write transfer pulse VST and the other rewrite transfer pulse VST2. The shift registers 402 to 404 are wired to the output terminal of the 2-input OR gate 401 in a cascade connection forming a series circuit. The SRFF 405 is set by the transfer pulse VST used for normal signal write operations and reset by a pulse V3 generated by the shift register 404 provided at the last stage of the cascade connection. The SRFF 405 outputs an active-low masking signal MSK from an inverted output terminal XQ thereof. The 3-input AND gate 406 receives an output pulse V2 generated by the shift register 403 provided at the middle stage of the cascade connection, the masking signal MSK and an enable signal ENB, computing a logical product of the output pulse V2, the masking signal MSK and the enable signal ENB. The CS reset circuit 407 inputs an output signal S406 from the 3-input AND gate 406 synchronously with a polarity synchronization pulse POL and outputs a CS reset signal Cs_reset to the CS latch circuit 408. The CS latch circuit 408 latches an output pulse V3 from the SRG 404 synchronously with the polarity synchronization pulse POL and resets the latched data in accordance with the CS reset signal Cs_reset received from the CS reset circuit 407. The output buffer 409 is a buffer for outputting a signal from the CS latch circuit 408 as the capacitor signal CS.

As described above, the electric-potential deformation preventing circuit 400 shown in the diagram of FIG. 36 employs the CS reset circuit 407, making it possible to carry out a rewrite preparation process. The CS reset circuit 407 recognizes the present polarity of the capacitor signal CS and carries out a reset operation (or the rewrite preparation process) in a direction opposite to the recognized polarity. For this reason, the CS reset circuit 407 makes use of the pulse V2 received from the shift register 403 by way of the 3-input AND gate 406 so that the rewrite preparation process can be carried out immediately before the operation to rewrite the video signal into the pixel circuit.

In addition, in order to change the capacitor signal CS in a direction opposite to the present polarity of the capacitor signal CS, that is, in order to change the capacitor signal CS in a direction causing a CS coupling effect to occur in a direction opposite to the direction of the other CS coupling effect which will occur at the rewrite time, it is necessary to determine the present polarity of the capacitor signal CS. That is why the CS reset circuit 407 also receives the polarity recognition pulse POL.

In addition, during a masking operation, the CS reset signal Cs_reset is not output.

In this typical configuration, the operation to write the video signal into the pixel circuit is carried out with a timing determined by the pulse V3.

Figure 38:
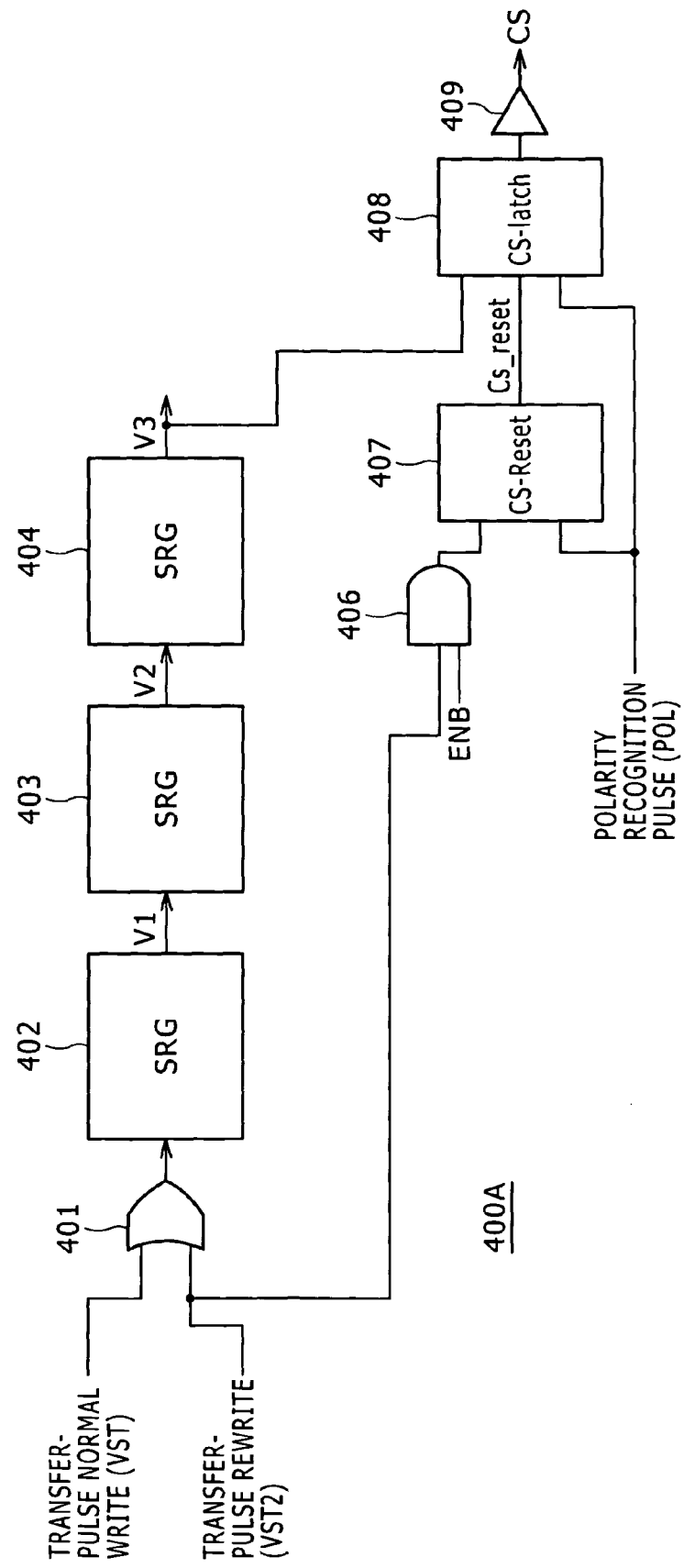
FIG. 38 is a diagram showing a second typical configuration of the electric-potential deformation preventing circuit for preventing a detected electric potential from being deformed in a process of shorting detection lines, which convey electric potentials each appearing in a monitor pixel circuit, to each other.
Figure 39A:
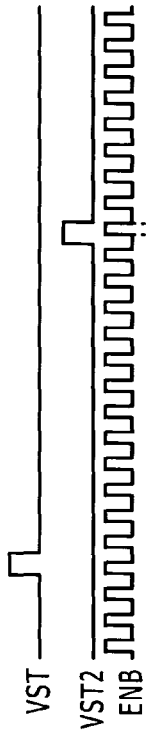
FIGS. 39A and 39B show timing charts of signals appearing in the electric-potential deformation preventing circuit shown in the diagram of FIG. 38.
Figure 39B:
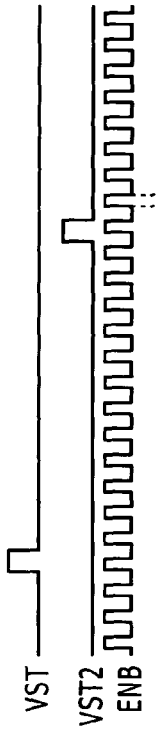

FIG. 38 is a diagram showing a second typical configuration of an electric-potential deformation preventing circuit for preventing a detected electric potential from being deformed in a short process of electric potentials each appearing in a monitor pixel circuit. FIGS. 39A and 39B show timing charts of signals appearing in an electric-potential deformation preventing circuit 400A shown in the diagram of FIG. 38.

In the electric-potential deformation preventing circuit 400A shown in the diagram of FIG. 38, the rewrite preparation process is carried out without considering the masking period set by the SRFF 405 employed in the electric-potential deformation preventing circuit 400 shown in the diagram of FIG. 36. However, the configuration of the electric-potential deformation preventing circuit 400A is simpler than the configuration of the electric-potential deformation preventing circuit 400 shown in the diagram of FIG. 36 in that the electric-potential deformation preventing circuit 400A does not include the SRFF 405 employed in the electric-potential deformation preventing circuit 400. It is also possible to provide the electric-potential deformation preventing circuit 400A with a configuration in which the rewrite preparation process is carried out with a timing determined by the rewrite transfer pulse VST2.

The electric-potential deformation preventing circuit 400A shown in the diagram of FIG. 38 is useful for a long reset period as far as the reset period is acceptable.

It is to be noted that each of the electric-potential deformation preventing circuit 400 and the electric-potential deformation preventing circuit 400A can be integrated in the active-matrix display apparatus 100 by adoption of an LTPS (low-temperature poly-silicon) technology or attached to the active-matrix display apparatus 100 as a COG, a COF or the like.

Next, the layout of gate lines in the monitor circuit 120 is explained.

As described previously, in this embodiment, the gate lines are provided so as to form the so-called nesting layout. Basically, however, if the time constant of the gate line in the display pixel circuit (or the available pixel circuit) is different from the time constant of the gate line in the monitor pixel circuit, there will also be a difference in generated electric potential between the display pixel circuit and the monitor pixel circuit. Each of the circuit for correcting the center value of the common voltage signal Vcom and circuits to be described later as circuits for correcting the capacitor signal CS and the video signal Sig is designed to operate on the assumption that there is no difference in generated electric potential between the display pixel circuit and the monitor pixel circuit. If there is a difference in generated electric potential between the display pixel circuit and the monitor pixel circuit, it is feared that the output of each of the correction circuits is shifted from the target electric potential intended for the display pixel circuit.

In order to solve the problem described above, the monitor pixel circuit with a gate line having a small time constant is provided with an adjustment resistor. To put it concretely, an ingenious attempt is made to devise the shape of the gate line in the monitor pixel circuit so that the gate line also serves as a resistor. In this way, the time constant of the gate line in the monitor pixel circuit can be made equal to the time constant of the gate line in the display pixel circuit. Thus, the problem is solved.

Each of FIGS. 40A to 40C is an explanatory diagram referred to in description of causes of the difference in generated electric potential between the display pixel circuit and the monitor pixel circuit. To be more specific, FIG. 40A is a diagram showing an equivalent of a pixel unit whereas FIG. 40B is a diagram showing a comparison of the waveforms of signals applied to gate electrodes. FIG. 40C is an explanatory diagram showing a description of phenomena occurring along the time axis as a description of causes of differences in time constant.

As shown in the diagrams of FIGS. 40A to 40C, in general, the deformation of a signal applied to the gate causes electric charge to be re-injected from the liquid-crystal capacitance Ccl so that the electric potential appearing in the pixel circuit is shifted.

If the deformation of a signal applied to the gate of the transistor employed in the monitor pixel circuit (also referred to as a detection pixel circuit) is different from the deformation of a signal applied to the gate of the transistor employed in the display pixel circuit, the shift of the electric potential appearing in the monitor pixel circuit is also different from the shift of the electric potential appearing in the display pixel circuit. As a result, it is feared that the signal correction circuit does not work correctly in some cases.

FIG. 41A is a diagram showing a layout model of an available pixel circuit (also referred to as a display pixel circuit) according to the embodiment whereas FIG. 41B is a diagram showing a layout model of a monitor pixel circuit (also referred to as a detection pixel circuit) according to the embodiment.

In the embodiment, in order to adjust the time constants of gate lines GT1 and GT2 in the monitor circuit 120, each of the gate lines GT1 and GT2 is bent to form a zigzag shape as shown in FIG. 41B. In the case of a gate line bent to form a zigzag shape, the time constant of the gate line is determined by the number of zigzag waves.

Each of FIGS. 42A and 42B is an explanatory diagram referred to in description of a method for making the time constants of gate lines match each other.

In the examples shown in the diagrams of FIGS. 42A and 42B, the layouts of resistive wires are devised so that the time constant at a measurement point MPNT1 in a display pixel load model matches the time constant at a measurement point MPNT2 in a monitor pixel load model.

Figure 43A:
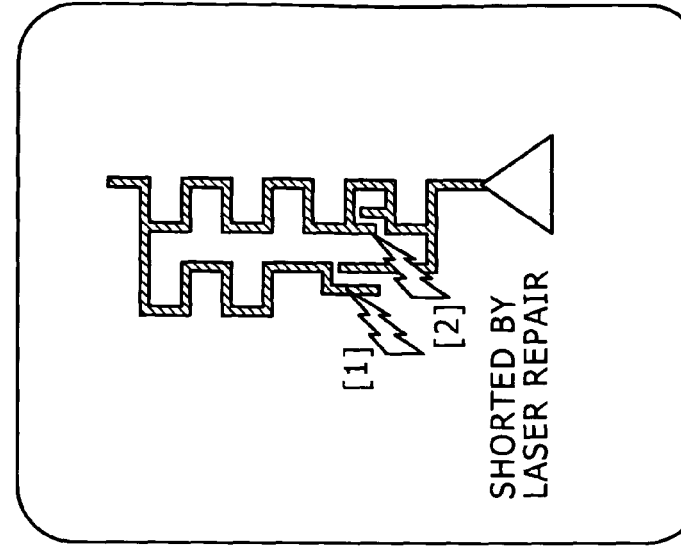
FIGS. 43A to 43C are each a diagram showing an example of making use of a layout option taken in the method for making the time constants of gate lines match each other.
Figure 43B:
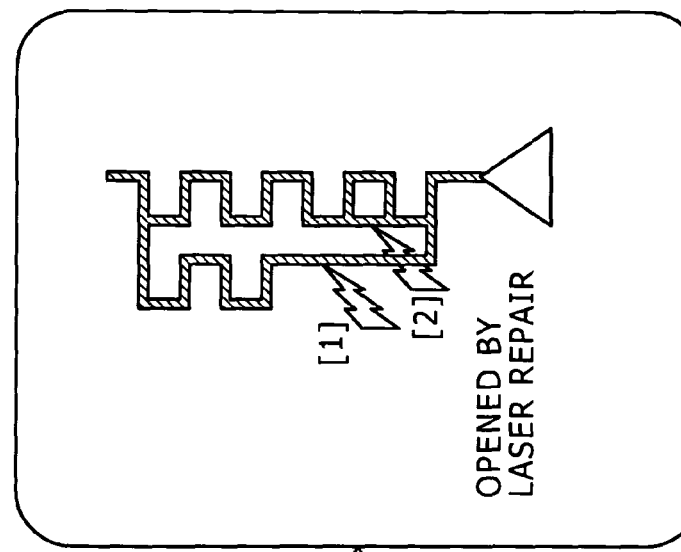
Figure 43C:
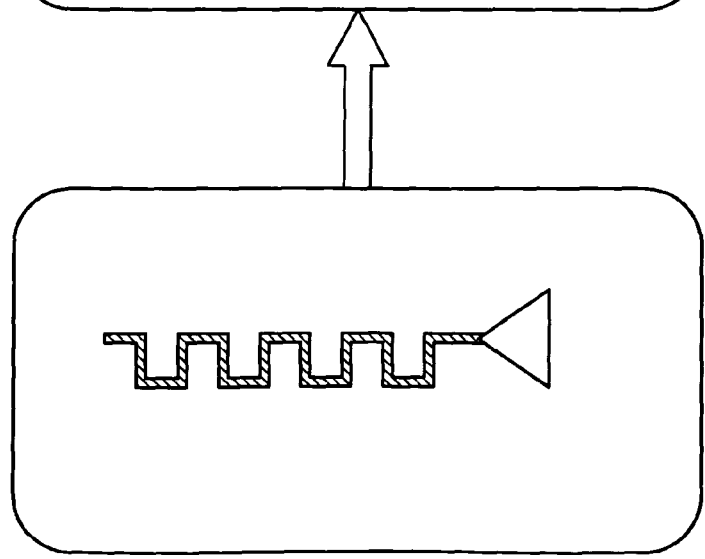

Each of FIGS. 43A to 43C is a diagram showing an example of making use of a layout option taken in the method for making the time constants of gate lines match each other.

In the examples shown in the diagrams of FIGS. 43A to 43C, an ordinary layout can also be changed to a parallel-line layout such as option layout 1 or 2. If a detected electric potential becomes abnormal after the manufacturing process, the time constant can be adjusted by adoption of the laser-repair technique.

The above description has explained a system for automatically adjusting (or correcting) the center value of the common voltage signal Vcom. Next, the value of the common voltage signal Vcom according to the embodiment is described.

In the embodiment, the common voltage signal Vcom, which is typically a series of pulses with a small amplitude and a polarity typically changing once every 1H (horizontal scan period), is supplied through the supply line 112 to the second pixel electrode of the liquid-crystal cell LC201 employed in every display pixel circuit PXLC of the available pixel section 101, the second pixel electrode of the liquid-crystal cell LC301 employed in every detection pixel circuit of the first monitor pixel section 107-1 and the second pixel electrode of the liquid-crystal cell LC311 employed in every detection pixel circuit of the second monitor pixel section 107-2 as a signal common to all pixel circuits.

Each of the amplitude ΔVcom of the common voltage signal Vcom and a difference ΔVcs can be set at a selected value optimizing both the black luminance and the white luminance. As described earlier, the difference ΔVcs is the difference between the first level CSH of the capacitor signal CS and second level CSL of the capacitor signal CS.

For example, as will be described later, each of the amplitude ΔVcom of the common voltage signal Vcom and the CS electric potential ΔVcs is set at such a value that an effective pixel electric potential ΔVpix_W applied to the liquid-crystal cell LC201 in a white display does not exceed 0.5 V.

A common-voltage generation circuit for generating the common voltage signal Vcom can be embedded in the liquid-crystal display panel or provided as a circuit external to the liquid-crystal display panel. If the common-voltage generation circuit is provided as a circuit external to the liquid-crystal display panel, the common voltage signal Vcom is supplied as an external voltage to the liquid-crystal display panel.

The small amplitude ΔVcom is generated due to a capacitive coupling effect. As an alternative, the small amplitude ΔVcom can also be generated digitally.

It is desirable to generate the small amplitude ΔVcom having a very small magnitude typically in a range of about 10 mV to 1.0 V. This is because, if the small amplitude ΔVcom has a magnitude outside the range, the amplitude ΔVcom will reduce effects such as an effect of improving a response speed in the event of overdriving and an effect of reducing acoustic noises.

As described above, each of the amplitude ΔVcom of the common voltage signal Vcom and the difference ΔVcs can be set at a selected value optimizing both the black luminance and the white luminance. As explained earlier, the difference ΔVcs is the difference between the first level CSH of the capacitor signal CS and second level CSL of the capacitor signal CS.

For example, as will be described later, each of the amplitude ΔVcom of the common voltage signal Vcom and the CS electric potential ΔVcs is set at such a value that an effective pixel electric potential ΔVpix_W applied to the liquid-crystal cell LC201 in a white display does not exceed 0.5 V.

The capacitive coupling driving method according to the embodiment is described in more detail as follows.

FIGS. 44A to 44E show the timing charts of main signals driving the pixel circuit including the liquid-crystal cell in accordance with the embodiment. To be more specific, FIG. 44A shows the timing chart of the gate pulse GP_N, FIG. 44B shows the timing chart of the common voltage signal Vcom, FIG. 44C shows the timing chart of the capacitor signal CS_N, FIG. 44D shows the timing chart of the video signal Vsig and FIG. 44E shows the timing chart of the signal Pix_N applied to the liquid-crystal cell.

In the capacitive coupling driving operation carried out in accordance with the embodiment, the common voltage signal Vcom is not a fixed DC voltage. Instead, the common voltage signal Vcom is a series of pulses with a small amplitude and a polarity typically changing once every horizontal scan period or once every 1H. The common voltage signal Vcom is supplied to the second pixel electrode of the liquid-crystal cell LC201 employed in every display pixel circuit PXLC of the available pixel section 101, the second pixel electrode of the liquid-crystal cell LC301 employed in every detection pixel circuit of the first monitor pixel section 107-1 and the second pixel electrode of the liquid-crystal cell LC311 employed in every detection pixel circuit of the second monitor pixel section 107-2 of the monitor circuit 120 as a signal common to all pixel circuits.

In addition, the capacitor lines 105-1 to 105-$m$ are provided independently of each other for the m respective rows of the matrix in the same way as the gate lines 104-1 to 104-$m$. The vertical driving circuit 102 also asserts capacitor signals CS1 to CSm on the capacitor lines 105-1 to 105-$m$ respectively. Each of the capacitor signals CS1 to CSm is set selectively at a first level CSH such as a voltage in the range 3 to 4 V or a second level CSL such as 0 V.

In the capacitive coupling driving operation, the effective pixel electric potential ΔVpix applied to the liquid crystal can be expressed by Eq. (4) given as follows.

[Eq. 4]

$$\Delta Vpix3 = Vsig + \frac{Ccs}{Ccs + Clc + Cg + Csp} * \Delta Vcs + \frac{Clc}{Ccs + Clc + Cg + Csp} * \frac{\Delta Vcom}{2} - Vcom$$

$$\approx Vsig + \frac{Ccs}{Ccs + Clc} * \Delta Vcs + \frac{Clc}{Ccs + Clc} * \frac{\Delta Vcom}{2} - Vcom$$

(4)

Notations used in Eq. (4) are explained by referring to FIGS. 44 and 45 as follows. Notation Vsig denotes the video signal voltage appearing on the signal line 106. Notation Ccs denotes the capacitance of the storage capacitor Cs201. Notation Clc denotes the capacitance of the liquid-crystal cell LC201. Notation Cg is a stray capacitance between the node ND201 and the gate line 104. Notation Csp is a stray capacitance between the node ND201 and the signal line 106. Notation ΔVcs denotes the electric potential of the capacitor signal CS appearing on the capacitor line 105. Notation Vcom denotes the common voltage signal applied to the second pixel electrode of the liquid-crystal cell LC201 as a signal common to all pixel circuits.

The second term {Ccs/(Ccs+Clc)} ΔVcs of the approximation equation in Eq. (4) is a term causing the white luminance side to become black or to sink due to the nonlinearity property of the liquid crystal dielectric constant ∈. On the other hand, the third term {Clc/(Ccs+Clc)} ΔVcom/2 is a term causing the white luminance side to become whiter or to float due to the nonlinearity property of the liquid crystal dielectric constant ∈.

That is, the function of the third term to cause the white luminance side to become whiter or to float corrects the tendency of the second term to cause the white luminance side to become black or to sink.

Then, each of the CS electric potential ΔVcs and an amplitude ΔVcom is set at such a value that both the black luminance and the white luminance can be optimized. As a result, an optimum contrast level can be obtained.

Figure 46A:
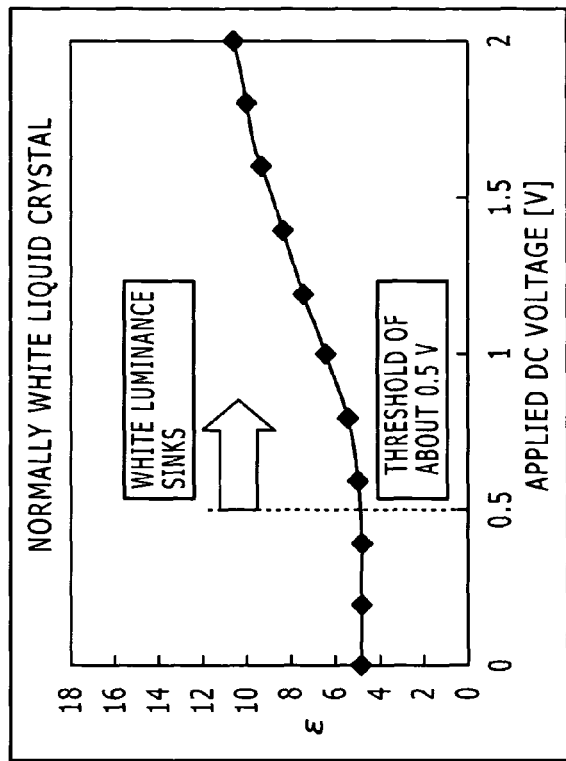
FIGS. 46A and 46B are each an explanatory diagram to be referred to in description of a criterion for selecting the value of an effective pixel electric potential applied to a liquid-crystal cell in a white display in the case of a normally white liquid-crystal cell used in the liquid-crystal display apparatus as a liquid-crystal material.
Figure 46B:
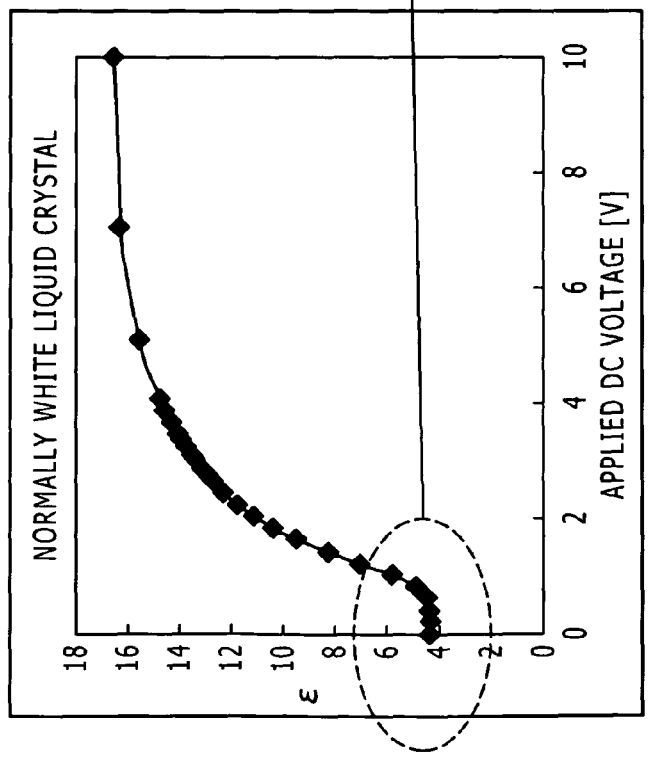

Each of FIGS. 46A and 46B is an explanatory diagram referred to in description of a criterion for selecting the value of the effective pixel electric potential ΔVpix_W applied to the liquid-crystal cell in a white display in the case of a normally white liquid-crystal cell used in the liquid-crystal display apparatus 100 as a liquid-crystal material. That is to say, in this case, the liquid crystal material used in the liquid-crystal display apparatus 100 is the normally white liquid crystal. To put it in detail, FIG. 46A is a diagram showing a characteristic representing a relation between the liquid crystal dielectric constant ∈ and the voltage applied to the liquid crystal whereas FIG. 46B is an enlarged diagram showing a portion enclosed by an ellipse as a portion of the characteristic shown in the diagram of FIG. 46A.

In accordance with the characteristic of the liquid crystal material used in the liquid-crystal display apparatus 100, as shown in the diagrams of FIGS. 46A and 46B, if a voltage at least equal to about 0.5 V is applied to the liquid-crystal cell, the white luminance sinks inevitably. Thus, in order to optimize the white luminance, it is necessary to keep the effective pixel electric potential ΔVpix_W applied to the liquid-crystal cell in a white display at a value not greater than 0.5 V. For this reason, each of the CS electric potential ΔVcs and the amplitude ΔVcom is set at such a value that the effective pixel electric potential ΔVpix_W applied to the liquid crystal does not exceed 0.5 V.

An actual evaluation indicates that, by setting the CS electric potential ΔVcs at 3.8 V and the amplitude ΔVcom at 0.5 V, an optimum contrast level can be obtained.

Figure 47:
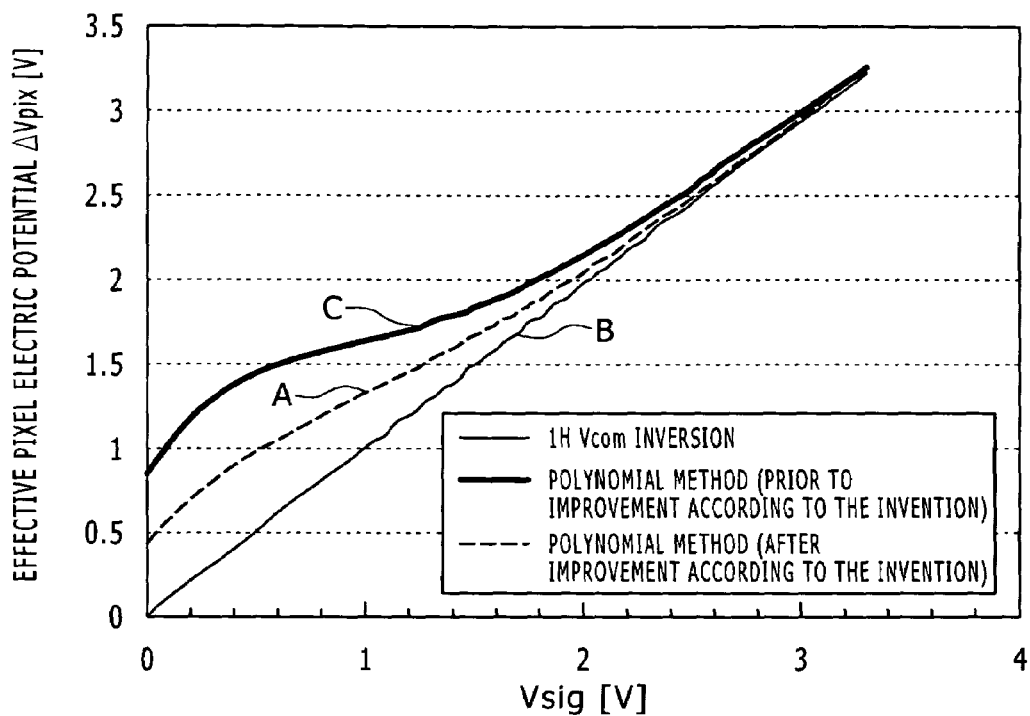
FIG. 47 is a diagram showing relations between a video signal voltage and an effective pixel electric potential for three driving methods, i.e., a driving method according to the embodiment of the present invention, a relevant capacitive-coupling driving method and the ordinary 1H Vcom driving method.

FIG. 47 is a diagram showing relations between the video signal voltage and the effective pixel electric potential for three driving methods, i.e., a driving method according to the embodiment of the present invention, a relevant capacitive-coupling driving method and the ordinary 1H Vcom driving method.

In the diagram of FIG. 47, the horizontal axis represents the video signal Vsig whereas the vertical axis represents the effective pixel electric potential ΔVpix. In the diagram of FIG. 47, a curve A represents a characteristic expressing the relation between the video signal voltage Vsig and the effective pixel electric potential ΔVpix for the driving method according to the embodiment of the present invention. A curve C represents a characteristic expressing the relation between the video signal voltage Vsig and the effective pixel electric potential ΔVpix for the relevant capacitive-coupling driving method. A curve B represents a characteristic expressing the relation between the video signal voltage Vsig and the effective pixel electric potential ΔVpix for the ordinary 1H Vcom driving method.

As is obvious from the characteristics shown in the diagram of FIG. 47, the driving method according to the embodiment of the present invention provides a sufficiently improved characteristic representing the relation between the video signal voltage Vsig and the effective pixel electric potential ΔVpix in comparison with the relevant capacitive-coupling driving method.

Figure 48:
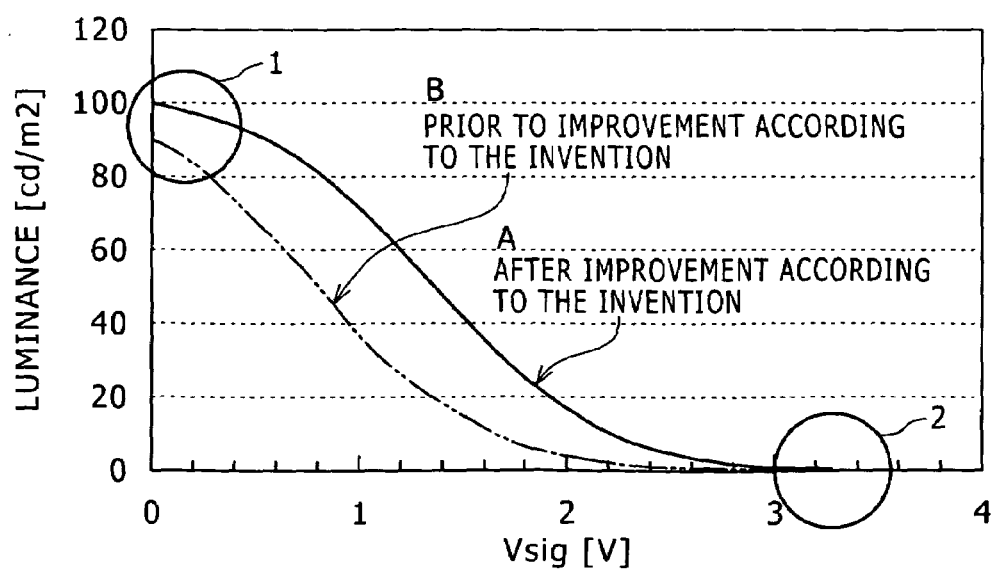
FIG. 48 is a diagram showing relations between the video signal voltage and the luminance for the driving method according to the embodiment of the present invention and the relevant capacitive-coupling driving method.

FIG. 48 is a diagram showing relations between the video signal voltage Vsig and the luminance for the driving method according to the embodiment of the present invention and the relevant capacitive-coupling driving method. In the diagram of FIG. 48, the horizontal axis represents the video signal Vsig whereas the vertical axis represents the luminance.

In the diagram of FIG. 48, a curve A represents a characteristic expressing the relation between the video signal voltage Vsig and the luminance for the driving method according to the embodiment of the present invention whereas a curve B represents a characteristic expressing the relation between the video signal Vsig and the luminance for the relevant capacitive-coupling driving method.

As is obvious from the characteristics shown in the diagram of FIG. 48, when the black luminance (2) is optimized in accordance with the relevant capacitive-coupling driving method, the white luminance (1) sinks as shown by the curve B. In accordance with the driving method according to the embodiment of the present invention, on the other hand, the amplitude of the common voltage signal Vcom is made small so that both the black luminance (2) and the white luminance (1) can be optimized as shown by the curve A.

Eq. (5) given below shows the values of the effective pixel electric potential ΔVpix_B for a black display and the effective pixel electric potential ΔVpix_W for a white display for the driving method according to the embodiment. The values of the effective pixel electric potential ΔVpix_B for a black display and the effective pixel electric potential ΔVpix_W for a white display are obtained by actually inserting numerical values into Eq. (4) for the driving method according to the embodiment as substitutes for their respective terms of Eq. (4).

By the same token, Eq. (6) given below shows the values of the effective pixel electric potential ΔVpix_B for a black display and the effective pixel electric potential ΔVpix_W for a white display for the relevant capacitive-coupling driving method. The values of the effective pixel electric potential ΔVpix_B for a black display and the effective pixel electric potential ΔVpix_W for a white display are obtained by actually inserting numerical values into Eq. (1) for the relevant capacitive-coupling driving method as substitutes for their respective terms of Eq. (1).

[Eq. 5]
(1) For a black display:

$$\Delta Vpix\_B = Vsig + \frac{Ccs}{Clc\_b + Ccs} \times \Delta Vcs + \frac{Clc\_b}{Clc\_b + Ccs} \times \frac{\Delta Vcom}{2} - Vcom$$
$$= 3.3\,V + 1.65 - 1.65\,V$$
$$= 3.3\,V$$

The black luminance is optimized.

(2) For a white display:

$$\Delta Vpix\_W = Vsig + \frac{Ccs}{Clc\_w + Ccs} \times \Delta Vcs + \frac{Clc\_w}{Clc\_w + Ccs} \times \frac{\Delta Vcom}{2} - Vcom$$
$$= 0.0\,V + 2.05 - 1.65\,V$$
$$= 0.4\,V$$

The white luminance is optimized.

[Eq. 6]
(1) For a black display:

$$\Delta Vpix\_B = Vsig + \frac{Ccs}{Clc\_b + Ccs} \times \Delta Vcs - Vcom$$
$$= 3.3\,V + 1.65 - 1.65\,V$$
$$= 3.3\,V$$

The black luminance is optimized.

(2) For a white display:

$$\Delta Vpix\_W = Vsig + \frac{Ccs}{Clc\_w + Ccs} \times \Delta Vcs - Vcom$$
$$= 0.0\,V + 2.45 - 1.65\,V$$
$$= 0.8\,V$$

The white luminance sinks.

As is obvious from Eqs. (5) and (6), in the case of a black display, the effective pixel electric potential ΔVpix_B is 3.3 V for both the driving method according to the embodiment and the relevant capacitive-coupling driving method. Thus, the black luminance is optimized. As is obvious from Eq. (6), however, in the case of a white display, the effective pixel electric potential Vpix_W is 0.8 V, which is greater than 0.5 V, for the relevant capacitive-coupling driving method. Thus, the white luminance inevitably sinks as explained previously by referring to the diagram of FIG. 46B.

As is obvious from Eq. (5), on the other hand, in the case of a white display, the effective pixel electric potential ΔVpix_W is 0.4 V, which is smaller than 0.5 V, for the driving method according to the embodiment. Thus, the white luminance is optimized as explained earlier by referring to the diagram of FIG. 46B.

The embodiment is a typical concrete implementation of the active-matrix display apparatus 100 in which the correction circuit 111 corrects the electric potential Vcs of the capacitor signal CS in accordance with pixel electric potentials detected by the first monitor pixel section 107-1 and the second monitor pixel section 107-2, which are employed in the monitor circuit 120, in order to optimize the optical characteristic of the active-matrix display apparatus 100. In concrete typical configurations of correction systems to be described below, typically, the first monitor pixel section 107-1 is a section designed for the positive (or negative) polarity whereas the second monitor pixel section 107-2 is a section designed for the negative (or positive) polarity. A system for correcting the electric potential Vcs of the capacitor signal CS is a Vcs correction system 111A to be described later by referring to a diagram of FIG. 49.

In this embodiment, the dielectric constant of the liquid-crystal cell LC201 varies due to changes of the driving temperature, the thickness of an insulation film employed in the storage capacitor Cs201 varies due to variations generated in the mass production of the products and the gap of the liquid-crystal cell LC201 varies also due to variations generated in the mass production. These variations in dielectric constant, insulation-film thickness and cell gap cause an electric potential applied to the liquid-crystal cell LC201 to vary. For this reason, the variations in dielectric constant, insulation-film thickness and cell gap are electrically detected by monitoring the variations of the electric potential applied to the liquid-crystal cell LC201 in order to suppress the variations of the electric potential. In this way, it is possible to eliminate the effects of the dielectric-constant variations caused by the changes of the driving temperature, the insulation-film thickness variations caused by the variations generated in the mass production and the cell gap variations also caused by the variations generated in the mass production.

That is to say, the liquid-crystal display panel according to the embodiment employs monitor (or detection) pixel circuits each functioning as a dummy pixel circuit also referred to as a sensor pixel circuit for detecting the variations caused by driving-temperature changes and caused by the mass production of the products. The result of the detection is used for correcting electric potentials appearing on storage lines or correcting the operation of the reference driver. As a result, it is possible to implement a liquid-crystal display apparatus capable of optimizing (or correcting) the luminance.

It is to be noted that a reference driver not shown in FIG. 4 functions as a gradation-voltage generation circuit for generating pixel video data to be conveyed by signal lines. That is to say, the system for correcting the operation of the reference driver in accordance with pixel electric potentials detected by the first monitor pixel section 107-1 and the second monitor pixel section 107-2, which are employed in the monitor circuit 120, functions as a system for correcting the electric potential Vsig of the video signal Sig. The system for correcting the electric potential Vsig of the video signal Sig is a Vsig correction system 113 to be described later by referring to the diagram of FIG. 49. In the following description, notation Vsig is also used to denote the video signal Sig itself. As described previously, the first monitor pixel section 107-1 is a section designed for the positive (or negative) polarity whereas the second monitor pixel section 107-2 is a section designed for the negative (or positive) polarity.

As explained above, the correction system of the active-matrix display apparatus 100 according to the embodiment corrects the operation of the reference driver in accordance with pixel electric potentials detected by the first monitor pixel section 107-1 employed in the monitor circuit 120 as a section designed for the positive (or negative) polarity and the second monitor pixel section 107-2 employed in the monitor circuit 120 as a section designed for the negative (or positive) polarity. As shown in a diagram of FIG. 49, the correction system includes a Vcom correction system 110A functioning as a first correction system, the aforementioned Vcs correction system 111A functioning as a second correction system and the aforementioned Vsig correction system 113 functioning as a third correction system. The Vcom correction system 110A is the detection-result output circuit 110 employed in the monitor circuit 120 whereas the Vcs correction system 111A is the correction circuit 111 cited before.

The Vcom correction system 110A employs a comparator 1101 and an amplifier 1102 as main components. By the same token, the Vcs correction system 111A employs a comparator 1111 and an amplifier 1112 as main components. In the same way, the Vsig correction system 113 employs a comparator 1131 and a reference driver 1132 including an amplifier as main components.

Figure 49:
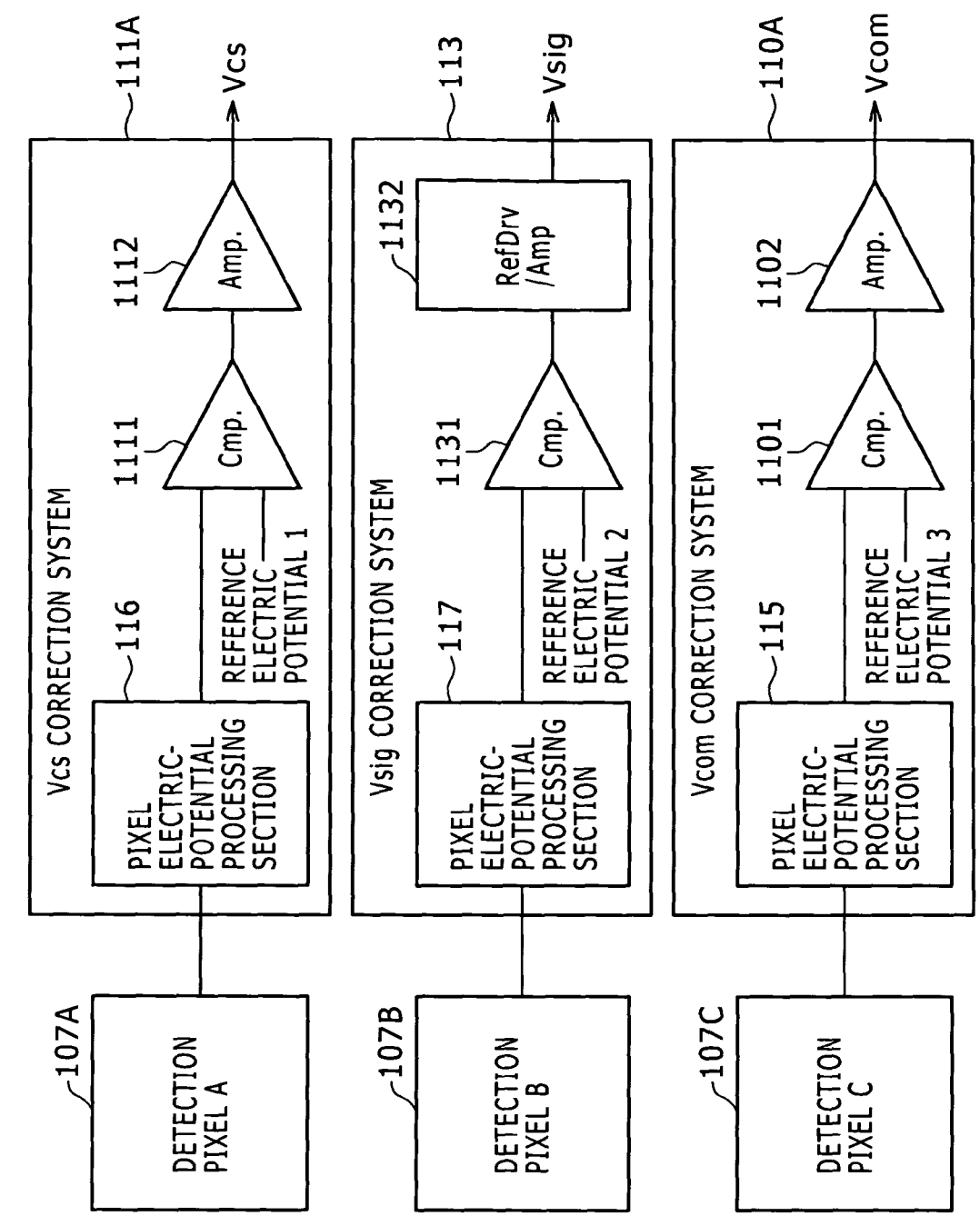
FIG. 49 is a diagram showing a typical configuration including three signal correction systems for three monitor pixel sections (each referred to as a detection pixel section, a sensor pixel section or a dummy pixel section) respectively.

It is to be noted that each of the detection pixel sections (each referred to as a monitor pixel section) 107A, 107B and 107C shown in the diagram of FIG. 49 have functions equivalent to those of the first monitor pixel section 107-1 employed in the monitor circuit 120 as a section designed for the positive (or negative) polarity and the second monitor pixel section 107-2 also employed in the monitor circuit 120 as a section designed for the negative (or positive) polarity.

In the Vcs correction system 111A, first of all, a pixel electric-potential processing section 116 generates an electric potential on the basis of the output of the detection pixel section (also referred to as the monitor pixel section) 107A which functions as a first monitor pixel section 107-1 and a second monitor pixel section 107-2. For example, the pixel electric-potential processing section 116 generates a electric potential corresponding to the difference in electric potential between signals generated by the first monitor pixel section 107-1 and the second monitor pixel section 107-2 as signals having polarities opposite to each other. Then, the comparator 1111 compares the electric potential output by the pixel electric-potential processing section 116 with a first reference electric potential determined in advance especially for the Vcs correction system 111A. In the diagram of FIG. 49, the first reference electric potential is shown as reference electric potential 1. The comparator 1111 outputs a comparison result, which is typically a signal with the level thereof representing the relation in magnitude between the electric potential output by the pixel electric-potential processing section 116 and the first reference electric potential, to the amplifier 1112. For example, the comparator 1111 outputs a comparison-result signal having a level indicating that the electric potential output by the pixel electric-potential processing section 116 is lower than, equal to or higher than the first reference electric potential to the amplifier 1112. The amplifier 1112 then amplifies the comparison-result signal generated by the comparator 1111 in order to generate the electric potential Vcs of a corrected capacitor signal CS. Finally, the amplifier 1112 asserts the corrected capacitor signal CS on a capacitor line provided especially for the detection pixel section 107A as well as one of the capacitor lines 105-1 to 105-$m$. In this patent specification, notation Vcs is also used to denote the capacitor signal CS.

By the same token, in the Vsig correction system 113, first of all, a pixel electric-potential processing section 117 generates an electric potential on the basis of the output of the detection pixel section (also referred to as the monitor pixel section) 107B which functions as a first monitor pixel section 107-1 and a second monitor pixel section 107-2. For example, the pixel electric-potential processing section 117 generates a electric potential corresponding to the difference in electric potential between signals generated by the first monitor pixel section 107-1 and the second monitor pixel section 107-2 as signals having polarities opposite to each other. Then, the comparator 1131 compares the electric potential output by the pixel electric-potential processing section 117 with a second reference electric potential determined in advance especially for the Vsig correction system 113. In the diagram of FIG. 49, the second reference electric potential is shown as reference electric potential 2. The comparator 1131 outputs a comparison result, which is typically a signal with the level thereof representing the relation in magnitude between the electric potential output by the pixel electric-potential processing section 117 and the second reference electric potential, to the reference driver 1132 including an amplifier. For example, the comparator 1131 outputs a comparison-result signal having a level indicating that the electric potential output by the pixel electric-potential processing section 117 is lower than, equal to or higher than the second reference electric potential to the reference driver 1132 including an amplifier. The reference driver 1132 including an amplifier then amplifies the comparison-result signal generated by the comparator 1131 in order to generate the electric potential Vsig of a corrected video signal Sig. Finally, the reference driver 1132 including an amplifier asserts the corrected video signal Sig on a signal line provided especially for the detection pixel section 107B as well as one of the signal lines 106-1 to 106-n. In this patent specification, notation Vsig is also used to denote the video signal Sig.

In the same way, in the Vcom correction system 110A, first of all, a pixel electric-potential processing section 115 generates an electric potential on the basis of the output of the detection pixel section (also referred to as the monitor pixel section) 107C which functions as a first monitor pixel section 107-1 and a second monitor pixel section 107-2. For example, the pixel electric-potential processing section 115 generates the average of the electric potentials of signals generated by the first monitor pixel section 107-1 and the second monitor pixel section 107-2 as signals having polarities opposite to each other. Then, the comparator 1101 compares the electric potential output by the pixel electric-potential processing section 115 with a third reference electric potential determined in advance especially for the Vcom correction system 110A. In the diagram of FIG. 49, the third reference electric potential is shown as reference electric potential 3. In this case, a common voltage signal Vcom output by the amplifier 1102 can be used as the third reference electric potential. The comparator 1101 outputs a comparison result, which is typically a signal with the level thereof representing the relation in magnitude between the electric potential output by the pixel electric-potential processing section 115 and the third reference electric potential, to the amplifier 1102. For example, the comparator 1101 outputs a comparison-result signal having a level indicating that the electric potential output by the pixel electric-potential processing section 115 is lower than, equal to or higher than the third reference electric potential to the amplifier 1102. The amplifier 1102 then amplifies the comparison-result signal generated by the comparator 1101 in order to generate a corrected common voltage signal Vcom. Finally, the amplifier 1102 asserts the corrected common voltage signal Vcom on a common-voltage supply line provided especially for the detection pixel section 107C as well as the VCOM (Vcom) supply line 112.

As is obvious from the above description, the Vcs correction system 111A feeds back the corrected capacitor signal Vcs to the pixel detection system 107A through the capacitor line provided especially for the pixel detection system 107A. By the same token, the Vsig correction system 113 feeds back the corrected capacitor signal Vsig to the pixel detection system 107B through the signal line provided especially for the pixel detection system 107B. In the same way, the Vcom correction system 110A feeds back the corrected common voltage signal Vcom to the pixel detection system 107C through the common-voltage supply line provided especially for the pixel detection system 107C. Thus, the electric potentials can be stabilized at levels determined in advance.

Instead of generating a electric potential corresponding to the difference in electric potential between signals generated by the first monitor pixel section 107-1 and the second monitor pixel section 107-2 as signals having polarities opposite to each other, it is also possible to provide a configuration in which each of the pixel electric-potential processing sections 116 and 117 generates a electric potential corresponding to the difference between the electric potential of a signal generated by the first monitor pixel section 107-1 or the second monitor pixel section 107-2 and the electric potential of the ground. By generating a electric potential corresponding to the difference in electric potential between signals generated by the first monitor pixel section 107-1 and the second monitor pixel section 107-2 as signals having polarities opposite to each other and comparing the difference with a reference electric potential determined in advance, however, a better correction result can be obtained.

The configuration shown in the diagram of FIG. 49 is a typical configuration having the three detection pixel sections 107A, 107B and 107C provided for systems for correcting the storage signal Vcs, which is the electric potential of the storage signal CS, the electric potential Vsig of the video signal Sig and the common voltage signal Vcom respectively. However, such a configuration leads to an increased circuit area.

Figure 50:
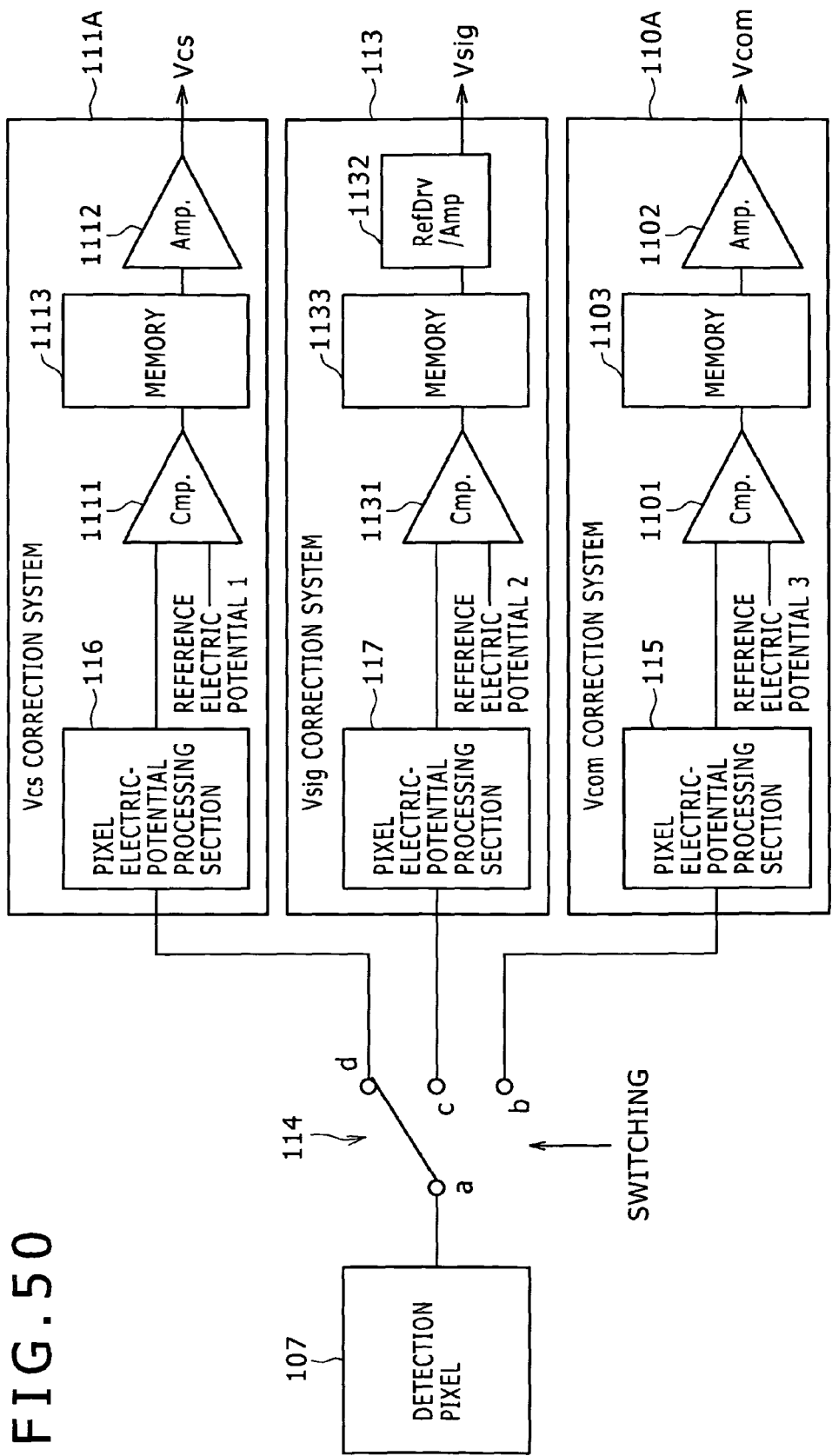
FIG. 50 is a diagram showing a typical configuration including a plurality of signal correction systems and one monitor pixel section (also referred to as a detection pixel section) shared by the signal correction systems.

In order to solve the problem of an increased circuit area, this embodiment is provided with only one detection pixel section 107 as shown in FIG. 50. The detection pixel section 107 is connected selectively to the Vcs correction system 111A, the Vsig correction system 113 and the Vcom correction system 110A by making use of a switch circuit 114. It is to be noted that the configuration shown in the diagram of FIG. 50 is a typical configuration in which the one detection pixel section 107 (also referred to as a monitor pixel section) is shared by a plurality of systems, that is, the aforementioned systems for correcting the storage signal Vcs, the electric potential Vsig of the video signal Sig and the common voltage signal Vcom in accordance with the embodiment.

It is to be noted that FIG. 50 is a diagram showing a typical configuration including a plurality of signal correction systems and one monitor pixel section (also referred to as a detection pixel section) shared by the signal correction systems.

The switch circuit 114 has an active (fixed) contact point "a" and three passive contact points "b," "c" and "d." The fixed contact point "a" is connected the output terminal of the detection pixel section 107 to serve as a contact point for receiving a pixel electric potential detected by the detection pixel section 107. The three passive contact points "b," "c" and "d" are connected to the input terminals of the Vcom correction system 110A, the Vsig correction system 113 and the Vcs correction system 111A respectively.

In the Vcom correction system 110A, the output terminal of the comparator 1101 is connected to a memory 1103 used for storing a detection result output by the comparator 1101 as a comparison result output by the comparator 1101. By the same token, in the Vsig correction system 113, the output terminal of the comparator 1131 is connected to a memory 1133 used for storing a detection result output by the comparator 1131 as a comparison result produced by the comparator 1131. In the same way, the Vcs correction system 111A, the output terminal of the comparator 1111 is connected to a memory 1113 used for storing a detection result output by the comparator 1111 as a comparison result produced by the comparator 1111. In this way, the detection result generated by the detection pixel section 107 can be switched among the Vcom correction system 110A, the Vsig correction system 113 and the Vcs correction system 111A. It is to be noted that the type of the memories 1103, 1113 and 1133 is by no means limited to a particular memory type. That is to say, for example, each of the memories 1103, 1113 and 1133 can be a DRAM, an SRAM or the like.

With such a configuration, only one detection pixel section 107 can be used in a plurality of signal correction systems provided independently of each other as systems for correcting a variety of signals. It is to be noted that, except for the additional memories 1103, 1113 and 1133, the configurations of the Vcom correction system 110A, the Vcs correction system 111A and the Vsig correction system 113, which are shown in the diagram of FIG. 50, are identical with those of the Vcom correction system 110A, the Vcs correction system 111A and the Vsig correction system 113, which are shown in the diagram of FIG. 49.

In addition, the operation to switch the detection pixel section 107 among the Vcom correction system 110A, the Vsig correction system 113 and the Vcs correction system 111A by making use of the switch circuit 114 does not have to be carried out in a particular order. As a matter of fact, the operation to switch the detection pixel section 107 among the Vcom correction system 110A, the Vsig correction system 113 and the Vcs correction system 111A by making use of the switch circuit 114 can be carried out by arbitrarily assigning a weight to each of the Vcom correction system 110A, the Vsig correction system 113 and the Vcs correction system 111A.

Each of FIGS. 51A to 51D is a diagram referred to in explanation of a typical operation to switch the detection pixel section 107 (also referred to as a monitor pixel section) among a plurality of correction systems provided for correcting a variety of signals as systems sharing the detection pixel section 107. In the diagrams of FIGS. 51A to 51D, notation corn denotes a period during which the Vcom correction system 110A is the selected system, notation CS denotes a period during which the Vcs correction system 111A is the selected system and notation Sig denotes a period during which the Vsig correction system 113 is the selected system.

Figure 51:
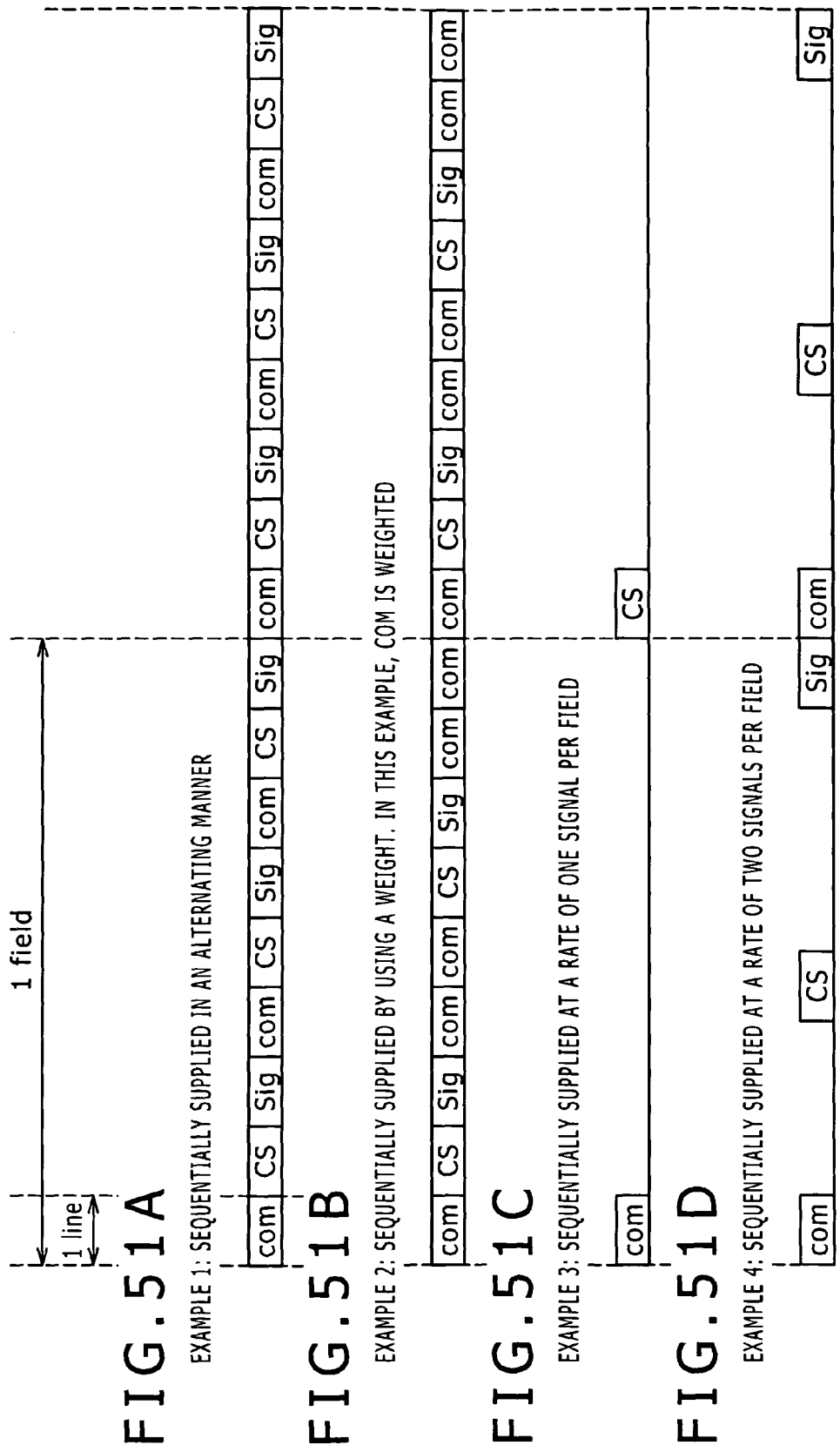
FIGS. 51A to 51D are each a diagram to be referred to in explanation of a typical operation to switch a detection pixel section (also referred to as a monitor pixel section) among a plurality of correction systems provided for correcting a variety of signals as systems sharing the detection pixel section.

To be more specific, FIG. 51A is a diagram showing a typical operation to switch the detection pixel section 107 among a plurality of correction systems by turns. FIG. 51B is a diagram showing a typical operation to switch the detection pixel section 107 among a plurality of correction systems by assigning a weight to the system for correcting the common voltage signal Vcom. To put it in detail, the pixel electric potential detected by the detection pixel section 107 is supplied to the Vcom correction system 110A twice or three times in a row before supplying the detected pixel electric potential to the Vcs correction system 111A and the Vsig correction system 113 sequentially. FIG. 51C is a diagram showing a typical operation to switch the detection pixel section 107 among a plurality of correction systems once a field. FIG. 51D is a diagram showing a typical operation to switch the detection pixel section 107 among a plurality of correction systems twice a field.

It is to be noted that, it is not necessary to stick with a driving method such as a field driving method or a line driving method as long as a desired electric potential can be obtained.

Each of the signal correction systems can be integrated in the active-matrix display apparatus 100 by adoption of the LTPS technology or attached to the active-matrix display apparatus 100 as a COG, a COF or the like.

Figure 52:
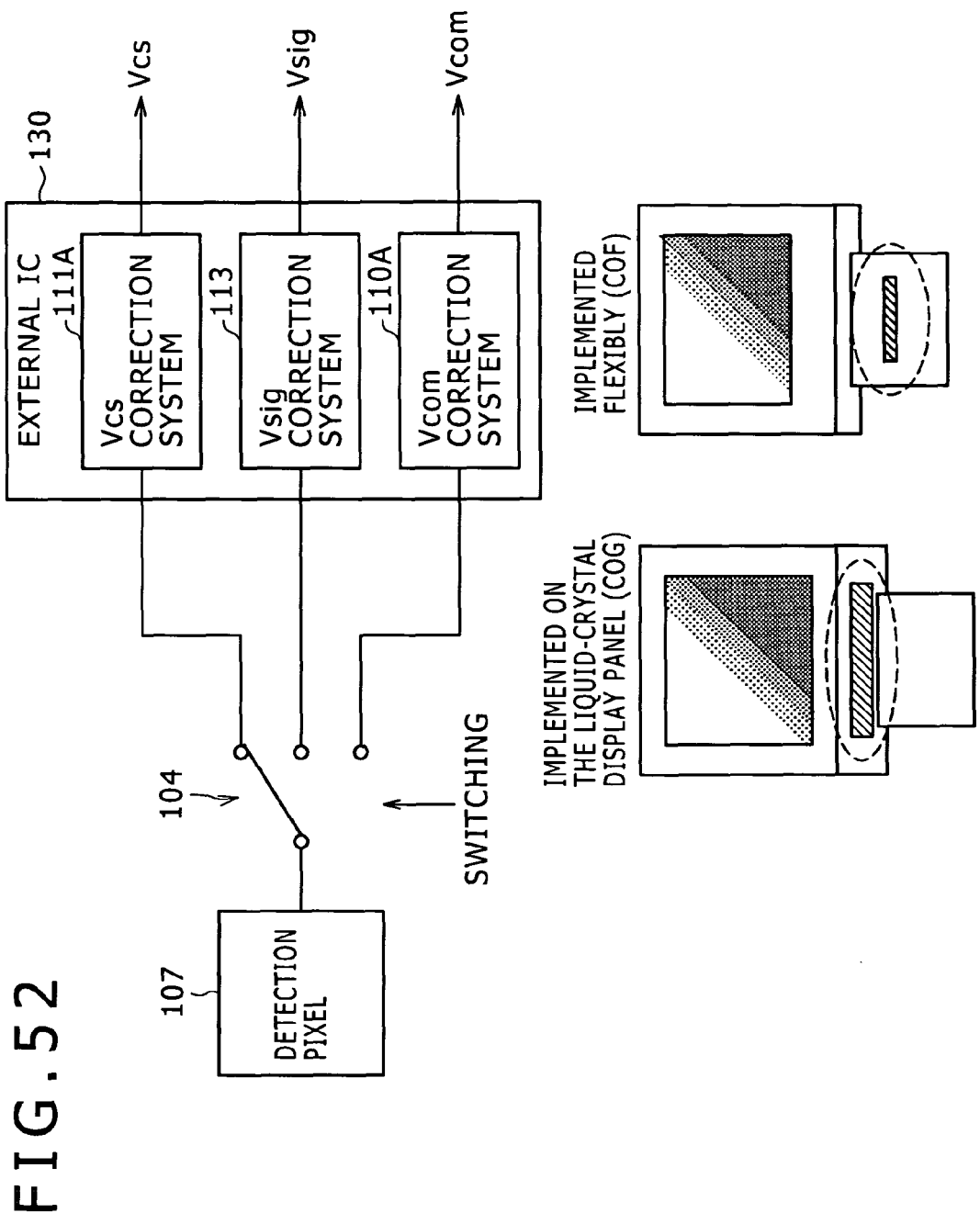
FIG. 52 is a diagram showing a typical configuration in which a Vcom correction system, a Vcs correction system and a Vsig correction system are mounted on an external IC.

FIG. 52 is a diagram showing a typical configuration in which the Vcom correction system 110A, the Vcs correction system 111A and the Vsig correction system 113 are mounted on an external IC 130.

The number of signal correction systems is by no means limited to three. For example, it is possible to provide a configuration in which any only two of the signal correction systems can be incorporated. Each of FIGS. 53A to 53C is a diagram showing a configuration in which only two of the three signal correction systems are incorporated.

Figure 53A:
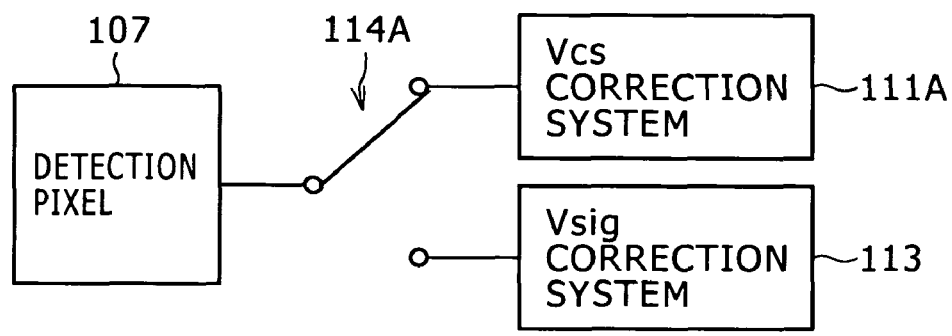
FIGS. 53A to 53C are each a diagram showing a configuration in which two of the Vcom correction system, the Vcs correction system and the Vsig correction system are incorporated.

To be more specific, FIG. 53A is a diagram showing a configuration in which two signal correction systems, that is, the Vcs correction system 111A and the Vsig correction system 113 are incorporated, and the detection pixel section 107 is switched from the Vcs correction system 111A to the Vsig correction system 113 and vice versa by making use of the switch circuit 114A. Likewise, FIG. 53B is a diagram showing a configuration in which two signal correction systems, that is, the Vcom correction system 110A and the Vcs correction system 111A are incorporated, and the detection pixel section 107 is switched from the Vcom correction system 110A to the Vcs correction system 111A and vice versa by making use of the switch circuit 114A. Similarly, FIG. 53C is a diagram showing a configuration in which two signal correction systems, that is, the Vcom correction system 110A and the Vsig correction system 113 are incorporated, and the detection pixel section 107 is switched from the Vcom correction system 110A to the Vsig correction system 113 and vice versa by making use of the switch circuit 114A.

Figure 53B:
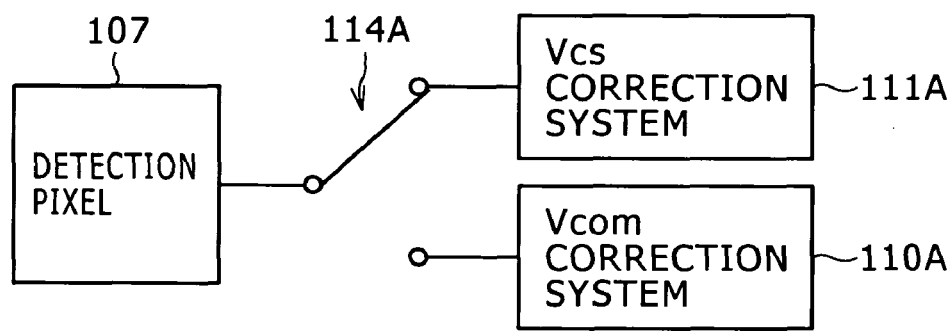
Figure 53C:
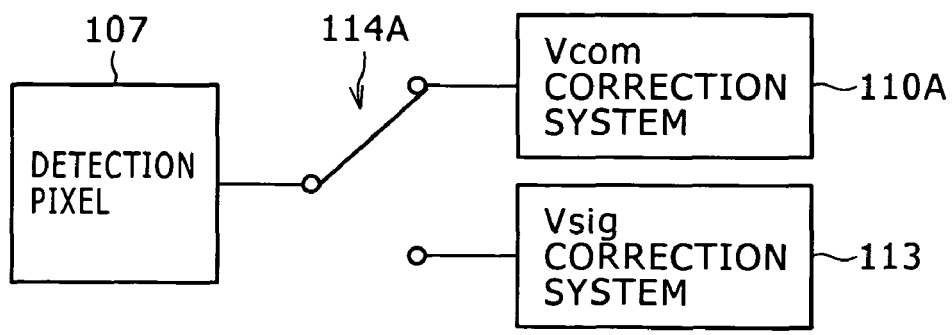
Figure 54:
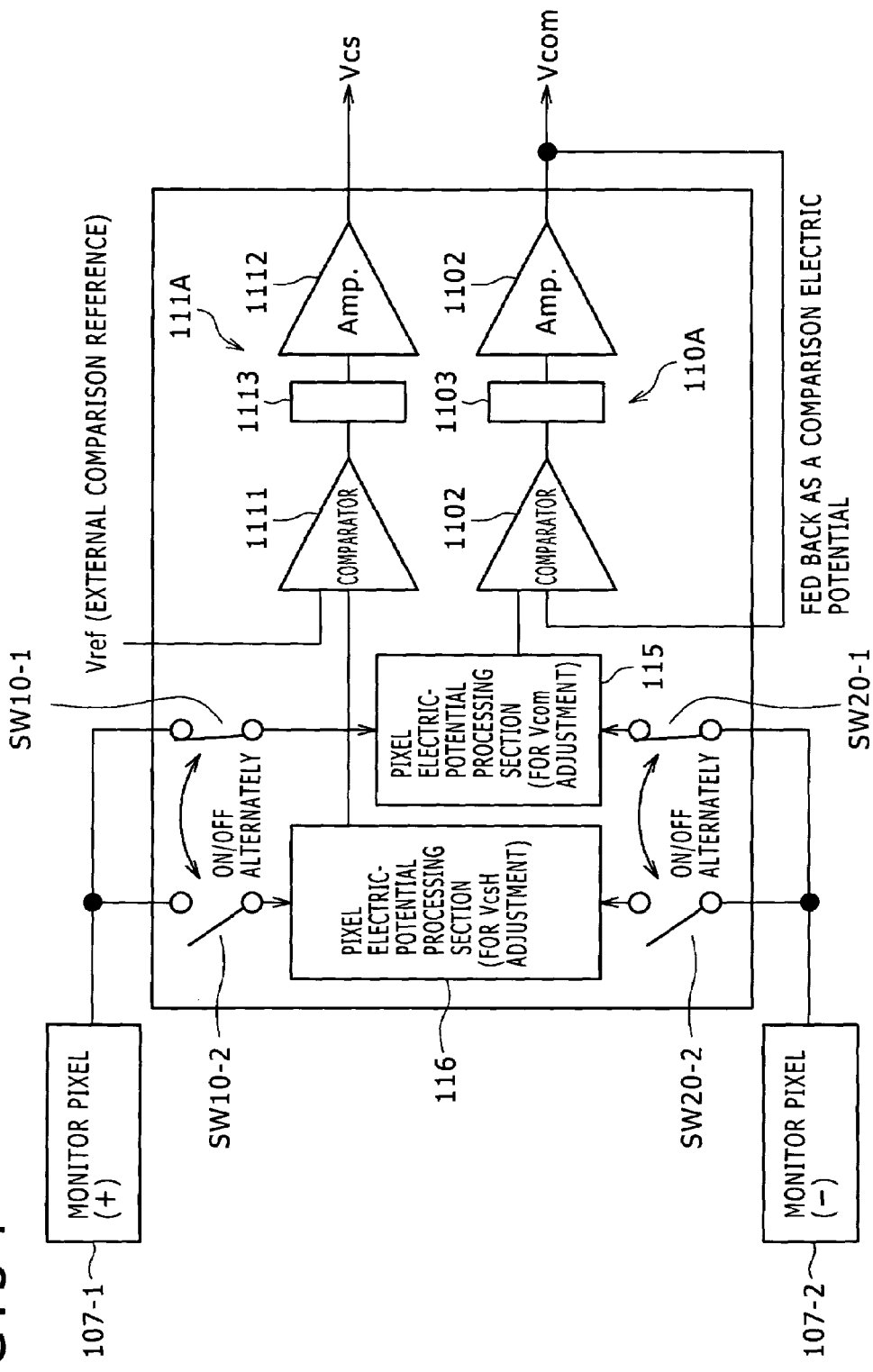
FIG. 54 is a diagram showing a more concrete typical configuration in which two correction systems, i.e. the Vcom correction system and the Vsig correction system, are incorporated.
Figure 55:
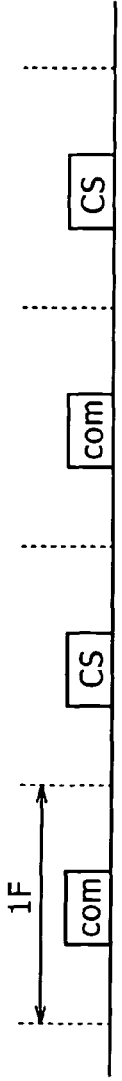
FIG. 55 is a diagram showing typical timings with which the circuit shown in the diagram of FIG. 54 switches the monitor detection sections from the Vcom correction system to the Vsig correction system and vice versa.

FIG. 54 is a diagram showing a more concrete typical configuration in which two signal correction systems, that is, the Vcom correction system 110A and the Vcs correction system 111A are incorporated much like the configuration shown in the diagram of FIG. 53B. FIG. 55 is a diagram showing typical timings. With these timings, the circuit shown in the diagram of FIG. 54 switches the first monitor pixel section 107-1 and the second monitor pixel section 107-2, which correspond to the detection pixel section 107 shown in the diagram of FIG. 53B, from the Vcom correction system 110A to the Vcs correction system 111A and vice versa. It is to be noted that the configuration shown in the diagram of FIG. 54 is a typical configuration in which the first monitor pixel section 107-1 is driven as a pixel circuit of the positive polarity whereas the second monitor pixel section 107-2 is driven as a pixel circuit of the negative polarity.

The first monitor pixel section 107-1 is connected to a pixel electric-potential processing circuit 115 for processing the common voltage signal Vcom through a switch SW10-1 and connected to a pixel electric-potential processing circuit 116 for processing the storage signal Vcs through a switch SW10-2. By the same token, the second monitor pixel section 107-2 is connected to the pixel electric-potential processing circuit 115 through a switch SW20-1 and connected to the pixel electric-potential processing circuit 116 through a switch SW20-2.

The output terminal of the pixel electric-potential processing circuit 115 is connected to one of two input terminals of the comparator 1101 employed in the Vcom correction system 110A. By the same token, the output terminal of the pixel electric-potential processing circuit 116 is connected to one of two input terminals of the comparator 1111 employed in the Vcs correction system 111A.

The switches SW10-1 and SW10-2 are put in a turned-on and turned-off states alternately. By the same token, the switches SW20-1 and SW20-2 are also put in a turned-on and turned-off states alternately. However, the switches SW10-1 and SW20-1 operate synchronously with each other in order to connect and disconnect the first monitor pixel section 107-1 and the second monitor pixel section 107-2 respectively to and from the pixel electric-potential processing circuit 115. By the same token, the switches SW10-2 and SW20-2 operate synchronously with each other in order to connect and disconnect the first monitor pixel section 107-1 and the second monitor pixel section 107-2 respectively to and from the pixel electric-potential processing circuit 116.

With the configuration described above, electric potentials of both polarities for detection of the common voltage signal Vcom and electric potentials of both polarities for detection of the storage signal Vcs are monitored alternately at intervals of one field (or 1F). The result of monitoring the electric potentials for detection of the common voltage signal Vcom is supplied to the Vcom correction system 110A during a particular field whereas the result of monitoring the electric potentials for detection of the storage signal Vcs is supplied to the Vcs correction system 111A during a field following the particular field.

In the Vcom correction system 110A, first of all, the pixel (pix) electric-potential processing section 115 for adjusting the common voltage signal Vcom generates an electric potential on the basis of signals output by the first monitor pixel section 107-1 and the second monitor pixel section 107-2. For example, the pixel electric-potential processing section 115 generates the average of the electric potentials of the signals generated by the first monitor pixel section 107-1 and the second monitor pixel section 107-2 as signals having polarities opposite to each other. The pixel electric-potential processing section 115 outputs the generated electric potential to one of the input terminals of the comparator 1101. The other input terminal of the comparator 1101 receives the aforementioned third reference electric potential determined in advance especially for the Vcom correction system 110A. Then, the comparator 1101 compares the electric potential output by the pixel electric-potential processing section 115 with the third reference electric potential. In this case, a common voltage signal Vcom output by the amplifier 1102 is used as the third reference electric potential. The comparator 1101 generates a comparison result, which is typically a logic level representing the relation in magnitude between the electric potential output by the pixel electric-potential processing section 115 and the third reference electric potential, as a result of comparison. The comparison-result logic level generated by the comparator 1101 is used to generate a corrected common voltage signal Vcom with the center value thereof adjusted automatically.

By the same token, in the Vcs correction system 111A, first of all, the pixel (pix) electric-potential processing section 116 for adjusting the capacitor signal Vcs generates an electric potential on the basis of signals output by the first monitor pixel section 107-1 and the second monitor pixel section 107-2. For example, the pixel electric-potential processing section 116 generates the difference in electric potential between the signals generated by the first monitor pixel section 107-1 and the second monitor pixel section 107-2 as signals having polarities opposite to each other. The pixel electric-potential processing section 116 outputs the generated difference in electric potential to one of the input terminals of the comparator 1111. The other input terminal of the comparator 1111 receives the aforementioned first reference electric potential determined in advance especially for the Vcs correction system 111A. Then, the comparator 1111 compares the electric-potential difference output by the pixel electric-potential processing section 116 with the first reference electric potential. In this case, an electric potential Vref received from an external source is used as the first reference electric potential. The comparator 1111 generates a comparison result, which is typically a logic level representing the relation in magnitude between the electric-potential difference output by the pixel electric-potential processing section 116 and the first reference electric potential, as a result of comparison. The comparison-result logic level generated by the comparator 1111 is used to generate the electric potential Vcs of a corrected capacitor signal CS.

Next, the operation of the configuration described above is explained.

Each of the vertical shift registers VSR employed in the vertical driving circuit 102 receives a vertical start pulse VST generated by a clock generator not shown in the figure as a pulse serving as a command to start a vertical scan operation and a vertical clock signal generated by the clock generator as a clock signal serving as the reference of the vertical scan operation. It is to be noted that the vertical clock signal is typically vertical clock signals VCK and VCKX having phases opposite to each other.

In each of the shift registers VSR, the level of the vertical clock signals is shifted and the vertical clock signals are delayed by a delay time varying from pulse to pulse. For example, in each of the shift registers VSR, the normal-write vertical start pulse VST starts a shift operation synchronous with the vertical clock signal VCK and a pulse shifted out from the shift register VSR is supplied to a gate buffer provided for the shift register VSR.

In addition, the normal-write vertical start pulse VST is propagated to the shift registers VSR sequentially from the clock generator located above or below the available pixel section 101. Thus, basically, pulses supplied by the shift registers VSR synchronously with the vertical clock signal are asserted on the gate lines 104-1 to 104-*m* by way of the gate buffers associated with the shift registers VSR in order to drive the gate lines 104-1 to 104-*m* by turns.

The vertical driving circuit 102 drives the gate lines 104-1 to 104-*m* and the capacitor lines 105-1 to 105-*m* sequentially, starting typically from the first gate line 104-1 and the first capacitor line 105-1 respectively. After a gate pulse GP is asserted on a gate line (one of the gate lines 104-1 to 104*m*) in order to write a video signal into a pixel circuit PXLC connected to the gate line, the level of the capacitor signal (one of the capacitor signals CS1 to CSm) conveyed by the capacitor line (one of the capacitor lines 105-1 to 105-*m*) connected to the pixel circuit PXLC to supply the capacitor signal to the pixel circuit PXLC is changed from the first level CSH to the second level CSL or vice versa by the switch (one of the switches SW1 to SWm) connected to the capacitor line. The capacitor signals CS1 to CSm conveyed by the capacitor lines 105-1 to 105-*m* respectively are set at the first level CSH or the second level CSL in an alternate way described as follows.

For example, when the vertical driving circuit 102 supplies the capacitor signal CS1 set at the first level CSH to the pixel circuit PXLC through the first capacitor line 105-1, the vertical driving circuit 102 then supplies the capacitor signal CS2 set at the second level CSL to the pixel circuit PXLC through the second capacitor line 105-2, the capacitor signal CS3 set at the first level CSH to the pixel circuit PXLC through the third capacitor line 105-3 and the capacitor signal CS4 set at the second level CSL to the pixel circuit PXLC through the fourth capacitor line 105-4 subsequently. In the same way, the vertical driving circuit 102 thereafter sets the capacitor signals CS5 to CSm at the first level CSH or the second level CSL alternately and supplies the capacitor signals CS5 to CSm to the pixel circuit PXLC through the capacitor lines 105-5 to 105-*m* respectively.

The capacitor signal is corrected by the Vcs correction system 111A to a predetermined electric potential on the basis of electric potentials detected from first monitor pixel section 107-1 and the second monitor pixel section 107-2 which are employed in the monitor circuit 120.

The common voltage signal Vcom alternating at a small amplitude of ΔVcom is supplied to the second pixel electrode of the liquid-crystal cell LC201 employed in every pixel circuit PXLC in the available pixel section 101 as a signal common to all the pixel circuits PXLC.

The center value of the common voltage signal Vcom is adjusted to an optimum value by the Vcom correction system 110A on the basis of electric potentials detected from first monitor pixel section 107-1 and the second monitor pixel section 107-2 which are employed in the monitor circuit 120.

On the basis of a horizontal start pulse HST generated by a clock generator not shown in the figure as a pulse serving as a command to start a horizontal scan operation and a horizontal clock signal serving as the reference pulse of the horizontal scan operation, the horizontal driving circuit 103 sequentially samples the input video signal Vsig for every 1H or for each horizontal scan period H in order to write the input video signal Vsig at one time into the pixel circuits PXLC on a row selected by the vertical driving circuit 102 through the signal lines 106-1 to 106-n. It is to be noted that, the horizontal clock signal is typically horizontal clock signals HCK and HCKX having phases opposite to each other.

For example, first of all, a selector switch for R (red) is driven and controlled to enter a conductive state. In this state, R data is output to signal lines and written into pixel circuits. After the R data is written into the pixel circuits, a selector switch for G (green) is driven and controlled to enter a conductive state. In this state, G data is output to the signal lines and written into the pixel circuits. After the G data is written into the pixel circuits, a selector switch for B (blue) is driven and controlled to enter a conductive state. In this state, B data is output to the signal lines and written into the pixel circuits.

In this embodiment, after a video signal from the signal line has been written into the pixel circuit, that is, after the falling edge of the gate pulse GP, the electric potential appearing on the pixel circuit (that is, the electric potential appearing on the node ND201) is changed by a variation of a capacitor signal on the capacitor line (that is, one of the storage lines 105-1 to 105-m) by making use of a capacitive coupling effect through the storage capacitor Cs201. The electric potential appearing on the node ND201 is changed in order to modulate a voltage applied to the liquid-crystal cell.

The common voltage signal Vcom applied to the second pixel electrode of the liquid-crystal cell LC201 at that time as a signal common to all pixel circuits is not set at a fixed value. Instead, the common voltage signal Vcom is a series of pulses with a small amplitude Vcom in the range 10 mV to 1.0 V and a polarity typically changing once every horizontal scan period or once every 1H. As a result, not only is the black luminance optimized, but the white luminance is also optimized as well.

As described above, in accordance with the embodiment, there is provided a driving method whereby, after the falling edge of a gate pulse GP asserted on a specific one of the gate lines 104-1 to 104-m, that is, after pixel video data from a signal line (that is, one of the signal lines 106-1 to 106-n) is written into a pixel circuit PXLC connected to the specific gate line 104, the capacitor lines 105-1 to 105-m each connected independently for one of the rows are driven as described above, resulting in a capacitive coupling effect of the storage capacitor Cs201 employed in each of the pixel circuits PXLC and, in each of the pixel circuits PXLC, an electric potential appearing on the node ND201 is changed due to the capacitive coupling effect in order to modulate a voltage applied to the liquid-crystal cell LC201.

Then, in the course of an actual driving operation according to this driving method, a monitor circuit detects an electric potential found as an average of detected electric potentials appearing on monitor pixel circuits PXLC of the first monitor pixel section 107-1 and the second monitor pixel section 107-2, which are provided besides the available pixel section 101, as electric potentials having the positive and negative polarities and automatically corrects the center value of a common voltage signal Vcom on the basis of the detected electric-potential average. In this patent specification, the electric potential appearing on a monitor pixel circuit PXLC means an electric potential appearing on a connection node ND201 of the monitor pixel circuit PXLC.

By carrying out the operations described above, the effect described below can be obtained.

Since the active-matrix display apparatus 100 includes a system for automatically adjusting the center value of the common voltage signal Vcom in the liquid-crystal display panel serving as the active-matrix display apparatus 100, the inspection process requiring the cumbersome labor hours is not needed at a shipping time. Thus, even if the center value of the common voltage signal Vcom is shifted from an optimum value due to the temperature of an environment in which the active-matrix display apparatus 100 is used, the driving method, the driving frequency, the backlight (B/L) luminance or the luminance of incoming light, the system for automatically adjusting the center value of the common voltage signal Vcom is capable of sustaining the center value of the common voltage signal Vcom at a value optimum for the environment. As a result, the active-matrix display apparatus 100 offers a merit of the capability of appropriately preventing flickers from being generated on the display screen of the active-matrix display apparatus 100.

In addition, by adjusting the center value of the common voltage signal Vcom to an optimum value, it is possible to eliminate the effect of variations in actual pixel electric potential on the quality of the image.

On top of that, this embodiment has a configuration in which the monitor circuit 120 is created independently of the available pixel section 101 at a location adjacent to the available pixel section 101 as a circuit employing the first monitor pixel section 107-1, the second monitor pixel section 107-2, the monitor vertical driving circuit (V/CSDRVM) 108, the first monitor horizontal driving circuit (HDRVM1) 109-1 and the second monitor horizontal driving circuit (HDRVM2) 109-2. In addition, the gate lines are provided so as to form the so-called nesting layout. Thus, the embodiment offers a merit of a higher degree of freedom with which the liquid-crystal display panel is designed.

As a result, it is easier to lay out the configuration circuits of the monitor circuit 120, that is, easier to lay out the first monitor pixel section 107-1, the second monitor pixel section 107-2, the monitor vertical driving circuit (V/CSDRVM) 108, the first monitor horizontal driving circuit (HDRVM1) 109-1 and the second monitor horizontal driving circuit (HDRVM2) 109-2.

On top of that, the vertical and horizontal driving circuits designed especially for the monitor pixel section can thus be provided separately from the available pixel section 101 so that it is possible to solve a problem that the correction operation must be carried out in the blanking period of the video signal.

In this embodiment, in accordance with the first method, video signals having amplitude different from each other are written into monitor pixel circuits so that an offset is deliberately provided to an average electric potential detected from each of the pixel circuits as an offset for correcting the detected electric potential so as to eliminate the shift of the detected electric potential from the target electric potential intended for the display pixel circuit. In accordance with the second method, on the other hand, each monitor pixel circuit is provided with a capacitor so that an offset is provided deliberately to a detected average electric potential as an offset for correcting the detected electric potential so as to eliminate the shift of the detected electric potential from the target electric potential intended for the display pixel circuit.

By adopting either one of the first and second methods or a combination of the methods, it is possible to cancel the shift of the detected electric potential from the target electric potential intended for the display pixel circuit.

In addition, in this embodiment, a driving operation is carried out to put each of the switches 121 and 122 in a turned-on state shorting detection lines, which convey electric potentials detected from monitor pixel circuits (each also referred to as a detection, sensor or dummy pixel circuit) provided separately from available pixel circuits (each also referred to as a display pixel circuit or an effective pixel circuit), to each other so as to obtain the average of the detected electric potentials. The embodiment is designed into a configuration in which, after the process of shorting the detection lines, which convey electric potentials detected from monitor pixel circuits, to each other in order to obtain the average of the detected electric potentials, an operation to rewrite a video signal into each of the monitor pixel circuits is carried out in order to correct a deformation of each of the detected electric potentials and, hence make it possible to provide electrical protection.

Thus, in this configuration, an electric potential is prevented from being deformed, depending on whether or not a process to rewrite a video signal into each of the monitor pixel circuits is carried out after the operation to short the detection lines, which convey electric potentials detected from the monitor pixel circuits, to each other. As a result, the pixel function is prevented from deteriorating due to a deformed electric potential as evidenced by for example a burn-in phenomenon.

In addition, in this embodiment, the monitor pixel circuit having a small time constant is provided with an adjustment resistor. To put it concretely, an ingenious attempt is made to devise the shape of the gate line in the monitor pixel circuit so that the gate line also serves as a resistor. In this way, the time constant of the gate line in the monitor pixel circuit can be made equal to the time constant of the gate line in the display pixel circuit. Thus, it is possible to lessen the fear that the electric potential appearing in the monitor pixel circuit (also referred to as a detection pixel circuit) is shifted from a target electric potential intended for the display pixel circuit. As a result, it is no longer feared that the correction function does not work normally.

On top of that, only one detection pixel section 107 is included in the embodiment. In the configuration of the embodiment, the electric potential output by the detection pixel section 107 as a result of detection is switched by making use of the switch circuit 114 to be selectively output to the Vcom correction system 110A, the Vcs correction system 111A, the Vsig correction system 113 or the like. In such a configuration, only one detection pixel section 107 is shared by a plurality of signal correction systems used for correcting signals different from each other and allows the correction systems to be provided independently of each other without entailing an increase in circuit area.

In addition, each of the pixel circuits PXLC includes a thin-film transistor TFT201 functioning as a switching device, a liquid-crystal cell LC201 and a storage capacitor Cs201. The first pixel electrode of the liquid-crystal cell LC201 is connected to the drain (or the source) of the thin-film transistor TFT201. The drain (or the source) of the thin-film transistor TFT201 is also connected to the first electrode of the storage capacitor Cs201. In each of the pixel circuits provided on any individual one of the rows, the second electrode of the storage capacitor is connected to a capacitor line connected to the individual row. In addition, a common voltage signal with a level changing at time intervals determined in advance is supplied to the second pixel electrode of the display element as a signal common to all pixel circuits. Thus, both the black luminance and the white luminance can be optimized. As a result, an optimum contrast level can be obtained.

Furthermore, in this embodiment, the dielectric constant of the liquid-crystal cell LC201 varies due to changes of the driving temperature, the thickness of an insulation film employed in the storage capacitor Cs201 varies due to variations generated in the mass production of the products and the gap of the liquid-crystal cell LC201 varies also due to variations generated in the mass production. These variations in dielectric constant, insulation-film thickness and cell gap cause an electric potential applied to the liquid-crystal cell LC201 to vary. For this reason, the variations in dielectric constant, insulation-film thickness and cell gap are electrically detected by monitoring the variations of the electric potential applied to the liquid-crystal cell LC201 in order to suppress the variations of the electric potential. In this way, it is possible to eliminate the effects of the dielectric-constant variations caused by the changes of the driving temperature, the insulation-film thickness variations caused by the variations generated in the mass production and the cell gap variations also caused by the variations generated in the mass production.

Moreover, the CS driver employed in the vertical driving circuit 102 according to the embodiment identifies the polarity of a capacitor signal CS on the basis of only a polarity, which is observed in an operation to write a signal into a pixel circuit as a polarity observed with a timing indicated by a polarity recognition pulse POL, independently of stages preceding and succeeding the stage of the CS driver and independently of the frame detected for an immediately preceding frame.

That is to say, it is possible to control a capacitor signal CS on the basis of only a signal generated at the stage of the CS driver itself independently of signals generated at stages preceding and succeeding the stage of the CS driver in the embodiment.

The embodiment described so far implements a liquid-crystal display apparatus employing an analog interface driving circuit for receiving an analog video signal supplied to the liquid-crystal display apparatus, latching the analog video signal and writing the latched analog video signal sequentially from point to point into pixel circuits. It is to be noted, however, that the embodiment can also be applied as well to a liquid-crystal display apparatus for receiving a digital video signal and writing the digital video signal into pixel circuits sequentially from line to line by adoption of a selector method.

In addition, as described above, in accordance with the embodiment, there is provided a driving method whereby, after the falling edge of a gate pulse GP asserted on a specific one of the gate lines 104-1 to 104-$m$, that is, after pixel video data from a signal line (that is, one of the signal lines 106-1 to 106-$n$) is written into a pixel circuit PXLC connected to the specific gate line 104, the capacitor lines 105-1 to 105-$m$ each connected independently for one of the rows are driven as described above, resulting in a capacitive coupling effect of the storage capacitor Cs201 employed in each of the pixel circuits PXLC and, in each of the pixel circuits PXLC, an electric potential appearing on the node ND201 is changed due to the capacitive coupling effect in order to modulate a voltage applied to the liquid-crystal cell LC201. On top of that, the embodiment includes an automatic signal correction system in which, during an actual driving operation according to this driving method, a monitor circuit detects an electric potential found as an average of detected electric potentials appearing on monitor pixel circuits PXLCM of the first monitor pixel section 107-1 and the second monitor pixel section 107-2 as electric potentials having the positive and negative polarities and automatically corrects the center value of a common voltage signal Vcom on the basis of the detected electric-potential average.

It is to be noted, however, that the driving method adopted by the automatic signal correction system for correcting the center value of the common voltage signal Vcom does not have to be the capacitive coupling driving method. That is to say, the automatic signal correction system may also adopt the ordinary 1H Vcom inversion driving method.

Figure 56:
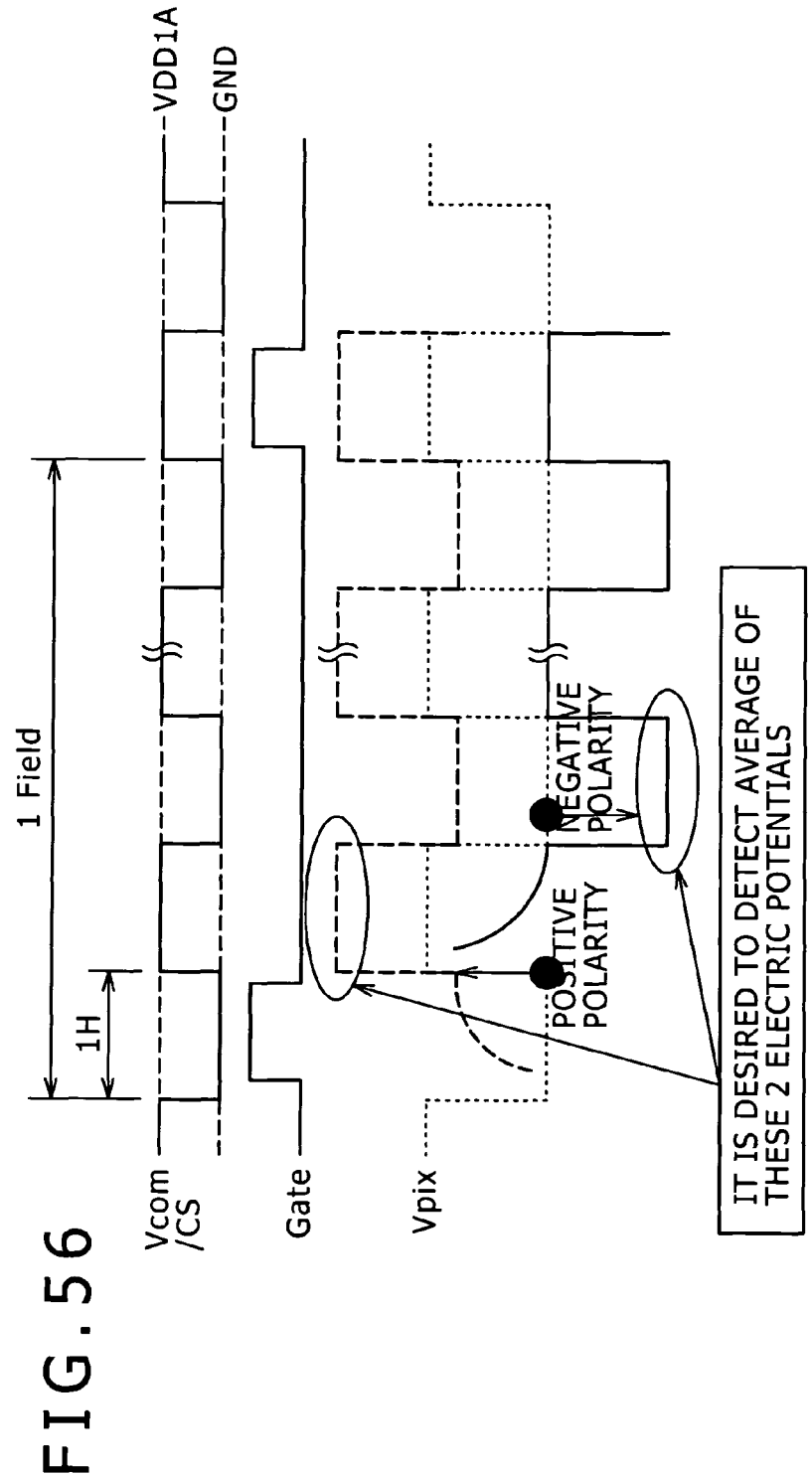
FIG. 56 is a diagram showing typical waveforms of signals generated as a result of adoption of the ordinary 1H Vcom inversion driving method in the automatic signal correction system for correcting the center value of the common voltage signal Vcom.

FIG. 56 is a diagram showing typical waveforms of signals generated as a result of adoption of the ordinary 1H Vcom inversion driving method in the automatic signal correction system for correcting the center value of the common voltage signal Vcom. In this case, an electric potential with a positive polarity never coexists with an electric potential with a negative polarity at the same time because the first pixel electrode of the liquid-crystal cell (that is, the pixel electrode located on the TFT side) experiences a capacitive coupling effect synchronously with a 1H inversion of the common voltage signal Vcom.

It is thus necessary to devise a technique to detect electric potentials appearing in the pixel circuit.

Figure 57:
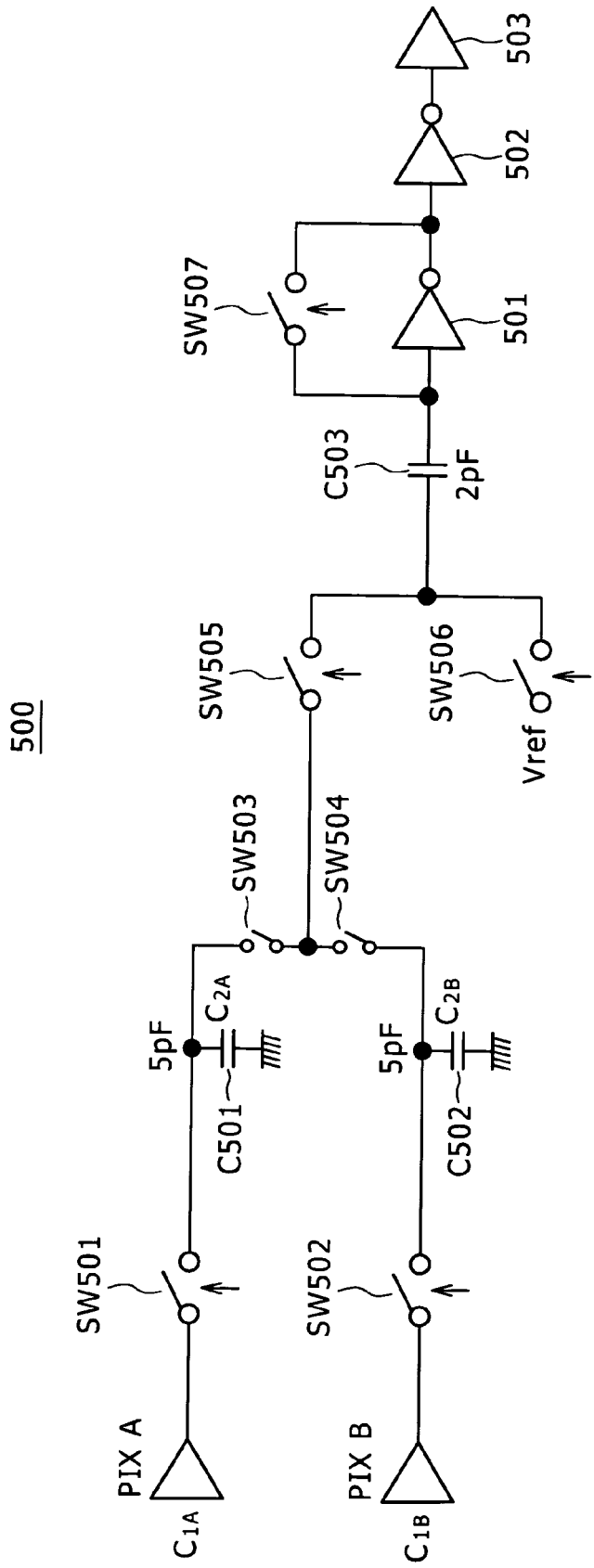
FIG. 57 is a diagram showing a typical configuration of a detection circuit including an automatic signal correction system for correcting the center value of the common voltage signal Vcom by adoption of the ordinary 1H Vcom inversion driving method.
Figure 58:
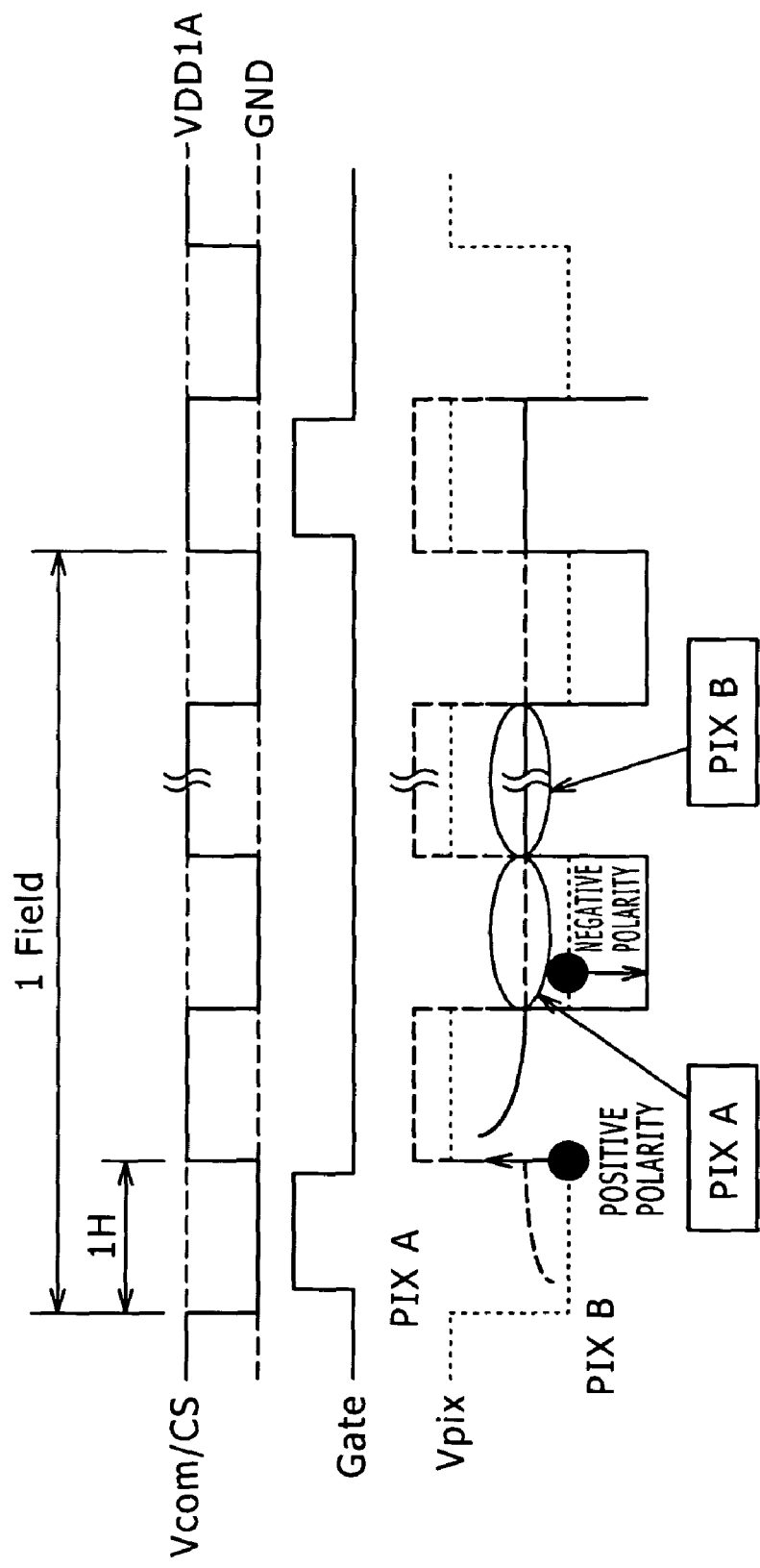
FIG. 58 shows typical timing charts of signals generated in the detection circuit shown in the diagram of FIG. 57.

FIG. 57 is a diagram showing a typical configuration of a detection circuit 500 including an automatic signal correction system for correcting the center value of the common voltage signal Vcom by adoption of the ordinary 1H Vcom inversion driving method. FIG. 58 shows typical timing charts of signals generated in the detection circuit 500 shown in the diagram of FIG. 57.

The detection circuit 500 shown in the diagram of FIG. 57 employs switches SW501 to SW507, capacitors C501 to C503, a comparison amplifier 501, a CMOS buffer 502 and an output buffer 503.

In the detection circuit 500, first of all, each of the switches SW506 and SW507 is put in a turned-on state. In this state, the input and output terminals of the comparison amplifier 501 are connected to each other, putting the comparison amplifier 501 in a reset state. In addition, the reference voltage Vref is electrically charged into the capacitor C503. Then, each of the switches SW506 and SW507 is put in a turned-off state.

Subsequently, a (½) Sig voltage is supplied to each of the monitor pixel section for the positive polarity and the monitor pixel section for the negative polarity. Then, the storage capacitors employed in the monitor pixel section for the positive polarity and the monitor pixel section for the negative polarity are driven into capacitive coupling states with timings shifted from each other by 1H. Subsequently, the two storage capacitors are again driven into capacitive coupling states to obtain the DC value of the common voltage signal Vcom.

The switch SW501 is put in a turned-on state in order to accumulate an electric charge C1A of a pixel circuit PIXA in the capacitor C501 during a period of 1H. By the same token, the switch SW502 is then put in a turned-on state in order to accumulate an electric charge C1B of a pixel circuit PIXB in the capacitor C502 during a period of 1H.

Afterwards, each of the switches SW503 and SW504 is put in a turned-on state in order to merge the electric charge C1A accumulated in the capacitor C501 with the electric charge C1B accumulated in the capacitor C502 and obtain the average value of the electric charges C1A and C1B.

In this way, the ordinary 1H Vcom inversion driving method can be adopted in the automatic signal correction system for correcting the center value of the common voltage signal Vcom.

Also in this case, the inspection process entailing the cumbersome labor hours is not needed at a shipping time. Thus, even if the center value of the common voltage signal Vcom is shifted from an optimum value due to the temperature of an environment in which the liquid-crystal display panel serving as the active-matrix display apparatus 100 is used, the driving method, the driving frequency, the backlight (B/L) luminance or the luminance of incoming light, the system for automatically adjusting the center value of the common voltage signal Vcom is capable of sustaining the center value of the common voltage signal Vcom at a value optimum for the environment. As a result, the active-matrix display apparatus 100 offers a merit of the capability of appropriately preventing flickers from being generated on the display screen.

In addition, by adjusting the center value of the common voltage signal Vcom to an optimum value, it is possible to eliminate the effect of variations in actual pixel electric potential on the quality of the image.

The embodiment described above implements an active-matrix display apparatus making use of liquid crystal cells each functioning as the display element (or the electro-optical device) of a pixel circuit. However, the scope of the present invention is by no means limited to such liquid-crystal display apparatus. That is to say, the present invention can be applied to all active-matrix display apparatus including an active-matrix EL (Electroluminescence) display apparatus making use of EL devices each functioning as the display element of a pixel circuit.

The display apparatus according to the embodiment described above can be used as an LCD (Liquid-Crystal Display) panel which is the liquid-crystal display panel of a direct-vision video display apparatus or a projection LCD apparatus such as a liquid-crystal projector. Examples of the direct-vision video display apparatus are a liquid-crystal monitor and a liquid-crystal view finder.

On top of that, each of active-matrix display apparatus represented by the active-matrix liquid-crystal display apparatus according to the embodiment can not only be used as a display unit of OA equipment such as a personal computer and a word processor and a display unit of a TV receiver, but can also be used well as a display unit of electronic equipment (or a portable terminal) which needs to be made small in size and made compact. Examples of such electronic equipment or such a portable terminal are a hand-held phone and a PDA.

In addition, it should be understood by those skilled in the art that a variety of modifications, combinations, sub-combinations and alterations may occur, depending on design requirements and other factors as far as they are within the scope of the appended claims or the equivalents thereof.

Figure 59:
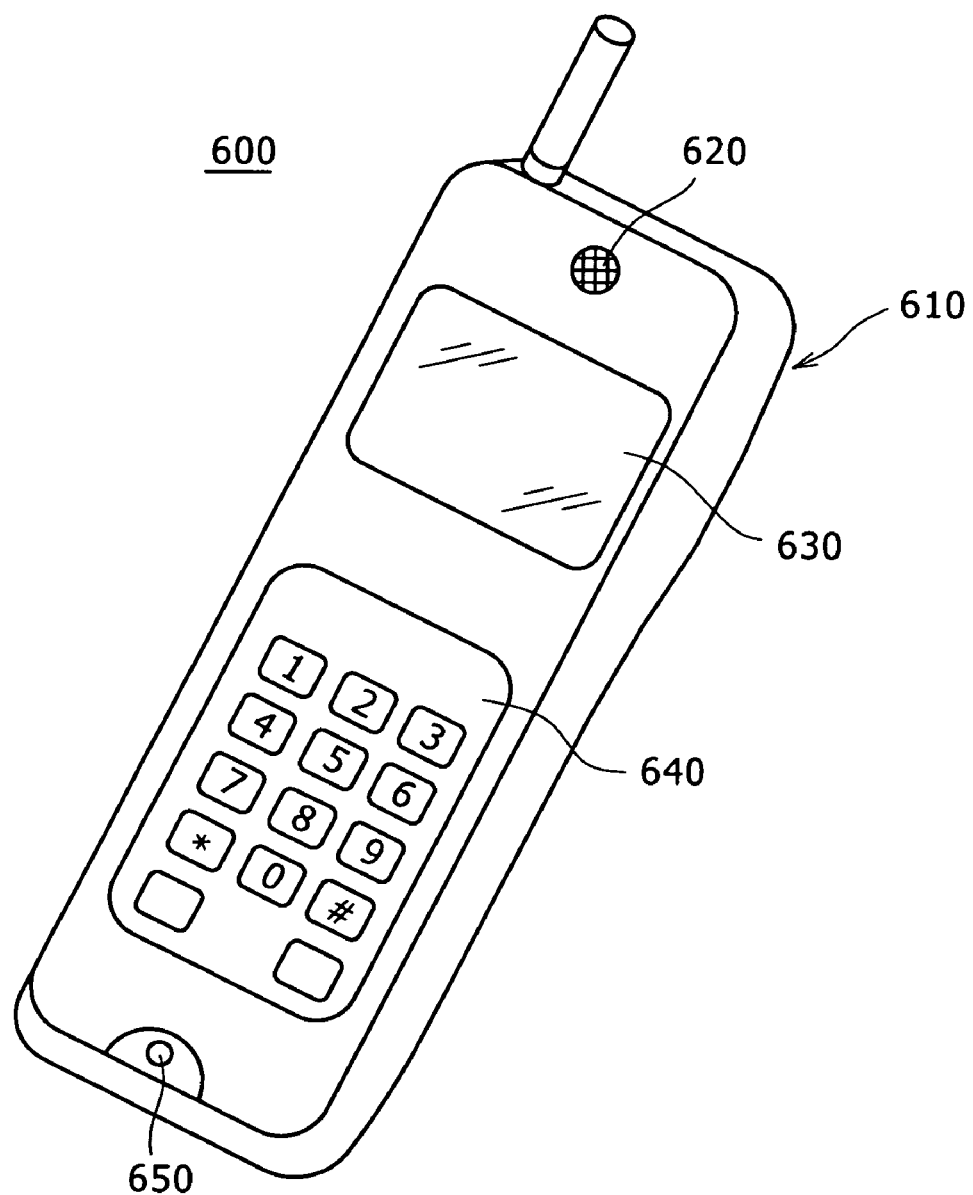
FIG. 59 is a diagram roughly showing an external view of electronic equipment serving as a portable terminal to which an embodiment of the present invention is applied.

FIG. 59 is a diagram roughly showing an external view of electronic equipment serving as a portable terminal 600 to which the present invention is applied. An example of such a portable terminal 600 is a hand-held phone.

The hand-held phone 600 according to an embodiment of the present invention employs a speaker section 620, a display section 630, an operation section 640 and a mike section 650 which are provided on the front-face side of the phone case 610 of the hand-held phone 600 by being arranged sequentially starting from the top of the phone case 610.

The display section 630 employed in the hand-held phone 600 having the configuration described above is typically a liquid-crystal display apparatus which is the active-matrix liquid-crystal display apparatus according to the embodiment described so far.

As described above, by employing the active-matrix liquid-crystal display apparatus according to the embodiment explained so far in a portable terminal such as the hand-held phone 600 as the display section 630, the hand-held phone 600 offers merits such as effective prevention of flickers from being generated on the display screen and a capability of displaying an image with a high quality.

In addition, the pitch can be reduced, the width of the frame can be decreased and the power consumption of the display apparatus can be lowered. Thus, the power consumption of the main unit of the portable terminal can also be reduced as well.

What is claimed is:

1. A display apparatus comprising:
    an available pixel section having a plurality of available pixel circuits arranged to form a matrix as available pixel circuits each including a switching device through which pixel video data is written into said available pixel circuit;
    a plurality of scan lines each provided for an individual one of rows of said available pixel circuits arranged on said available pixel section to form said matrix and each used for controlling conduction states of said switching devices each employed in one of said available pixel circuits provided on said individual row;
    a plurality of capacitor lines each provided for any individual one of said rows and each connected to said available pixel circuits provided on said individual row;
    a plurality of signal lines each provided for any individual one of columns of said available pixel circuits arranged on said available pixel section to form said matrix and each used for propagating said pixel video data to said available pixel circuits provided on said individual column;
    a driving circuit for selectively driving said scan lines and said capacitor lines;
    a monitor circuit having
        a first monitor pixel section created separately from said available pixel section as a monitor pixel section employing at least one monitor pixel circuit for a positive or negative polarity, and
        a second monitor pixel section created separately from said available pixel section as a monitor pixel section employing at least one monitor pixel circuit for said negative or positive polarity;
    at least two of following three correction systems
        a capacitor-signal correction system for correcting a capacitor signal used for driving each of said capacitor lines based on electric potentials detected by said first monitor pixel section and said second monitor pixel section,
        a video-signal correction system for correcting a video signal propagating through each of said signal lines as a signal conveying said pixel video data based on said electric potentials detected by said first monitor pixel section and said second monitor pixel section, and
        a common-voltage correction system for correcting a center value of a common voltage signal with a level thereof changing at time intervals determined in advance based on said electric potentials detected by said first monitor pixel section and said second monitor pixel section; and
    a switch for selectively supplying pixel electric potentials detected by said first monitor pixel section and said second monitor pixel section to a desired one of said two or three correction systems in accordance with a selection pattern determined in advance, wherein
    each of said available pixel circuits includes a display element having a first pixel electrode as well as a second pixel electrode and a storage capacitor having a first electrode as well as a second electrode,
    in each of said available pixel circuits, said first pixel electrode of said display element and said first electrode of said storage capacitor are connected to one terminal of said switching device,
    in each of said available pixel circuits provided on any individual one of said rows, said second electrode of said storage capacitor is connected to said capacitor line provided for said individual row, and
    said common voltage signal with the level thereof changing at time intervals determined in advance is supplied to said second pixel electrode of each of said display elements through a common-voltage signal line common to all said available pixel circuits.

2. The display apparatus according to claim 1 wherein said switch selectively supplies pixel electric potentials detected by said first monitor pixel section and said second monitor pixel section to predetermined correction systems selected from said three correction systems with weighted timings set for said predetermined correction systems.

3. The display apparatus according to claim 1 wherein said common-voltage correction system corrects the center value of said common voltage signal with the level thereof changing at time intervals determined in advance based on an average of pixel electric potentials detected by said first monitor pixel section and said second monitor pixel section.

4. The display apparatus according to claim 1 wherein said capacitor-signal correction system corrects a capacitor signal used for driving each of said capacitor lines based on a difference between electric potentials detected by said first monitor pixel section and said second monitor pixel section.

5. The display apparatus according to claim 1 wherein said video-signal correction system corrects a video signal propagating through each of said signal lines based on a difference between electric potentials detected by said first monitor pixel section and said second monitor pixel section.

6. The display apparatus according to claim 1 wherein said first monitor pixel section changes its polarity from said positive polarity to said negative polarity and vice versa at time intervals determined in advance whereas said second monitor pixel section changes its polarity from said negative polarity to said positive polarity and vice versa at time intervals determined in advance so that the polarity of said first monitor pixel section is different from the polarity of said second monitor pixel section.

7. The display apparatus according to claim 2 wherein:
    said monitor circuit has a scan line, a capacitor line, a signal line and a driving circuit which are provided separately from respectively said scan lines, said capacitor lines, said signal lines and said driving circuit which are provided for said available pixel section; and
    said monitor circuit has a configuration equivalent to each of said available pixel circuits employed in said available pixel section.

8. Electronic equipment provided with a display apparatus, said display apparatus comprising:
    an available pixel section having a plurality of available pixel circuits arranged to form a matrix as available pixel circuits each including a switching device through which pixel video data is written into said available pixel circuit;

a plurality of scan lines each provided for an individual one of rows of said available pixel circuits arranged on said available pixel section to form said matrix and each used for controlling conduction states of said switching devices each employed in one of said available pixel circuits provided on said individual row;

a plurality of capacitor lines each provided for any individual one of said rows and each connected to said available pixel circuits provided on said individual row;

a plurality of signal lines each provided for any individual one of columns of said available pixel circuits arranged on said available pixel section to form said matrix and each used for propagating said pixel video data to said available pixel circuits provided on said individual column;

a driving circuit for selectively driving said scan lines and said capacitor lines;

a monitor circuit having
- a first monitor pixel section created separately from said available pixel section as a monitor pixel section employing at least one monitor pixel circuit for a positive or negative polarity, and
- a second monitor pixel section created separately from said available pixel section as a monitor pixel section employing at least one monitor pixel circuit for said negative or positive polarity;

at least two of following three correction systems
- a capacitor-signal correction system for correcting a capacitor signal used for driving each of said capacitor lines based on electric potentials detected by said first monitor pixel section and said second monitor pixel section,
- a video-signal correction system for correcting a video signal propagating through each of said signal lines as a signal conveying said pixel video data based on said electric potentials detected by said first monitor pixel section and said second monitor pixel section, and
- a common-voltage correction system for correcting a center value of a common voltage signal with a level thereof changing at time intervals determined in advance based on said electric potentials detected by said first monitor pixel section and said second monitor pixel section; and a switch for selectively supplying pixel electric potentials detected by said first monitor pixel section and said second monitor pixel section to a desired one of said two or three correction systems in accordance with a selection pattern determined in advance, wherein each of said available pixel circuits includes a display element having a first pixel electrode as well as a second pixel electrode and a storage capacitor having a first electrode as well as a second electrode, in each of said available pixel circuits, said first pixel electrode of said display element and said first electrode of said storage capacitor are connected to one terminal of said switching device, in each of said available pixel circuits provided on any individual one of said rows, said second electrode of said storage capacitor is connected to said capacitor line provided for said individual row, and said common voltage signal with the level thereof changing at time intervals determined in advance is supplied to said second pixel electrode of each of said display elements through a common-voltage signal line common to all said available pixel circuits.

* * * * *